United States Patent
Rahman et al.

(10) Patent No.: US 12,463,698 B2
(45) Date of Patent: Nov. 4, 2025

(54) METHOD AND APPARATUS FOR CSI REPORTING

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/677,647

(22) Filed: May 29, 2024

(65) Prior Publication Data

US 2024/0340061 A1 Oct. 10, 2024

Related U.S. Application Data

(63) Continuation of application No. 17/584,312, filed on Jan. 25, 2022, now Pat. No. 12,047,145.

(60) Provisional application No. 63/274,370, filed on Nov. 1, 2021, provisional application No. 63/274,358, filed on Nov. 1, 2021, provisional application No. 63/257,072, filed on Oct. 18, 2021, provisional application No. 63/254,819, filed on Oct. 12, 2021, provisional application No. 63/254,413, filed on Oct. 11, 2021, provisional application No. 63/252,426, (Continued)

(51) Int. Cl.
*H04B 7/06* (2006.01)
*H04L 5/00* (2006.01)

(52) U.S. Cl.
CPC ......... *H04B 7/0626* (2013.01); *H04B 7/0639* (2013.01); *H04L 5/0048* (2013.01)

(58) Field of Classification Search
CPC .... H04B 7/0626; H04B 7/0639; H04L 5/0048
See application file for complete search history.

(56) References Cited

U.S. PATENT DOCUMENTS

| | | | |
|---|---|---|---|
| 2019/0181929 A1* | 6/2019 | Ge | H04B 7/0632 |
| 2020/0358505 A1* | 11/2020 | Park | H04B 7/088 |
| 2022/0069881 A1 | 3/2022 | Rahman | |

FOREIGN PATENT DOCUMENTS

| | | |
|---|---|---|
| EP | 3734852 A1 | 11/2020 |
| WO | 2020225642 A1 | 11/2020 |

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
(Continued)

*Primary Examiner* — Duc C Ho

(57) ABSTRACT

A method for operating a user equipment (UE) comprises receiving configuration information about a channel state information (CSI) report, the configuration information including codebook parameters (M, α, β), wherein: M is a number of frequency domain basis vectors, α is a number≤1, and β is a number≤1; identifying values of M, α, and β; determining a value of $K_1$ based on α, where $K_1$ is a number of selected CSI reference signal (CSI-RS) ports from a total of P CSI-RS ports; determining a maximum number of non-zero coefficients based on β; determining the CSI report based on the values of M, $K_1$, and the maximum number of non-zero coefficients; and transmitting the CSI report.

15 Claims, 12 Drawing Sheets

Related U.S. Application Data filed on Oct. 5, 2021, provisional application No. 63/145,292, filed on Feb. 3, 2021.

(56) References Cited

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"LTE; Evolved Universal Terrestrial Radio Access (E-UTRA); Medium Access Control (MAC) protocol specification 3GPP TS 36.321 version 16.6.0 Release 16)", ETSI TS 136 321 V16.6.0, Oct. 2021, 144 pages.

"LTE; Evolved Universal Terrestrial Radio Access (E-UTRA); Radio Resource Control (RRC); Protocol specification 3GPP TS 36.331 version 16.7.0 Release 16)", ETSI TS 136 331 V16.7.0, Jan. 2022, 1099 pages.

"3rd Generation Partnership Project; Technical Specification Group Services and System Aspects; Feasibility Study on New Services and Markets Technology Enablers; Stage 1 (Release 14)", 3GPP TR 22.891 V14.2.0, Sep. 2016, 95 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

"3rd Generation Partnership Project; Technical Specification Group Radio Access Network; NR; Physical layer procedures for control (Release 17)", 3GPP TS 38.213 V17.0.0, Dec. 2021, 225 pages.

International Search Report and Written Opinion issued Jun. 2, 2022 regarding Application No. PCT/KR2022/001545, 9 pages.

Ericsson, "CSI enhancements for Multi-TRP and FR1 FDD reciprocity", 3GPP TSG-RAN WG1 Meeting #104-e, R1-2101687, Jan. 2021, 22 pages.

Qualcomm Incorporated, "CSI enhancements: MTRP and FR1 FDD reciprocity", 3GPP TSG RAN WG1 #104-e, R1-2101452, Jan. 2021, 14 pages.

OPPO, "CSI enhancements: MTRP and FR1 FDD reciprocity", 3GPP TSG RAN WG1 #104-e, R1-2100124, Jan. 2021, 12 pages.

Fraunhofer Ils et al., "CSI enhancements on Type II PS codebook and multi-TRP", 3GPP TSG RAN WG1 #104-e, R1-2100536, Jan. 2021, 10 pages.

Extended European Search Report issued May 16, 2024 regarding Application No. 22749962.1, 8 pages.

* cited by examiner

METHOD AND APPARATUS FOR CSI REPORTING

CROSS-REFERENCE TO RELATED APPLICATIONS AND CLAIM OF PRIORITY

This application is a continuation of U.S. patent application Ser. No. 17/584,312, filed on Jan. 25, 2022, now U.S. Pat. No. 12,047,145, which claims priority to U.S. Provisional Patent Application No. 63/145,292, filed on Feb. 3, 2021, U.S. Provisional Patent Application No. 63/252,426, filed on Oct. 5, 2021, U.S. Provisional Patent Application No. 63/254,413, filed on Oct. 11, 2021, U.S. Provisional Patent Application No. 63/254,819, filed on Oct. 12, 2021, U.S. Provisional Patent Application No. 63/257,072, filed on Oct. 18, 2021, U.S. Provisional Patent Application No. 63/274,358, filed on Nov. 1, 2021, and U.S. Provisional Patent Application No. 63/274,370, filed on Nov. 1, 2021. The content of the above-identified patent documents is incorporated herein by reference.

TECHNICAL FIELD

The present disclosure relates generally to wireless communication systems and more specifically to CSI reporting.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses to enable channel state information (CSI) reporting in a wireless communication system.

In one embodiment, a UE for CSI reporting in a wireless communication system is provided. The UE includes a transceiver configured to receive configuration information about a channel state information (CSI) report, the configuration information including codebook parameters (M, $\alpha$, $\beta$), wherein: M is a number of frequency domain basis vectors, $\alpha$ is a number$\leq 1$, and $\beta$ is a number$\leq 1$. The UE further includes a processor operably connected to the transceiver. The processor is configured to: identify values of M, $\alpha$, and $\beta$; determine a value of $K_1$ based on $\alpha$, where $K_1$ is a number of selected CSI reference signal (CSI-RS) ports from a total of P CSI-RS ports; determine a maximum number of non-zero coefficients based on $\beta$; and determine the CSI report based on the values of M, $K_1$, and the maximum number of non-zero coefficients. The transceiver is further configured to transmit the CSI report.

In another embodiment, a BS in a wireless communication system is provided. The BS includes a processor configured to generate configuration information about a channel state information (CSI) report, the configuration information including codebook parameters (M, $\alpha$, $\beta$), wherein: M is a number of frequency domain basis vectors, $\alpha$ is a number$\leq 1$, and $\beta$ is a number$\leq 1$. The BS further includes a transceiver operably connected to the processor. The transceiver is configured to: transmit the configuration information about the CSI report, and receive the CSI report; wherein the CSI report is based on values of M, $K_1$, and a maximum number of non-zero coefficients, wherein the maximum number of non-zero coefficients is based on $\beta$, and wherein $K_1$ is based on $\alpha$ and is a number of selected CSI reference signal (CSI-RS) ports from a total of P CSI-RS ports.

In yet another embodiment, a method for operating a UE is provided. The method comprises: receiving configuration information about a channel state information (CSI) report, the configuration information including codebook parameters (M, $\alpha$, $\beta$), wherein: M is a number of frequency domain basis vectors, $\alpha$ is a number$\leq 1$, and $\beta$ is a number$\leq 1$; identifying values of M, $\alpha$, and $\beta$; determining a value of $K_1$ based on $\alpha$, where $K_1$ is a number of selected CSI reference signal (CSI-RS) ports from a total of P CSI-RS ports; determining a maximum number of non-zero coefficients based on $\beta$; determining the CSI report based on the values of M, $K_1$, and the maximum number of non-zero coefficients; and transmitting the CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
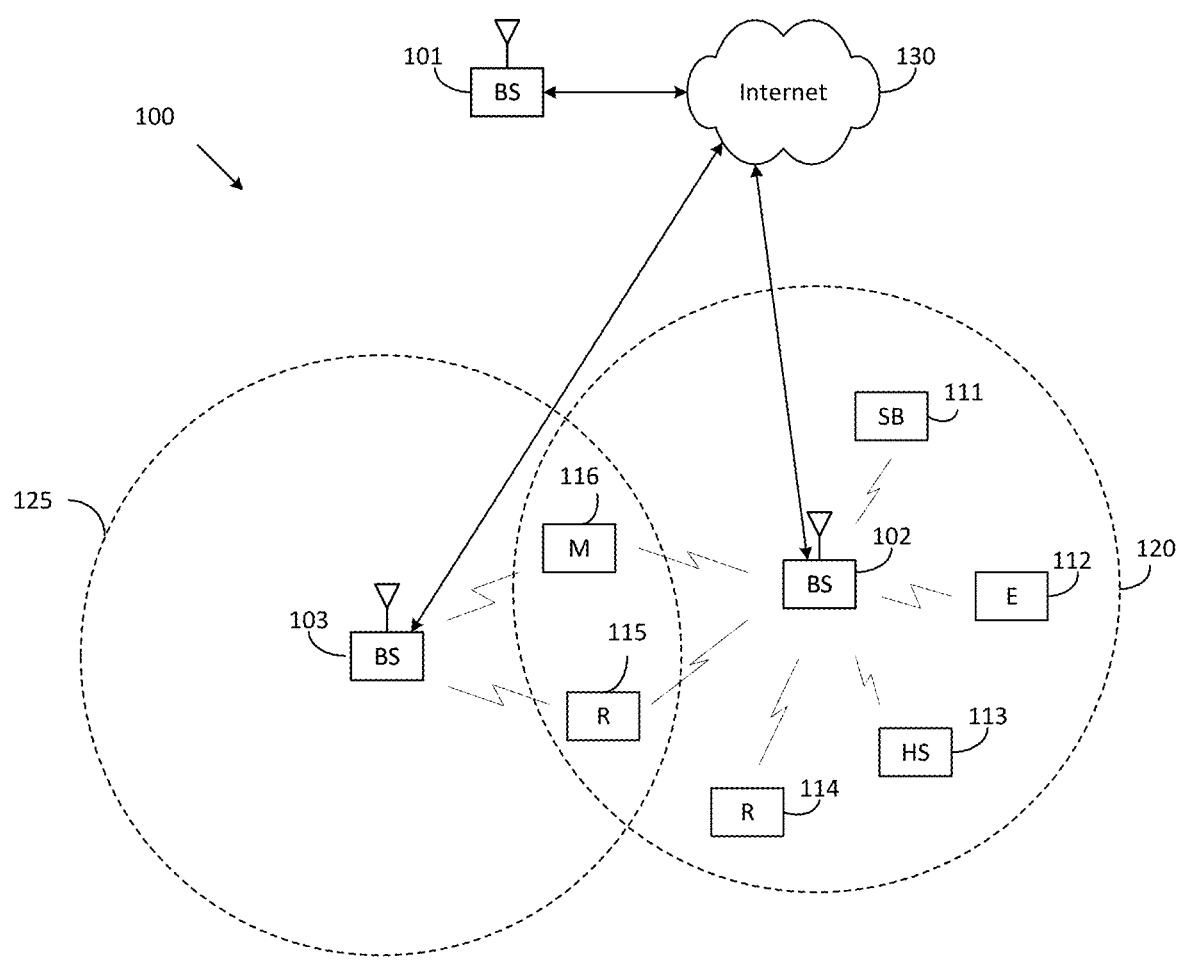
FIG. 1 illustrates an example wireless network according to embodiments of the present disclosure.

FIG. 1 through FIG. 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v17.0.0, "E-UTRA, Medium Access Control (MAC) protocol specification" (herein "REF 4"); 3GPP TS 36.331 v17.0.0, "E-UTRA, Radio Resource Control (RRC) protocol specification" (herein "REF 5"); 3GPP TR 22.891 v14.2.0 (herein "REF 6"); 3GPP TS 38.212 v17.0.0, "E-UTRA, NR, Multiplexing and channel coding" (herein "REF 7"); 3GPP TS 38.214 v17.0.0, "E-UTRA, NR, Physical layer procedures for data" (herein "REF 8") and 3GPP TS 38.213 v17.0.0, "E-UTRA, NR, Physical layer procedures for control (herein "REF 9").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
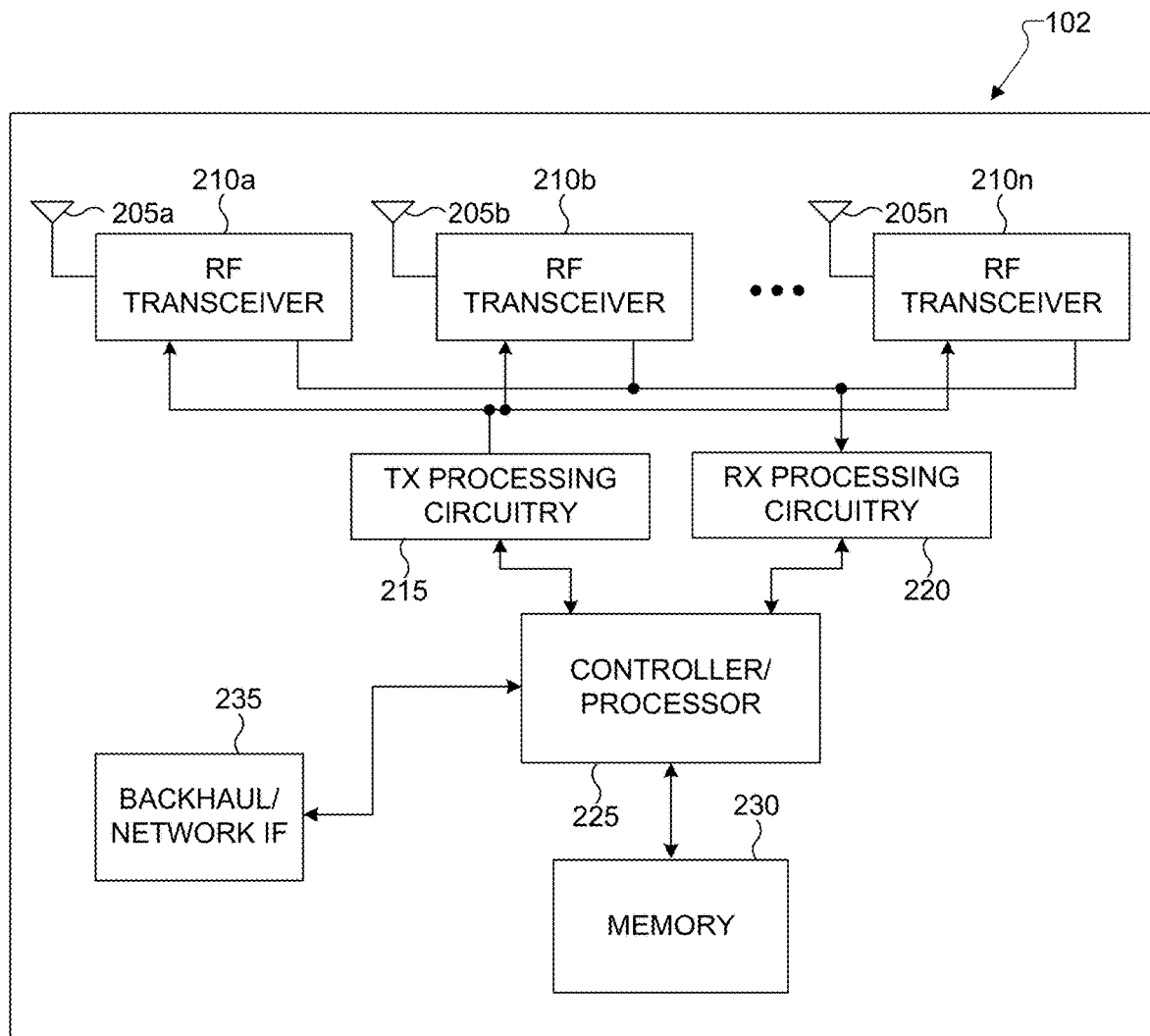
FIG. 2 illustrates an example gNB according to embodiments of the present disclosure.
Figure 3:
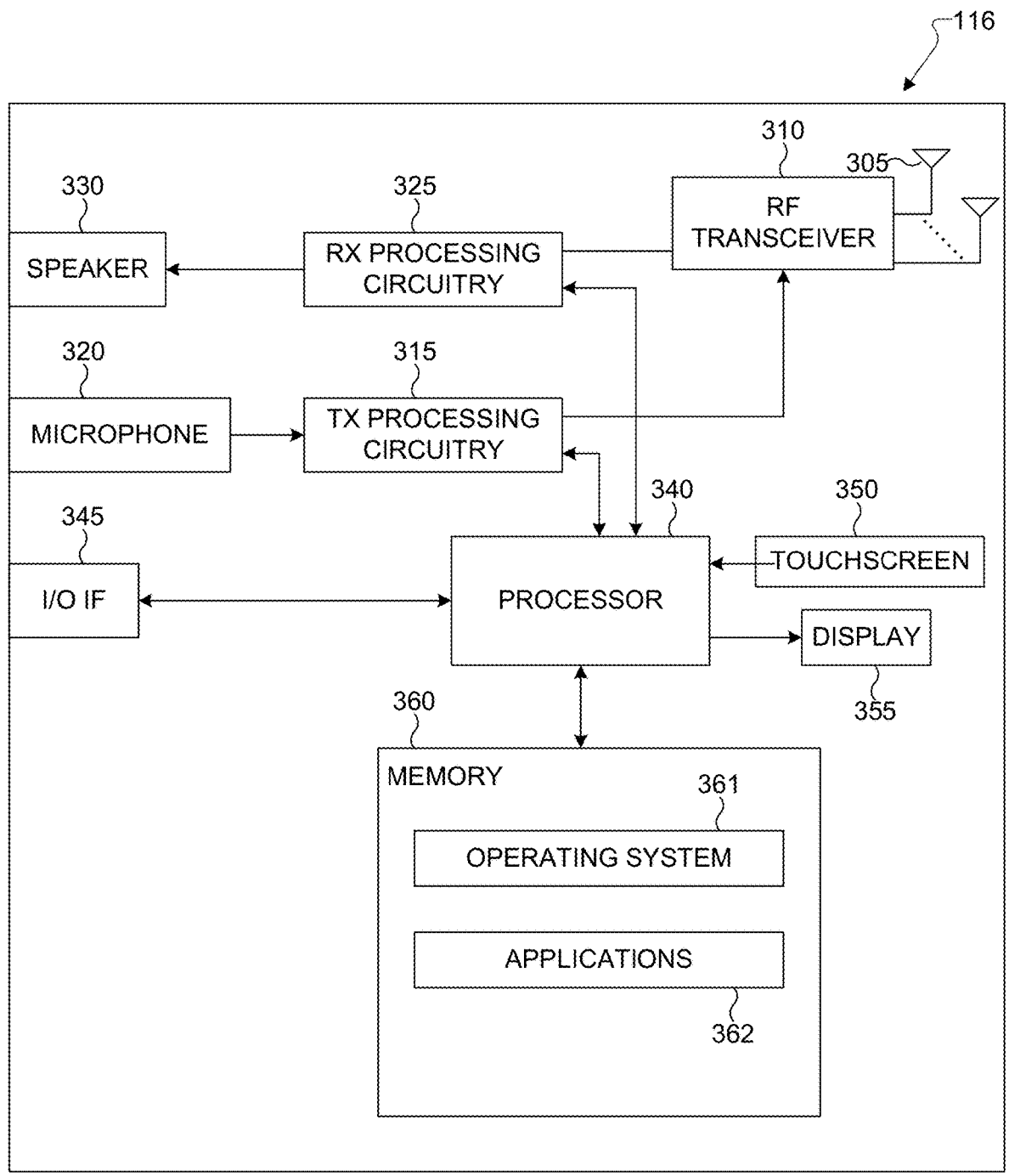
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another, or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for receiving configuration information about a channel state information (CSI) report, the configuration information including codebook parameters (M, α, β), wherein: M is a number of frequency domain basis vectors, α is a number ≤ 1, and β is a number ≤ 1; identifying values of M, α, and β; determining a value of $K_1$ based on α, where $K_1$ is a number of selected CSI reference signal (CSI-RS) ports from a total of P CSI-RS ports; determining a maximum number of non-zero coefficients based on β; determining the CSI report based on the values of M, $K_1$, and the maximum number of non-zero coefficients; and transmitting the CSI report, and one or more of the gNBs 101-103 includes circuitry, programing, or a combination thereof, for generating configuration information about a channel state information (CSI) report, the configuration information including codebook parameters (M, α, β), wherein: M is a number of frequency domain basis vectors, α is a number ≤ 1, and β is a number ≤ 1; transmitting the configuration information about the CSI report, and receiving the CSI report; wherein the CSI report is based on values of M, $K_1$, and a maximum number of non-zero coefficients, wherein the maximum number of non-zero coefficients is based on β, and wherein $K_1$ is based on α and is a number of selected CSI reference signal (CSI-RS) ports from a total of P CSI-RS ports.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving configuration information about a channel state information (CSI) report, the configuration information including codebook parameters (M, α, β), wherein: M is a number of frequency domain basis vectors, α is a number≤1, and β is a number≤1; identifying values of M, α, and β; determining a value of $K_1$ based on α, where $K_1$ is a number of selected CSI reference signal (CSI-RS) ports from a total of P CSI-RS ports; determining a maximum number of non-zero coefficients based on β; determining the CSI report based on the values of M, $K_1$, and the maximum number of non-zero coefficients; and transmitting the CSI report. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
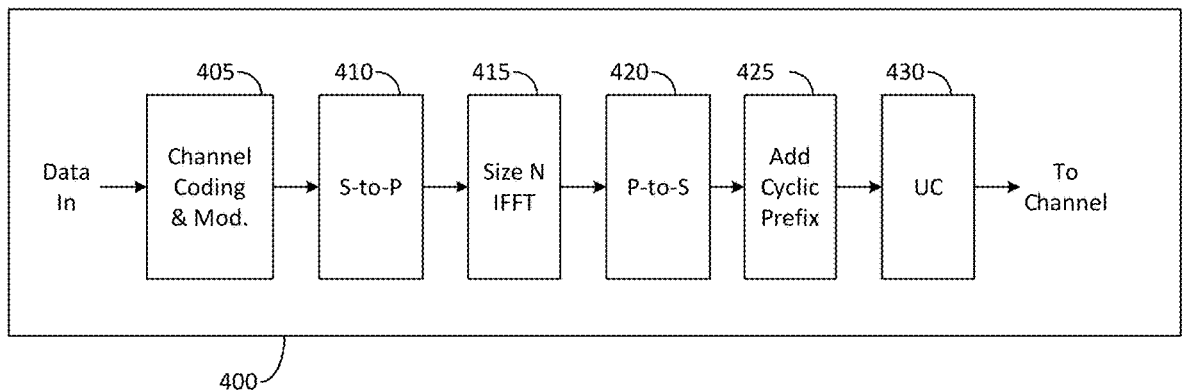
FIG. 4A illustrates a high-level diagram of an orthogonal frequency division multiple access transmit path according to embodiments of the present disclosure.
Figure 4B:
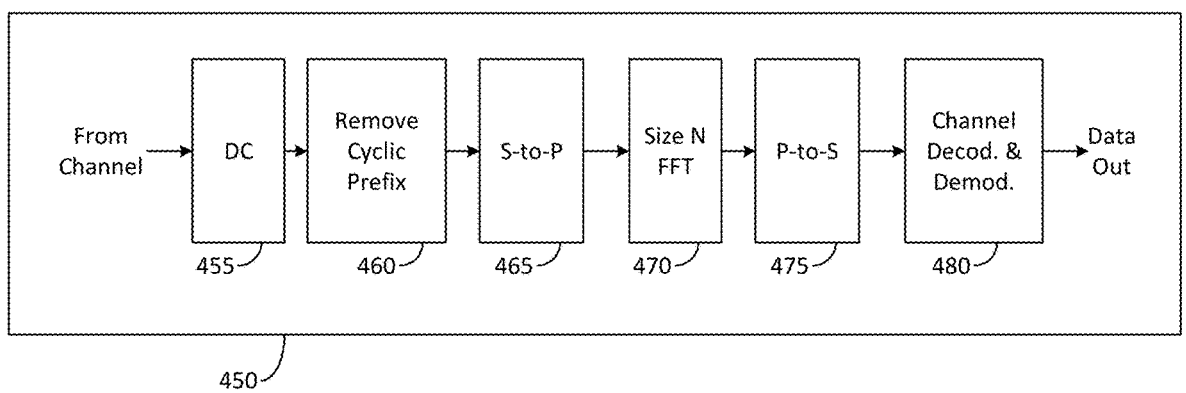
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460, and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is a RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
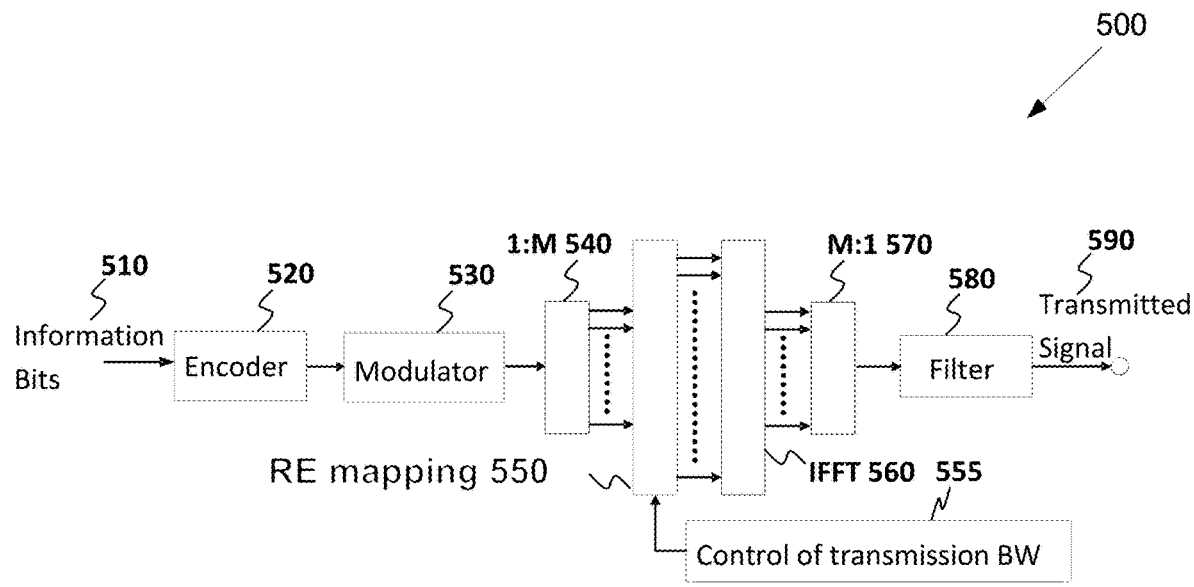
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
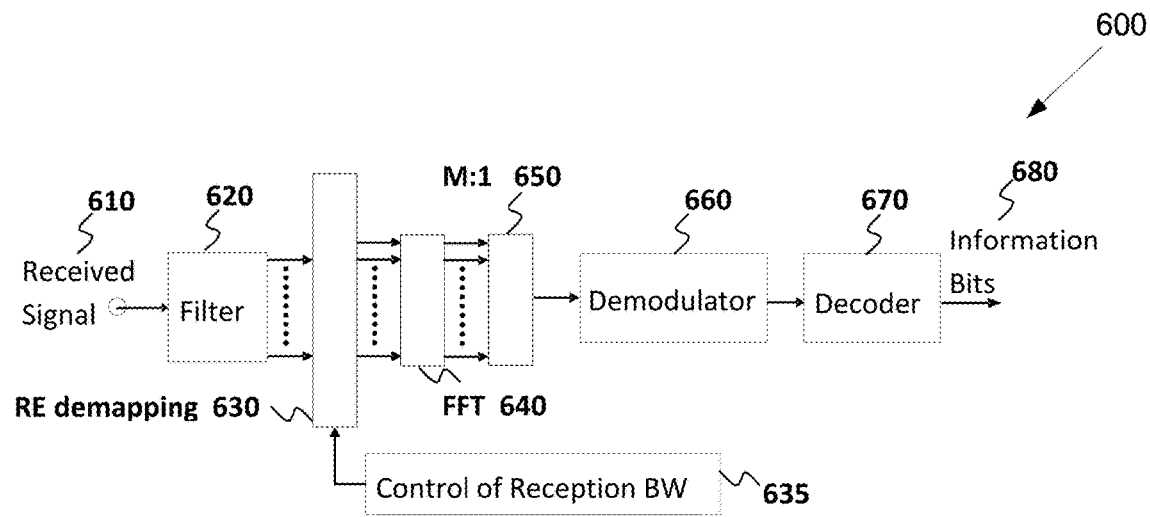
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
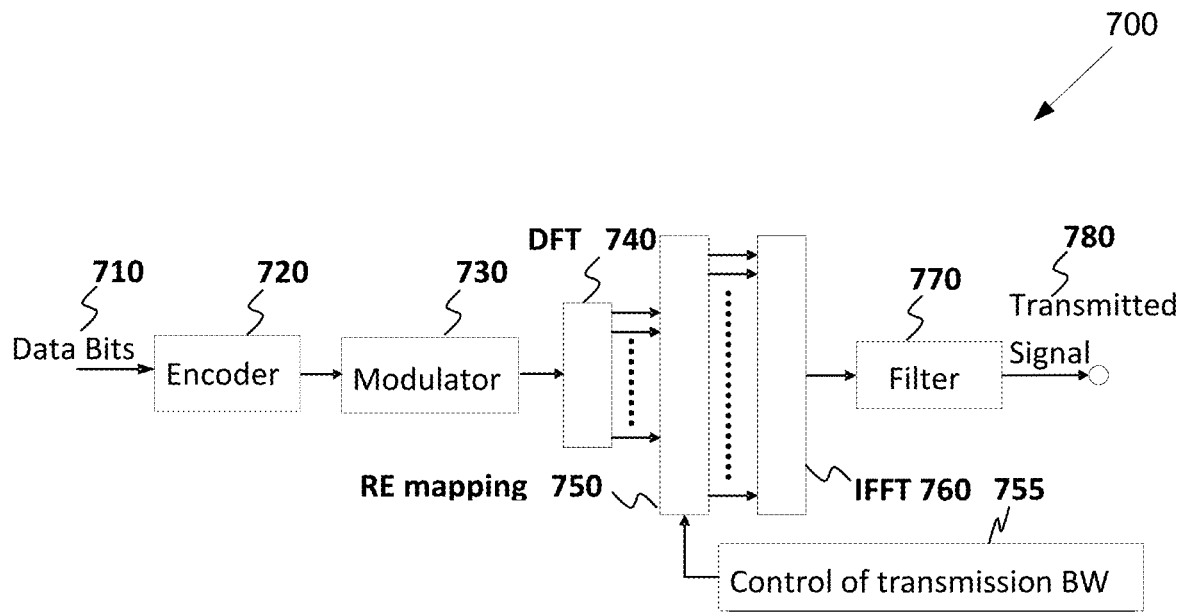
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
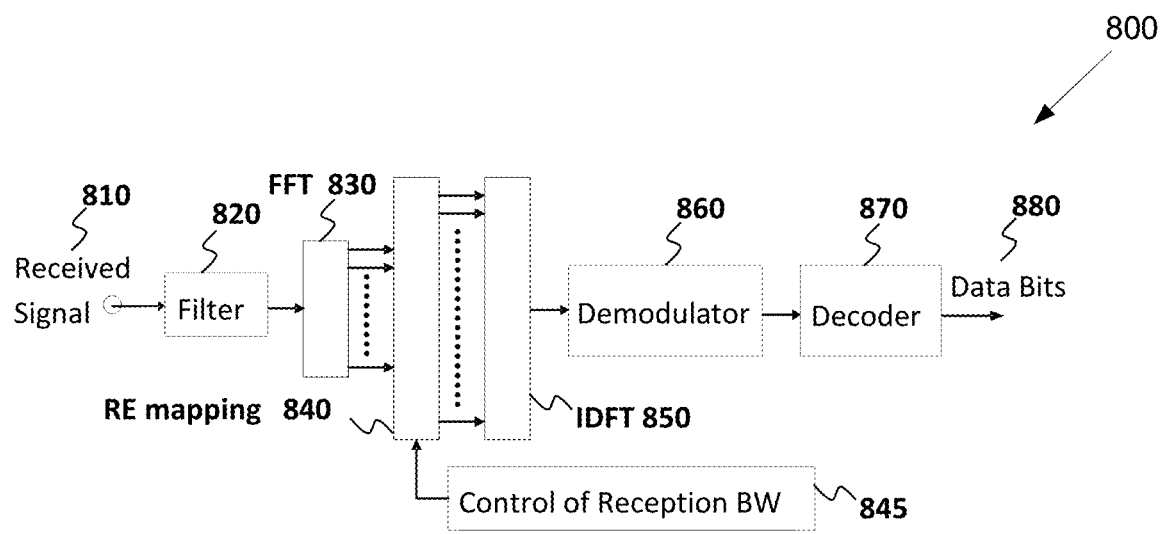
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per $km^2$ with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 9:
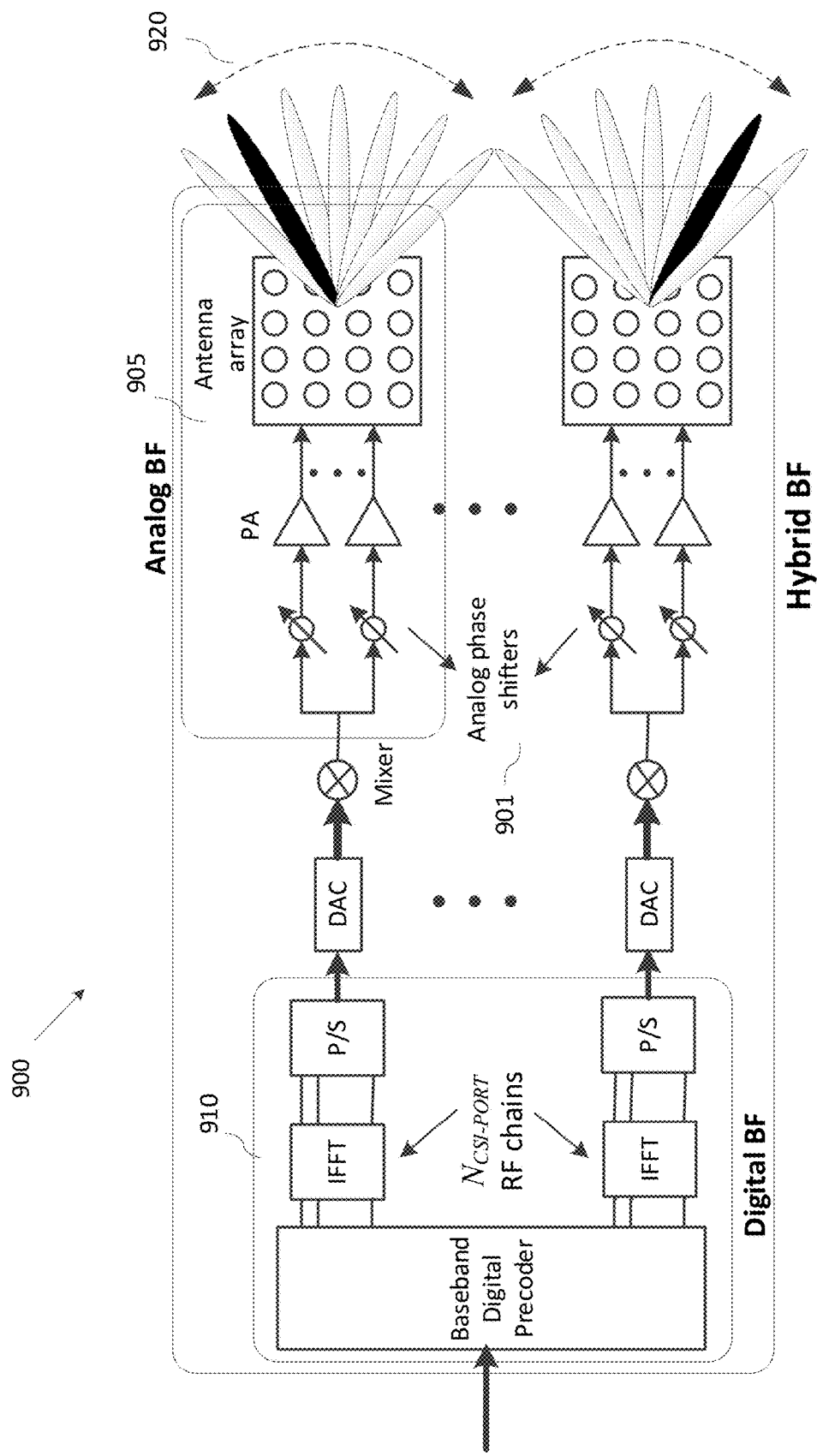
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 900 illustrated in FIG. 9 is for illustration only. FIG. 9 does not limit the scope of this disclosure to any particular implementation of the antenna blocks or arrays 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanisms corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO. The overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $P_{CSI-RS}/2$ CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

It has been known in the literature that UL-DL channel reciprocity exists in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. This disclosure provides some of design components of such a codebook.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 10:
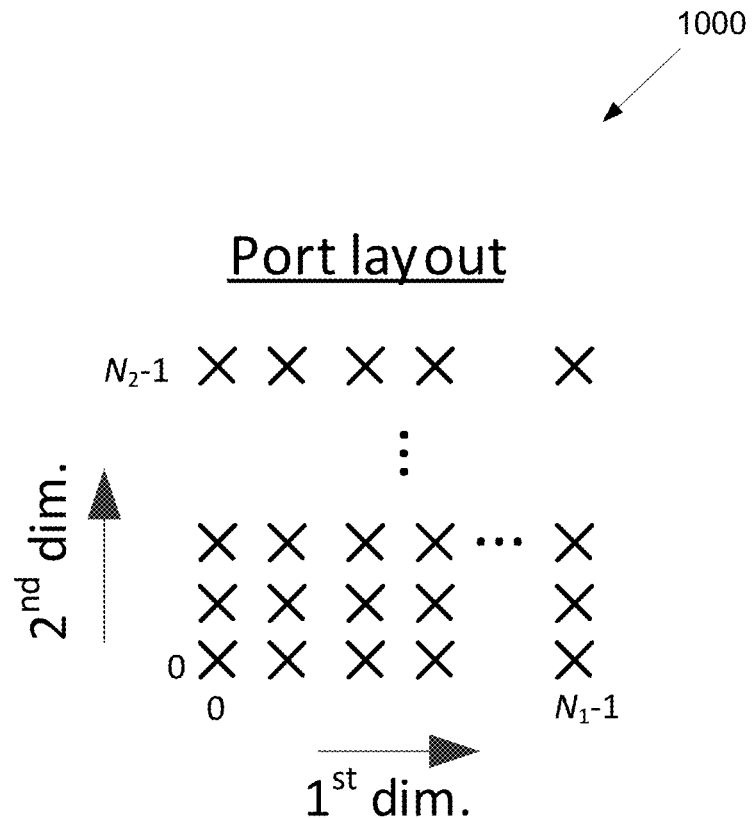
FIG. 10 illustrates an antenna port layout according to embodiments of the present disclosure.

FIG. 10 illustrates an example antenna port layout 1000 according to embodiments of the present disclosure. The embodiment of the antenna port layout 1000 illustrated in FIG. 10 is for illustration only. FIG. 10 does not limit the scope of this disclosure to any particular implementation of the antenna port layout 1000.

As illustrated in FIG. 10, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination based Type II CSI reporting framework is extended to include a frequency dimension in addition to the first and second antenna port dimensions.

Figure 11:
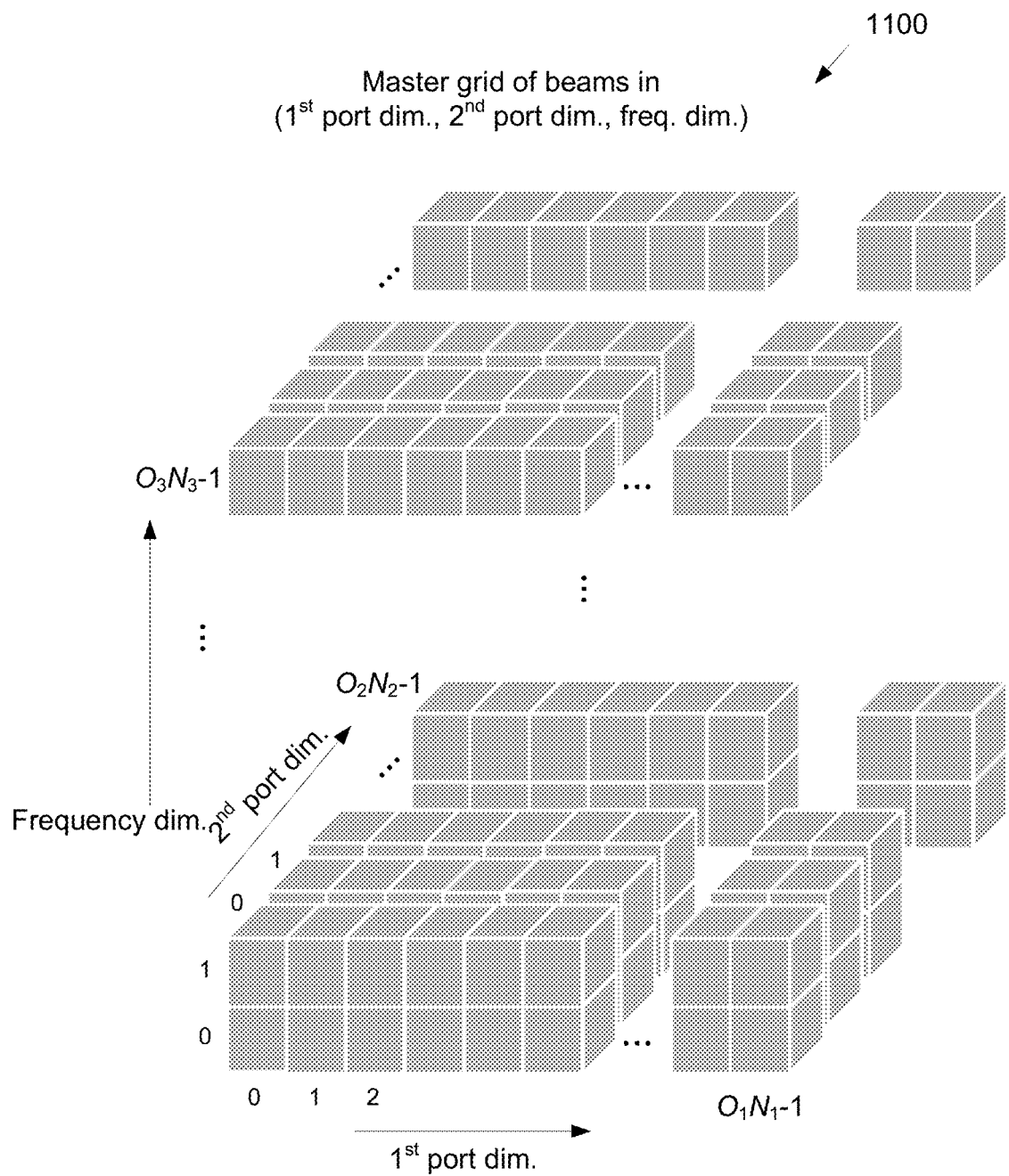
FIG. 11 illustrates a 3D grid of oversampled DFT beams according to embodiments of the present disclosure.

FIG. 11 illustrates a 3D grid 1100 of the oversampled DFT beams (1st port dim., 2nd port dim., freq. dim.) in which
- 1st dimension is associated with the 1st port dimension,
- 2nd dimension is associated with the 2nd port dimension, and
- 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to {2, 4, 8}. In yet another example, at least one of $O_1$, $O_2$, and $O_3$ is higher layer configured (via RRC signaling).

As explained in Section 5.2.2.2.6 of REF8, a UE is configured with higher layer parameter codebookType set to 'typeII-PortSelection-r16' for an enhanced Type II CSI reporting in which the pre-coders for all SBs and for a given layer l=1, . . . , v, where v is the associated RI value, is given by either $$W^l = AC_l B^H = [a_0 a_1 \ldots a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H = \quad \text{(Eq. 1)}$$

$$\sum_{f=0}^{M-1} \sum_{i=0}^{L-1} c_{l,i,f}(a_i b_f^H) = \sum_{i=0}^{L-1} \sum_{f=0}^{M-1} c_{l,i,f}(a_i b_f^H),$$

or $$W^l = \begin{bmatrix} A & 0 \\ 0 & A \end{bmatrix} C_l B^H = \begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} [b_0 b_1 \ldots b_{M-1}]^H = \quad \text{(Eq. 2)}$$

$$\begin{bmatrix} \sum_{f=0}^{M-1} \sum_{i=0}^{L-1} c_{l,i,f}(a_i b_f^H) \\ \sum_{f=0}^{M-1} \sum_{i=0}^{L-1} c_{l,i+L,f}(a_i b_f^H) \end{bmatrix},$$

where $N_1$ is a number of antenna ports in a first antenna port dimension (having the same antenna polarization), $N_2$ is a number of antenna ports in a second antenna port dimension (having the same antenna polarization), $P_{CSI-RS}$ is a number of CSI-RS ports configured to the UE, $N_3$ is a number of SBs for PMI reporting or number of FD units or number of FD components (that comprise the CSI reporting band) or a total number of precoding matrices indicated by the PMI (one for each FD unit/component), $a_i$ is a $2N_1N_2 \times 1$ (Eq. 1) or $N_1N_2 \times 1$ (Eq. 2) column vector, and $a_i$ is a $N_1N_2 \times 1$ or $$\frac{P_{CSIRS}}{2} \times 1$$

port selection column vector if antenna ports at the gNB are co-polarized, and is a $2N_1N_2 \times 1$ or $P_{CSIRS} \times 1$ port selection column vector if antenna ports at the gNB are dual-polarized or cross-polarized, where a port selection vector is a defined as a vector which contains a value of 1 in one element and zeros elsewhere, and $P_{CSIRS}$ is the number of CSI-RS ports configured for CSI reporting, $b_f$ is a $N_3 \times 1$ column vector, $c_{l,i,f}$ is a complex coefficient associate with vectors $a_i$ and $b_f$.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$ where $x_{l,i,f}=1$ if the coefficient $c_{l,i,f}$ is reported by the UE according to some embodiments of this invention.

$x_{l,i,f}=0$ otherwise (i.e., $c_{l,i,f}$ is not reported by the UE).

The indication whether $x_{l,i,f}=1$ or 0 is according to some embodiments of this invention. For example, it can be via a bitmap.

In a variation, the precoder equations Eq. 1 or Eq. 2 are respectively generalized to $$W^l = \sum_{i=0}^{L-1} \sum_{f=0}^{M_i-1} c_{l,i,f}(a_i b_{i,f}^H) \quad (Eq. 3)$$

and $$W^l = \begin{bmatrix} \sum_{i=0}^{L-1} \sum_{f=0}^{M_i-1} c_{l,i,f}(a_i b_{i,f}^H) \\ \sum_{i=0}^{L-1} \sum_{f=0}^{M_i-1} c_{l,i+L,f}(a_i b_{i,f}^H) \end{bmatrix}, \quad (Eq. 4)$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers (v=R), the pre-coding matrix is given by $$W^{(R)} = \frac{1}{\sqrt{R}}[W^1 \ W^2 \ \ldots \ W^R].$$

Eq. 2 is assumed in the rest of the disclosure. The embodiments of the disclosure, however, are general and are also application to Eq. 1, Eq. 3 and Eq. 4.

Here $$L \leq \frac{P_{CSI-RS}}{2} \text{ and } M \leq N_3. \text{ If } L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \begin{bmatrix} 1 & e^{j\frac{2\pi n_{3,l}^{(f)}}{O_3 N_3}} & e^{j\frac{2\pi \cdot 2 n_{3,l}^{(f)}}{O_3 N_3}} & \ldots & e^{j\frac{2\pi \cdot (N_3-1) n_{3,l}^{(f)}}{O_3 N_3}} \end{bmatrix}^T.$$

When $O_3=1$, the FD basis vector for layer $l \in \{1, \ldots, v\}$ (where v is the RI or rank value) is given by $$w_f = \begin{bmatrix} y_{0,l}^{(f)} & y_{1,l}^{(f)} & \ldots & y_{N_3-1,l}^{(f)} \end{bmatrix}^T,$$

where $y_{t,l}^{(f)} =$ $e^{j\frac{2\pi n_{3,l}^{(f)}}{N_3}}$ and $n_{3,l} = [n_{3,l}^{(0)}, \ldots, n_{3,l}^{(M-1)}]$ where $n_{3,l}^{(f)} \in \{0, 1, \ldots, N_3 - 1\}$.

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos\frac{\pi(2m+1)n}{2K}, & n = 1, \ldots K-1 \end{cases},$$

and $K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \quad (5)$$

where $A=W_1$ corresponds to the Rel. 15 $W_1$ in Type II CSI codebook [REF8], and $B=W_f$.

The $C_l=\tilde{W}_2$ matrix consists of all the required linear combination coefficients (e.g., amplitude and phase or real or imaginary). Each reported coefficient ($c_{l,i,f}=p_{l,i,f}\phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to {2, 3, 4}. If multiple values for A are supported, then one value is configured via higher layer signaling. In another example, the amplitude coefficient ($p_{l,i,f}$) is reported as $p_{l,i,f}=p_{l,i,f}^{(1)} p_{l,i,f}^{(2)}$ where $p_{l,i,f}^{(1)}$ is a reference or first amplitude which is reported using a A1-bit amplitude codebook where A1 belongs to {2, 3, 4}, and $p_{l,i,f}^{(2)}$ is a differential or second amplitude which is reported using a A2-bit amplitude codebook where A2≤A1 belongs to {2, 3, 4}.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and β is higher layer configured. The remaining $2LM-K_{NZ}$ coefficients that are not reported by the UE are assumed to be zero. The following quantization scheme is used to quantize/report the $K_{NZ}$ NZ coefficients.

The UE reports the following for the quantization of the NZ coefficients in $\tilde{W}_2$ A X-bit indicator for the strongest coefficient index (i*, f*), where $X=\lceil \log_2 K_{NZ} \rceil$ or $\lceil \log_2 2L \rceil$.

Strongest coefficient $c_{l,i^*,f^*}=1$ (hence its amplitude/phase are not reported)

Two antenna polarization-specific reference amplitudes is used.

For the polarization associated with the strongest coefficient $c_{l,i^*,f^*}=1$, since the reference amplitude $p_{l,i,f}^{(1)}=1$, it is not reported For the other polarization, reference amplitude $p_{l,i,f}^{(1)}$ is quantized to 4 bits The 4-bit amplitude alphabet is $$\left\{1,\left(\frac{1}{2}\right)^{\frac{1}{4}},\left(\frac{1}{4}\right)^{\frac{1}{4}},\left(\frac{1}{8}\right)^{\frac{1}{4}},\ldots,\left(\frac{1}{2^{14}}\right)^{\frac{1}{4}}\right\}.$$

For $\{c_{l,i,f}, (i, f) \neq (i^*, f^*)\}$:

For each polarization, differential amplitudes $p_{l,i,f}^{(2)}$ of the coefficients calculated relative to the associated polarization-specific reference amplitude and quantized to 3 bits The 3-bit amplitude alphabet is $$\left\{1,\frac{1}{\sqrt{2}},\frac{1}{2},\frac{1}{2\sqrt{2}},\frac{1}{4},\frac{1}{4\sqrt{2}},\frac{1}{8},\frac{1}{8\sqrt{2}}\right\}.$$

Note: The final quantized amplitude $p_{l,i,f}$ is given by $p_{l,i,f}^{(1)} \times p_{l,i,f}^{(2)}$ Each phase is quantized to either 8PSK ($N_{ph}=8$) or 16PSK ($N_{ph}=16$) (which is configurable).

For the polarization $r^* \in \{0,1\}$ associated with the strongest coefficient $c_{l,i^*,f^*}$, we have $$r^* = \left\lfloor \frac{i^*}{L} \right\rfloor$$

and the reference amplitude $p_{l,i,f}^{(1)}=p_{l,r^*}^{(1)}=1$. For the other polarization $r \in \{0,1\}$ and $r \neq r^*$, we have $$r = \left(\left\lfloor \frac{i^*}{L} \right\rfloor + 1\right)$$

mod 2 and the reference amplitude $p_{l,i,f}^{(1)}=p_{l,r}^{(1)}$ is quantized (reported) using the 4-bit amplitude codebook mentioned above.

A UE can be configured to report M FD basis vectors. In one example, $$M = \left\lceil p \times \frac{N_3}{R} \right\rceil,$$

where R is higher-layer configured from {1,2} and p is higher-layer configured from $$\left\{\frac{1}{4},\frac{1}{2}\right\}.$$

In one example, the p value is higher-layer configured for rank 1-2 CSI reporting. For rank >2 (e.g., rank 3-4), the p value (denoted by $v_0$) can be different. In one example, for rank 1-4, (p, $v_0$) is jointly configured from $$\left\{\left(\frac{1}{2},\frac{1}{4}\right),\left(\frac{1}{4},\frac{1}{4}\right),\left(\frac{1}{4},\frac{1}{8}\right)\right\},$$

i.e., $$M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3=N_{SB} \times R$ where $N_{SB}$ is the number of SBs for CQI reporting. In the rest of the disclosure, M is replaced with $M_v$ to show its dependence on the rank value v, hence p is replaced with $p_v$, $v \in \{1,2\}$ and $v_0$ is replaced with $p_v$, $v \in \{3,4\}$.

A UE can be configured to report $M_v$ FD basis vectors in one-step from $N_3$ basis vectors freely (independently) for each layer $l \in \{0, 1, \ldots, v-1\}$ of a rank v CSI reporting. Alternatively, a UE can be configured to report $M_v$ FD basis vectors in two-step as follows.

In step 1, an intermediate set (InS) comprising $N_3' < N_3$ basis vectors is selected/reported, wherein the InS is common for all layers.

In step 2, for each layer $l \in \{0, 1, \ldots, v-1\}$ of a rank v CSI reporting, M FD basis vectors are selected/reported freely (independently) from $N_3'$ basis vectors in the InS.

In one example, one-step method is used when $N_3 \leq 19$ and two-step method is used when $N_3 > 19$. In one example, $N_3' = \lceil \alpha M \rceil$ where $\alpha > 1$ is either fixed (to 2 for example) or configurable.

The codebook parameters used in the DFT based frequency domain compression (eq. 5) are (L, $p_v$ for $v \in \{1,2\}$, $p_v$ for $v \in \{3,4\}$, $\beta$, $\alpha$, $N_{ph}$). In one example, the set of values for these codebook parameters are as follows.

L: the set of values is {2,4} in general, except $L \in \{2,4,6\}$ for rank 1-2, 32 CSI-RS antenna ports, and R=1.

(p for $v \in \{1,2\}$, $p_v$ for $v \in \{3,4\}$)

$$\in \left\{\left(\frac{1}{2},\frac{1}{4}\right),\left(\frac{1}{4},\frac{1}{4}\right),\left(\frac{1}{4},\frac{1}{8}\right)\right\}.$$

$$\beta \in \left\{\frac{1}{4},\frac{1}{2},\frac{3}{4}\right\}.$$

$\alpha \in \{1.5,2,2.5,3\}$ $N_{ph} \in \{8,16\}$.

In another example, the set of values for these codebook parameters are as follows: $\alpha=2$, $N_{ph}=16$, and as in Table 1, where the values of L, $\beta$ and $p_v$ are determined by the higher layer parameter paramCombination-r17. In one example, the UE is not expected to be configured with paramCombination-r17 equal to 3, 4, 5, 6, 7, or 8 when $P_{CSI-RS}=4$, 7 or 8 when number of CSI-RS ports $P_{CSI-RS}<32$, 7 or 8 when higher layer parameter typeII-RI-Restriction-r17 is configured with $r_i=1$ for any $i>1$, 7 or 8 when R=2.

The bitmap parameter typeII-RI-Restriction-r17 forms the bit sequence $r_3$, $r_2$, $r_1$, $r_0$ where $r_0$ is the LSB and $r_3$ is the MSB. When $r_i$ is zero, $i \in \{0, 1, \ldots, 3\}$, PMI and RI reporting are not allowed to correspond to any precoder associated with v=i+1 layers. The parameter R is configured with the higher-layer parameter numberOfPMISubbandsPerCQISubband-r17. This parameter controls the total number of precoding matrices $N_3$ indicated by the PMI as a function of the number of subbands in csi-ReportingBand, the subband size configured by the higher-level parameter subbandSize and of the total number of PRBs in the bandwidth part.

TABLE 1

| paramCombination-r17 | L | $p_v$ $v \in \{1, 2\}$ | $p_v$ $v \in \{3, 4\}$ | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

The above-mentioned framework (equation 5) represents the precoding-matrices for multiple ($N_3$) FD units using a linear combination (double sum) over 2L SD beams and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows.

$$W = A_l C_l B_l^H = W_1 \tilde{W}_2 W_t^H, \quad \text{(equation 5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The rest of disclosure is applicable to both space-frequency (equation 5) and space-time (equation 5A) frameworks.

In general, for layer l=1, ..., v, where v is the rank value reported via RI, the pre-coder (cf. equation 5 and equation 5A) includes some of or all of the codebook components summarized in Table 2.

TABLE 2

Codebook components

| Index | Components | Description |
|---|---|---|
| 0 | L | number of SD beams |
| 1 | $M_v$ | number of FD/TD beams |
| 2 | $\{a_i\}_{i=0}^{L-1}$ | set of SD beams comprising columns of $A_l$ |
| 3 | $\{b_{l,f}\}_{f=0}^{M_v-1}$ | set of FD/TD beams comprising columns of $B_l$ |
| 4 | $\{x_{l,i,f}\}$ | bitmap indicating the indices of the non-zero (NZ) coefficients |
| 5 | $SCI_l$ | Strongest coefficient indicator for layer l |
| 6 | $\{p_{l,i,f}\}$ | amplitudes of NZ coefficients indicated via the bitmap |
| 7 | $\{\phi_{l,i,f}\}$ | phases of NZ coefficients indicated via the bitmap |

Let $P_{CSIRS,SD}$ and $P_{CSIRS,FD}$ be number of CSI-RS ports in SD and FD, respectively. The total number of CSI-RS ports is $P_{CSIRS,SD} \times P_{CSIRS,FD} = C_{SIRS}$. Each CSI-RS port can be beam-formed/pre-coded using a pre-coding/beam-forming vector in SD or FD or both SD and FD. The pre-coding/beam-forming vector for each CSI-RS port can be derived based on UL channel estimation via SRS, assuming (partial) reciprocity between DL and UL channels. Since CSI-RS ports can be beam-formed in SD as well as FD, the Rel. 15/16 Type II port selection codebook can be extended to perform port selection in both SD and FD followed by linear combination of the selected ports. In the rest of the disclosure, some details pertaining to the port selection codebook for this extension are provided.

In the rest of disclosure, the terms 'beam' and 'port' are used interchangeably and they refer to the same component of the codebook. For brevity, beam/port or port/beam is used in this disclosure.

In one embodiment A.1, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}=Q$. In another example, $P_{CSIRS} \geq Q$. Here, $Q = P_{CSIRS,SD} \times P_{CSIRS,FD}$. The CSI-RS ports can be beamformed in SD or/and FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for each FD unit $t \in \{0, 1, \ldots, N_3-1\}$ (together with the beamforming used to beamformed CSI-RS). In one example, $P_{CSIRS,SD} \in \{4,8,12,16,32\}$ or $\{2,4,8,12,16,32\}$. In one example, $P_{CSIRS,SD}$ and $P_{CSIRS,FD}$ are such that their product $Q = P_{CSIRS,SD} \times P_{CSIRS,FD} \in \{4,8,12,16,32\}$ or $\{2,4,8,12,16,32\}$.

Figure 12:
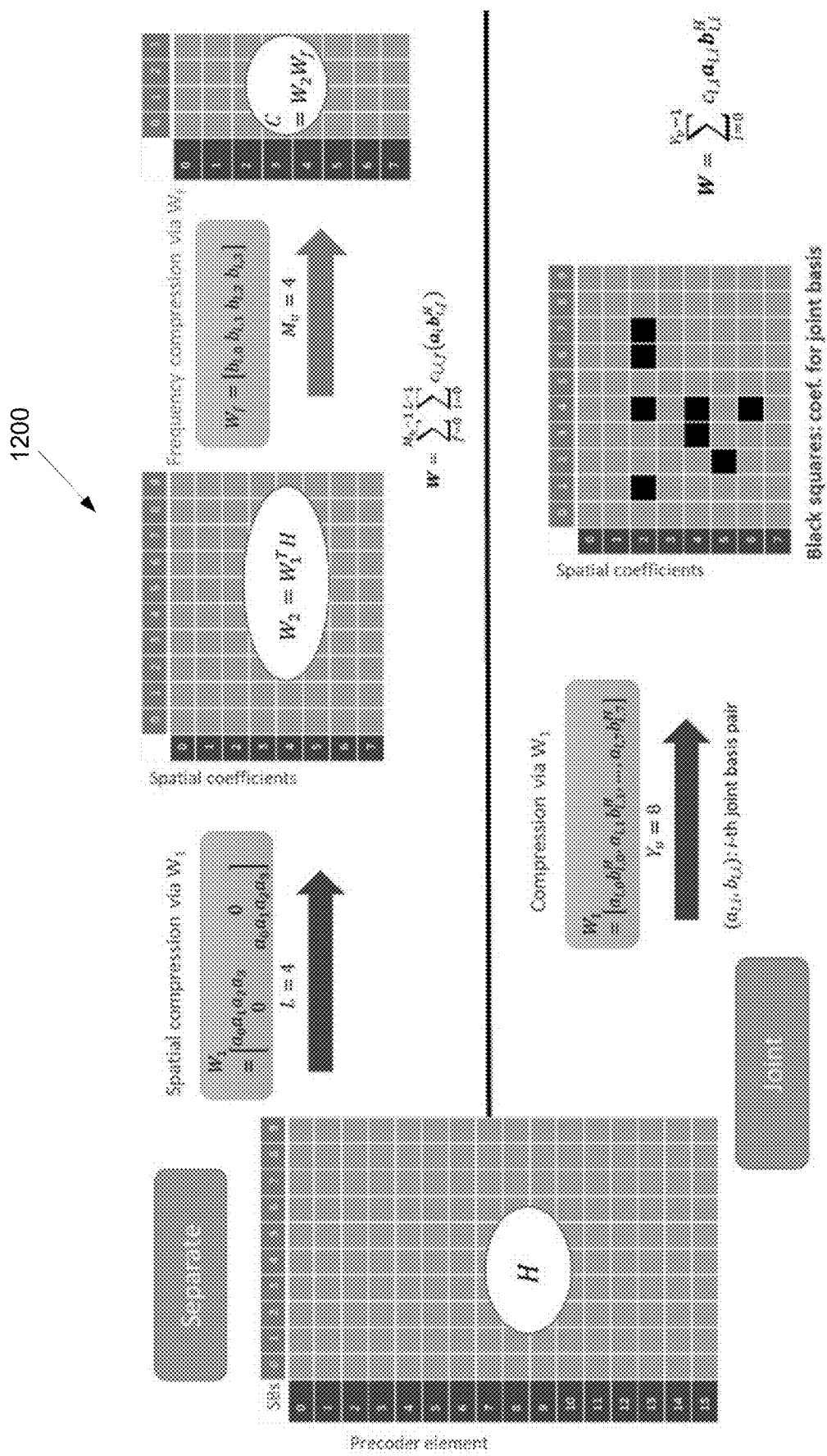
FIG. 12 illustrates an example of a port selection codebook that facilitates independent (separate) port selection across SD and FD, and that also facilitates joint port selection across SD and FD according to embodiments of the present disclosure.

FIG. 12 illustrates an example of a new port selection codebook that facilitates independent (separate) port selection across SD and FD, and that also facilitates joint port selection across SD and FD 1200 according to embodiments of the disclosure. The embodiment of a new port selection codebook that facilitates independent (separate) port selection across SD and FD, and that also facilitates joint port selection across SD and FD 1200 illustrated in FIG. 12 is for illustration only. FIG. 12 does not limit the scope of this disclosure to any particular implementation of the example of a new port selection codebook that facilitates independent (separate) port selection across SD and FD, and that also facilitates joint port selection across SD and FD 1200.

The new port selection codebook facilitates independent (separate) port selection across SD and FD. This is illustrated in the top part of FIG. 12.

For layer l=1, ..., v, where v is the rank value reported via RI, the pre-coder (cf. equation 5 and equation 5A) includes the codebook components (indicated via PMI) summarized in Table 3. The parameters L and $M_l$ are either fixed or configured (e.g., via RRC).

TABLE 3

Codebook components

| Index | Components | Description |
|---|---|---|
| 0 | $\{a_i\}_{i=0}^{L-1}$ | set of SD beams/ports comprising columns of $A_l$ |
| 1 | $\{b_{l,f}\}_{f=0}^{M_v-1}$ | set of FD/TD beams/ports comprising columns of $B_l$ |
| 2 | $\{x_{l,i,f}\}$ | bitmap indicating the indices of the non-zero (NZ) coefficients |
| 3 | $SCI_l$ | an indicator indicating an index $(i_1^*, f_l^*)$ of the strongest coefficient for layer l |
| 4 | $p_{l,r}^{(1)}$ | reference amplitude |
| 5 | $\{p_{l,i,f}\}$ | amplitudes of NZ coefficients indicated via the bitmap |
| 6 | $\{\phi_{l,i,f}\}$ | phases of NZ coefficients indicated via the bitmap |

In one embodiment A.2, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}=Q$. In another example, $P_{CSIRS} \geq Q$. Here, $Q=P_{CSIRS,SD} \times P_{CSIRS,FD}$. The CSI-RS ports can be beamformed in SD or/and FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for each FD unit $t \in \{0, 1, \ldots, N_3-1\}$ (together with the beamforming used to beamform CSI-RS). In one example, $P_{CSIRS,SD} \in \{4,8,12,16,32\}$ or $\{2,4,8,12,16,32\}$. In one example, $P_{CSIRS,SD}$ and $P_{CSIRS,FD}$ are such that their product $Q=P_{CSIRS,SD} \times P_{CSIRS,FD} \in \{4,8,12,16,32\}$ or $\{2,4,8,12,16,32\}$.

The new port selection codebook facilitates joint port selection across SD and FD. This is illustrated in the bottom part of FIG. 14. The codebook structure is similar to Rel. 15 NR Type II codebook comprising two main components.

$W_1$: to select $Y_v$ out of $P_{CSI-RS}$ SD-FD port pairs jointly
In one example, $Y_v \leq P_{CSI-RS}$ (if the port selection is independent across two polarizations or two groups of antennas with different polarizations)
In one example, $$Y_v \leq \frac{P_{CSI-RS}}{2}$$

(if the port selection is common across two polarizations or two groups of antennas with different polarizations)

$W_2$: to select coefficients for the selected $Y_v$ SD-FD port pairs.

In one example, the joint port selection (and its reporting) is common across multiple layers (when v>1). In one example, the joint port selection (and its reporting) is independent across multiple layers (when v>1). The reporting of the selected coefficients is independent across multiple layers (when v>1).

For layer l=1, ..., v, where v is the rank value reported via RI, the pre-coder (cf. equation 5 and equation 5A) includes the codebook components (indicated via PMI) summarized in Table 4. The parameter $Y_v$ is either fixed or configured (e.g., via RRC).

TABLE 4

Codebook components

| Index | Components | Description |
|---|---|---|
| 0 | $\{(a_{l,i}, b_{l,i})\}_{i=0}^{Y_v-1}$ | set of selected (SD, FD/TD) beam/port pairs comprising columns of $A_l$ and $B_l$ |
| 1 | $\{x_{l,i}\}$ | bitmap indicating the indices of the non-zero (NZ) coefficients |
| 2 | $SCI_l$ | an indicator indicating an index $i_l^*$ of the strongest coefficient for layer l |
| 3 | $p_{l,r}^{(1)}$ | reference amplitude |
| 4 | $\{p_{l,i}\}$ | amplitudes of NZ coefficients indicated via the bitmap |
| 5 | $\{\phi_{l,i}\}$ | phases of NZ coefficients indicated via the bitmap |

In one embodiment I, a UE is configured with higher layer parameter codebookType set to 'typeII-PortSelection-r17' for CSI reporting based on a new (Rel. 17) Type II port selection codebook which has a component $W_1$ for port selection (as described in embodiment A.1 and A.2). The details about the component $W_1$ is according to at least one of the following embodiments.

In one embodiment I.1, the size of the port selection matrix $W_1$ is determined according to at least one of the following examples.

In one example I.1.1, the port selection matrix $W_1$ is such that the port selection operation is common across two antenna polarizations (assuming a dual-polarized antenna ports at the gNB). The first half of the antenna ports corresponds to one antenna polarization, and the second half of the antenna ports corresponds to another antenna polarization. Since the port selection is common (the same) across two polarizations, this selection is from $$\frac{P_{CSIRS}}{2}$$

ports (comprising one of the two polarizations), and hence $W_1$ can be expressed as a block-diagonal matrix $$W_1 = \begin{bmatrix} X & 0 \\ 0 & X \end{bmatrix},$$

where X is a diagonal block with size $$\frac{N_{CSIRS}}{2} \times \frac{K_1}{2},$$

each column of X is a length $$\frac{N_{CSIRS}}{2} \times 1$$

selection vector having a "1" at the entry corresponding to the selected port location, and "0"s at the rest of the entries. Note when a port with index $$i \in \left\{01, \ldots, \frac{P_{CSIRS}}{2} - 1\right\}$$

is selected, then a corresponding port with index $$i + \frac{P_{CSIRS}}{2}$$

is also selected, since i and $$i + \frac{P_{CSIRS}}{2}$$

are indices of antenna ports that are co-located, but have different polarizations (e.g., +45 and −45). In one example, the port selection block X comprises columns that correspond to $K_1/2$ port selection vectors $\{v_m\}$ and $$m \in \left\{i_0, \ldots, i_{\frac{K_1}{2}-1}\right\}$$

is a set of indices of port selection vectors, where $v_m$ is a $P_{CSI-RS}/2$-element column vector containing a value of 1 in element (m mod $P_{CSI-RS}/2$) and zeros elsewhere (where the first element is element 0).

In one example I.1.2, the port selection matrix $W_1$ is such that the port selection operation is independent across two antenna polarizations (assuming a dual-polarized antenna ports at the gNB). That is, the port selection is from $P_{CSIRS}$ ports, and $W_1$=X where X is a size $N_{CSIRS} \times K_1$ port selection matrix whose each column is a length $N_{CSIRS} \times 1$ selection vector having a "1" at the entry corresponding to the selected port location, and "0"s at the rest of the entries. In one example, the port selection block X comprises columns that correspond to $K_1$ port selection vectors $\{v_m\}$ and $m \in \{i_0, \ldots, i_{K_1-1}\}$ is a set of indices of port selection vectors, where $v_m$ is a $P_{CSI-RS}$-element column vector containing a value of 1 in element (m mod $P_{CSI-RS}$) and zeros elsewhere (where the first element is element 0).

In one example, $K_1$=2L, or equivalently, $$\frac{K_1}{2} = L$$

for example I.1.1 and $K_1$=L for example I.1.2 (cf. the notation used in Rel. 15/16 Type II and enhanced Type II codebooks). In one example, $K_1$ (or L) is configured to the UE, e.g., via RRC or/and MAC CE or/and DCI. In one example, $K_1$ (or L) is reported by the UE from a set of values (that can be fixed or configured to the UE or reported by the UE in its capability reporting). In one example, the set of value(s) of $K_1$ (or L) that the UE supports is reported by the UE in its capability reporting. In one example, the UE is configured with at least one value of $K_1$ (or L) subject to the UE capability reporting.

In one embodiment I.2, the component $W_1$ can be turned OFF (i.e., port selection is not needed/reported) or ON (port selection is reported). When turned OFF, $W_1$ can be a fixed matrix, for example, $N_{CSIRS} \times N_{CSIRS}$ identity matrix (implying $K_1$=$P_{CSIRS}$ and that all ports are selected), where $N_{CSIRS}$ is the number of CSI-RS ports the PMI reporting is configured across (either within one NZP CSI-RS resource or across multiple NZP CSI-RS resources). In one example, when $K_1$=$\alpha P_{CSIRS}$, the port selection is turned OFF by setting/configuring $\alpha$=1. At least one of the following examples is used/configured for turning OFF/ON.

In one example I.2.1, the component $W_1$ is turned OFF/ON via a dedicated (explicit) signaling. For example, a higher layer parameter can be used for turning OFF/ON (e.g., $\alpha$=1). Or, a MAC CE based indication can be used for turning OFF/ON. Or, a DCI based indication can be used for turning OFF/ON. Also, either a dedicated parameter/field is for this signaling or the signaling is joint with another parameter/field.

In one example I.2.2, the component $W_1$ is turned OFF/ON via an implicit signaling.

In one example I.2.2.1, the UE is configured with $P_{CSIRS}$ whose value is used to determine whether the component $W_1$ is turned OFF or ON. For example, when $P_{CSIRS}$ is small, e.g., $P_{CSIRS} \leq t$, the component is turned OFF; otherwise, it is turned ON. The parameter t is a threshold, which can be fixed, e.g., 4 or 8, or configured (via RRC or/and MAC CE or/and DCI).

In one example I.2.2.2, the component $W_1$ is turned OFF or ON based on the value of $K_1$=L or $\alpha$=1 which is configured to the UE (details as explained above). For example, when $$L = \frac{P_{CSIRS}}{2}$$

or when L=$P_{CSIRS}$, the component $W_1$ is turned OFF; otherwise (when $$L < \frac{P_{CSIRS}}{2}$$

or when L<$P_{CSIRS}$), it is turned ON.

In one example I.2.2.3, the component $W_1$ is turned OFF or ON based on the value of max rank which is configured to the UE. For example, when max rank$\leq$t, the component $W_1$ is turned OFF; otherwise, it is turned ON. The parameter t is a threshold, which can be fixed, e.g., 2, or configured (via RRC or/and MAC CE or/and DCI).

In one example I.2.2.4, the component $W_1$ is turned OFF or ON based on the value of rank (v). For example, when rank≤t, the component $W_1$ is turned OFF; otherwise, it is turned ON. The parameter t is a threshold, which can be fixed, e.g., 2, or configured (via RRC or/and MAC CE or/and DCI).

In one example I.2.3, the component $W_1$ is turned OFF/ON based on UE capability reporting. For example, the UE reports in its capability reporting whether it can capable of supporting the component $W_1$ or not. Then the any signaling about the component $W_1$ is subject to the UE capability reporting.

In one example I.2.4, the component $W_1$ of the codebook can be turned ON/OFF by gNB according to at least one of the following examples.

In one example, there are two separate parameters, a first parameter for turning $W_1$ ON/OFF, and a second parameter for configuring $W_1$ (when turned ON). The first parameter is always provided. The second parameter may be provided only when the $W_1$ is turned ON. The first parameter can be configured via RRC or/and MAC CE or/and DCI. The second parameter can be configured via RRC or/and MAC CE or/and DCI.

In another example, there is one joint parameter, which takes a value to turn $W_1$ off, and at least one another value to turn the $W_1$ ON and provide $W_1$ jointly. The joint parameter can be configured via RRC or/and MAC CE or/and DCI.

In one embodiment I.3, when the UE is allowed to report a rank (or number of layers) value v>1 (e.g., when the higher layer parameter rank-restriction allows rank>1 CSI reporting), the component $W_1$ is determined/reported according to at least one of the following examples. When multiple of the following examples is supported, then one of the support examples can be configured to the UE (e.g., via RRC or/and MAC CE or/and DCI). This configuration can be subject to the UE capability reporting about rank>1 CSI reporting.

In one example I.3.1, the port selection matrix $W_1$ is common (the same) for all layers l∈{1, ..., v}, i.e., only one port selection matrix $W_1$ is determined/reported by the UE regardless of the rank v value.

In one example I.3.2, the port selection matrix $W_1$ is common (the same) for a layer pair (l, l+1) where l∈{1, 3, ..., v−1}, i.e., one port selection matrix $W_1$ is determined/reported by the UE for each layer pair (1,2), (3,4) etc.

In one example I.3.3, the port selection matrix $W_1$ is common (the same) for each subset of layers. There could be multiple subsets of layer, which can be fixed or configured.

In one example I.3.4, the port selection matrix $W_1$ is independent (separate) for all layers, i.e., one port selection matrix $W_1$ is determined/reported by the UE for each layer l=1, ..., v.

In one example I.3.5, the port selection matrix $W_1$ is according to example I.3.1 or example I.3.4 (or example I.3.2) depending on a configuration (e.g., RRC or/and MAC CE or/and DCI).

In one example I.3.6, the port selection matrix $W_1$ is according to example I.3.1 or example I.3.4 (or example I.3.2) depending on a condition. At least one of the following examples is used for the condition.

In one example, the condition is based on number of ports $P_{CSIRS}$, for example, example I.3.1 is used when $P_{CSIRS}$>t, and example I.3.4 is used when $P_{CSIRS}$≤t, where t can be fixed (e.g., to 4 or 8) or configured.

In one example, the condition is based on $K_1$=L, for example, example I.3.1 is used when L>t, and example I.3.4 is used when L≤t, where t can be fixed (e.g., to 4) or configured.

In one example, the condition is based on max rank value, for example, example I.3.1 is used when max rank>t, and example I.3.4 is used when max rank≤t, where t can be fixed (e.g., to 2) or configured.

In one example, the condition is based on rank value, for example, example I.3.1 is used when rank>t, and example I.3.4 is used when rank≤t, where t can be fixed (e.g., to 2) or configured.

In one embodiment I.4, when the UE is allowed to report a rank (or number of layers) value v>1 (e.g., when the higher layer parameter rank-restriction allows rank>1 CSI reporting), the component $W_1$ is determined/reported according to example I.3.4. In particular, for each layer l, a set of ports $S_l$ is selected/determined/reported such that at least one of the following conditions is satisfied.

In one example I.4.1, $S_l$ and $S_{l'}$ are two disjoint sets of ports (i.e., they don't have any common ports) for any l, l'∈{1, ..., v} such that l≠l'. This implies that the transmission is non-coherent across layers.

In one example I.4.2, $S_l$ and $S_{l'}$ can have common ports (i.e., there is no restriction in port selection across layers).

In one embodiment I.5, the component $W_1$ (when reported) is reported using an indicator (e.g., a PMI component such as $i_{1,2}$), where the indicator is determined according to at least one of the following examples.

In one example I.5.1, the indicator corresponds to a bitmap (bit sequence) $b_0 b_1 \ldots b_{X-1}$ where $$X = \frac{P_{CSIRS}}{2}$$

(cf. example I.1.1) or $X=P_{CSIRS}$ (cf. example I.1.2).

In one example, a bit value $b_i=1$ indicates port i being selected and a bit value $b_i=0$ indicates port i not being selected. The number of "1"s in the bitmap is $$\frac{K_1}{2}$$

(cf. example I.1.1) or $K_1$ (cf. example I.1.2).

In one example, a bit value $b_i=0$ indicates port i being selected and a bit value $b_i=1$ indicates port i not being selected. The number of "0"s in the bitmap is $$\frac{K_1}{2}$$

(cf. example I.1.1) or $K_1$ (cf. example I.1.2).

In one example I.5.2, the indicator corresponds to a combinatorial indexing indicating a value from $$\left\lceil \log_2 \binom{A}{B} \right\rceil \text{ bits,}$$

which requires $$\left\{0, 1, \ldots, \binom{A}{B} - 1\right\},$$

where $$A = \frac{P_{CSIRS}}{2} \text{ and } B = \frac{K_1}{2} = L$$

(cf. example I.1.1) or $A=P_{CSIRS}$ and $B=K_1$ (cf. example I.1.2).

When the component $W_1$ (when reported) is reported independently for each layer, the indicator is reported for each layer, whose payload is according one of example I.5.1 and I.5.2.

When the port selection is reported according to example I.5.2, then the UE performs the port selection as follows.

The L vectors, $v_{m^{(i)}}$, $i=0, 1, \ldots, L-1$, are identified by, where $v_{m^{(i)}}$ is a $P_{CSI\text{-}RS}/2$-element column vector containing a value of 1 in the element of index $m^{(i)}$ and zeros elsewhere (where the first element is the element of index 0)

$$m = [m^{(0)} \ldots m^{(L-1)}]$$

$$m^{(i)} \in \left\{0, 1, \ldots, \frac{P_{CSI\text{-}RS}}{2} - 1\right\}$$

which are indicated by the PMI index $i_{1,2}$, where $$i_{1,2} \in \left\{0, 1, \ldots, \binom{P_{CSI\text{-}RS}/2}{L} - 1\right\}.$$

The elements of m are found from $i_{1,2}$ using $C(x,y)$ as defined in Table 5 and the algorithm:

$s_{-1} = 0$
for $i = 0, \ldots, L - 1$

Find the largest $x^* \in \left\{L - 1 - i, \ldots, \frac{P_{CSI\text{-}RS}}{2} - 1 - i\right\}$ in Table 5, such that $i_{1,2} - s_{i-1} \geq C(x^*, L - i)$
$e_i = C(x^*, L - i)$
$s_i = s_{i-1} + e_i$
$m^{(i)} = \frac{P_{CSI\text{-}RS}}{2} - 1 - x^*$.

When $m^{(i)}$ are known, $i_{1,2}$ is found using $$i_{1,2} = \sum_{i=0}^{L-1} C\left(\frac{P_{CSI\text{-}RS}}{2} - 1 - m^{(i)}, L - i\right),$$

where $C(x, y)$ is given in Table 5, and where the indices $i=0, \ldots, L-1$ are assigned such that $m^{(i)}$ increases as i increases.

If $$\alpha = 1, m^{(i)} = i, i = 0, 1, \ldots, \frac{P_{CSI\text{-}RS}}{2} - 1,$$

and $i_{1,2}$ is not reported. This implies that the port selection is turned OFF (details as explained above).

TABLE 5

Combinatorial coefficients C(x, y)

| x | y=1 | 2 | 3 | 4 | 5 | 6 | 7 | 8 | 9 | 10 | 11 | 12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 |
| 2 | 2 | 1 | 0 | 0 | 0 | 0 | 0 | 0 | 0 | 0 | 0 | 0 |
| 3 | 3 | 3 | 1 | 0 | 0 | 0 | 0 | 0 | 0 | 0 | 0 | 0 |
| 4 | 4 | 6 | 4 | 1 | 0 | 0 | 0 | 0 | 0 | 0 | 0 | 0 |
| 5 | 5 | 10 | 10 | 5 | 1 | 0 | 0 | 0 | 0 | 0 | 0 | 0 |
| 6 | 6 | 15 | 20 | 15 | 6 | 1 | 0 | 0 | 0 | 0 | 0 | 0 |
| 7 | 7 | 21 | 35 | 35 | 21 | 7 | 1 | 0 | 0 | 0 | 0 | 0 |
| 8 | 8 | 28 | 56 | 70 | 56 | 28 | 8 | 1 | 0 | 0 | 0 | 0 |
| 9 | 9 | 36 | 84 | 126 | 126 | 84 | 36 | 9 | 1 | 0 | 0 | 0 |
| 10 | 10 | 45 | 120 | 210 | 252 | 210 | 120 | 45 | 10 | 1 | 0 | 0 |
| 11 | 11 | 55 | 165 | 330 | 462 | 462 | 330 | 165 | 55 | 11 | 1 | 0 |
| 12 | 12 | 66 | 220 | 495 | 792 | 924 | 792 | 495 | 220 | 66 | 12 | 1 |
| 13 | 13 | 78 | 286 | 715 | 1287 | 1716 | 1716 | 1287 | 715 | 286 | 78 | 13 |
| 14 | 14 | 91 | 364 | 1001 | 2002 | 3003 | 3432 | 3003 | 2002 | 1001 | 364 | 91 |
| 15 | 15 | 105 | 455 | 1365 | 3003 | 5005 | 6435 | 6435 | 5005 | 3003 | 1365 | 455 |
| 16 | 16 | 120 | 560 | 1820 | 4368 | 8008 | 11440 | 12870 | 11440 | 8008 | 4368 | 1820 |
| 17 | 17 | 136 | 680 | 2380 | 6188 | 12376 | 19448 | 24310 | 24310 | 19448 | 12376 | 6188 |
| 18 | 18 | 153 | 816 | 3060 | 8568 | 18564 | 31824 | 43758 | 48620 | 43758 | 31824 | 18564 |

In one embodiment I.6, when the value $K_1=2$ or $L=1$ (cf. example I.1.1), indicating a single port selection (per polarization) is used/configured, i.e., the component $W_1$ selects a single port (per polarization), then the other components of the codebook (such as $\tilde{W}_2$ and $W_f$) are determined/reported according to at least one of the following examples.

In one example I.6.1, the FD basis $W_f$ is determined/reported according to at least one of the following examples.

In one example, the FD basis $W_f$ has only one column, i.e., $M_v=1$.

In one example, the FD basis $W_f$ can have one or more than one columns, i.e., $M_v=1$ or $M_v>1$ (e.g., $M_v=2$). In one example, a value of $M_v$ is configured.

In one example, $M_v=1$ when $v>x$ and $M_v>1$ when $v\leq x$, where x is fixed, e.g., x=2.

In one example I.6.2, the coefficient matrix $\tilde{W}_2$ is determined/reported according to at least one of the following examples.

In one example, there are $K_1=2L=2$ coefficients (per layer), one of the two coefficients is fixed to 1, whose index is reported (e.g., via 1-bit indication), but amplitude/phase is not reported; and the other coefficient is reported. In one example, only phase of the other coefficient is reported. In one example, both amplitude and phase of the other coefficient are reported. So, the UE reports indicator(s) for the strongest coefficient, and amplitude/phase of the other coefficient.

In one example, there are $K_1=2L=2$ coefficients (per layer) that are reported. In one example, only phase of the two coefficients are reported. In one example, both amplitude and phase of the two coefficients are reported. So, the UE reports indicator(s) for the amplitude/phase of the two coefficients.

In one example, the phase of the reported coefficients is always reported. But, the amplitude reporting can be turned ON or OFF, e.g., via higher layer signaling.

In one embodiment I.7, when the value $K_1=2$ or $L=1$ (cf. example I.1.1), and when rank $v>x$, where x is fixed (e.g., 1 or 2 or 4) or configured, then the CSI is determined/reported according to at least one of the following examples.

In one example I.7.1, the CSI reporting is not supported for $v>x$ (i.e., the UE is not expected to be configured with an allowed rank value greater than x). For rank value $v\leq x$, the CSI reporting is based on the codebook as explained in this disclosure.

In one example I.7.2, for rank value $v\leq x$, the CSI reporting is based on the codebook as explained in this disclosure, and for rank value $v>x$, the CSI reporting is based on the Rel. 15/16 NR codebook, e.g., Type I single panel codebook.

In one embodiment I.8, when rank $v>x$, where x is fixed (e.g., 1 or 2 or 4) or configured, then the CSI is determined/reported according to at least one of the following examples.

In one example I.8.1, the CSI reporting is not supported for $v>x$ (i.e., the UE is not expected to be configured with an allowed rank value greater than x). For rank value $v\leq x$, the CSI reporting is based on the codebook as explained in this disclosure.

In one example I.8.2, for rank value $v\leq x$, the CSI reporting is based on the codebook as explained in this disclosure, and for rank value $v>x$, the CSI reporting is based on the Rel. 15/16 NR codebook, e.g., Type I or Type II single panel codebook.

In one embodiment (II.1), when the UE is configured with CSI reporting for $P_{CSIRS}=4$ CSI-S ports based on the port selection codebook (as described in this disclosure), the port selection parameter $K_1$ or $\alpha$ (e.g., when $K_1=\alpha P_{CSIRS}$ or $\lceil \alpha P_{CSIRS} \rceil$) is configured/determined according to at least one of the following examples. In one example, $\alpha$ belongs to $$\left\{\frac{1}{2}, 1\right\} \text{ or } \left\{\frac{3}{4}, \frac{1}{2}, 1\right\}$$

is configured via by the higher layer parameter paramCombination-r17 indicating the values $\alpha$, M and $\beta$. In the following, $K_1<P_{CSIRS}$ or $\alpha<1$ refers to $$\alpha = \frac{1}{2} \text{ or } \alpha \in \left\{\frac{1}{2}, \frac{3}{4}\right\}.$$

In one example, $$\alpha = \frac{3}{4}$$

can't configured when $P_{CSIRS}=4$, or $P_{CSIRS}=12$, or $P_{CSIRS}\in\{4,12\}$. Or, equivalently, the UE is not expected to be configured with $$\alpha = \frac{3}{4}$$

(or parameter combinations with $$\alpha = \frac{3}{4})$$

when $P_{CSIRS}=4$, or $P_{CSIRS}=12$, or $P_{CSIRS}\in\{4,12\}$.

In one example (II.1.1), for 4 CSI-RS ports, $K_1<P_{CSIRS}$ or $\alpha<1$ (or parameter combinations with $K_1<P_{CSIRS}$ or $\alpha<1$) is not supported for all rank values, i.e., only $K_1=P_{CSIRS}$ or $\alpha=1$ (or parameter combinations with $K_1=P_{CSIRS}$ or $\alpha=1$) can be configured in this case. Or, equivalently, the UE is not expected to be configured with $K_1<P_{CSIRS}$ or $\alpha<1$ (or parameter combinations with $K_1<P_{CSIRS}$ or $\alpha<1$). Or, equivalently, the UE is expected to be configured with only $K_1=P_{CSIRS}$ or $\alpha=1$ (or parameter combinations with $K_1=P_{CSIRS}$ or $\alpha=1$).

In one example (II.1.2), for 4 CSI-RS ports and rank 3 or 4 CSI reporting (e.g., when rank 3 or 4 reporting is allowed by the rank or RI restriction via RRC), $K_1<P_{CSIRS}$ or $\alpha<1$ (or parameter combinations with $K_1<P_{CSIRS}$ or $\alpha<1$) is not supported, only $K_1=P_{CSIRS}$ or $\alpha=1$ (or parameter combinations with $K_1=P_{CSIRS}$ or $\alpha=1$) can be configured in this case.

In one example (II.1.2.1), if rank or RI restriction allows rank 1 or 2 (but not rank 3 or 4) CSI reporting, Any of $K_1<P_{CSIRS}$ or $\alpha<1$ (or parameter combinations with $K_1<P_{CSIRS}$ or $\alpha<1$), and $K_1=P_{CSIRS}$ or $\alpha=1$ (or parameter combinations with $K_1=P_{CSIRS}$ or $\alpha=1$) can be configured.

Or, equivalently, any value $K_1\leq P_{CSIRS}$ or $\alpha\leq 1$ (or parameter combinations with $K_1\leq P_{CSIRS}$ or $\alpha\leq 1$) can be configured.

Or, equivalently, the UE is expected to be configured with any of $K_1<P_{CSIRS}$ or $\alpha<1$ (or parameter combinations with $K_1 < P_{CSIRS}$ or $\alpha < 1$) and $K_1 = P_{CSIRS}$ or $\alpha = 1$ (or parameter combinations with $K_1 = P_{CSIRS}$ or $\alpha = 1$).

In one example (II.1.2.2), if rank or RI restriction allows rank 3 or 4 (but not rank 1 or 2) CSI reporting, $K_1 < P_{CSIRS}$ or $\alpha < 1$ (or parameter combinations with $K_1 < P_{CSIRS}$ or $\alpha < 1$) is not supported, i.e., only $K_1 = P_{CSIRS}$ or $\alpha = 1$ (or parameter combinations with $K_1 = P_{CSIRS}$ or $\alpha = 1$) can be configured in this case.

Or, equivalently, the UE is not expected to be configured with $K_1 < P_{CSIRS}$ or $\alpha < 1$ (or parameter combinations with $K_1 < P_{CSIRS}$ or $\alpha < 1$).

Or, equivalently, the UE is expected to be configured with only $K_1 = P_{CSIRS}$ or $\alpha = 1$ (or parameter combinations with $K_1 = P_{CSIRS}$ or $\alpha = 1$).

In one example (II.1.2.3), if rank or RI restriction allows both at least one from rank 1 and 2, and at least one from rank 3 and 4 CSI reporting,
$K_1 < P_{CSIRS}$ or $\alpha < 1$ (or parameter combinations with $K_1 < P_{CSIRS}$ or $\alpha < 1$) is not supported, i.e., only $K_1 = P_{CSIRS}$ or $\alpha = 1$ (or parameter combinations with $K_1 = P_{CSIRS}$ or $\alpha = 1$) can be configured in this case.

Or, equivalently, the UE is not expected to be configured with $K_1 < P_{CSIRS}$ or $\alpha < 1$ (or parameter combinations with $K_1 < P_{CSIRS}$ or $\alpha < 1$).

Or, equivalently, the UE is expected to be configured with only $K_1 = P_{CSIRS}$ or $\alpha = 1$ (or parameter combinations with $K_1 = P_{CSIRS}$ or $\alpha = 1$).

In one example (II.1.3), for 4 CSI-RS ports, the parameter $$\alpha \in \left\{\frac{1}{2}, 1\right\}$$

can be configured.

In one example (II.1.3.1), when $\alpha = 1$, rank 1-4 reporting is allowed, i.e., any of rank 1-4 is allowed by the rank or RI restriction via RRC; and when $$\alpha = \frac{1}{2},$$

only rank 1-2 reporting is allowed, i.e., only rank 1-2 is allowed by the rank or RI restriction via RRC. In other words, when rank or RI restriction allows rank 3 or 4 reporting, only $\alpha = 1$ can be configured (or the UE is expected to be configured with $\alpha = 1$); and when rank or RI restriction does not allow rank 3 or 4 reporting (or allows only rank 1 or 2 reporting), $\alpha = 1$ or $\frac{1}{2}$ can be configured.

In one example (II.1.3.2), only rank 1-2 is allowed by the rank or RI restriction via RRC for both $\alpha = 1$ or $\frac{1}{2}$. In other words, the UE is not expected to be configured with rank 3 or 4 (via rank or RI restriction). Or, the UE is expected to be configured with rank 1 or 2 (via rank or RI restriction).

In one embodiment (II.2), when the UE is configured with CSI reporting for $P_{CSIRS} = 4$ or 8 CSI-S ports based on the port selection codebook (as described in this disclosure), the port selection parameter $K_1$ or $\alpha$ (e.g., when $K_1 = \alpha P_{CSIRS}$ or $\lceil \alpha P_{CSIRS} \rceil$) is configured/determined according to at least one of the following examples. In one example, $\alpha$ belongs to $$\left\{\frac{1}{2}, 1\right\} \text{ or } \left\{\frac{3}{4}, \frac{1}{2}, 1\right\}.$$

In one example (II.2.1), for 4 or 8 (or 4 or 8 or 12) CSI-RS ports, $K_1 < P_{CSIRS}$ or $\alpha < 1$ (or parameter combinations with $K_1 < P_{CSIRS}$ or $\alpha < 1$) is not supported for all rank values, i.e., only $K_1 = P_{CSIRS}$ or $\alpha = 1$ (or parameter combinations with $K_1 = P_{CSIRS}$ or $\alpha = 1$) can be configured in this case. Or, equivalently, the UE is not expected to be configured with $K_1 < P_{CSIRS}$ or $\alpha < 1$ (or parameter combinations with $K_1 < P_{CSIRS}$ or $\alpha < 1$). Or, equivalently, the UE is expected to be configured with only $K_1 = P_{CSIRS}$ or $\alpha = 1$ (or parameter combinations with $K_1 = P_{CSIRS}$ or $\alpha = 1$).

In one example (II.2.2), for 4 or 8 (or 4 or 8 or 12) CSI-RS ports and rank 3 or 4 CSI reporting (e.g., when rank 3 or 4 reporting is allowed by the rank or RI restriction via RRC), $K_1 < P_{CSIRS}$ or $\alpha < 1$ (or parameter combinations with $K_1 < P_{CSIRS}$ or $\alpha < 1$) is not supported, only $K_1 = P_{CSIRS}$ or $\alpha = 1$ (or parameter combinations with $K_1 = P_{CSIRS}$ or $\alpha = 1$) can be configured in this case. At least one of examples II.1.2.1 through II.1.2.3 can be used/configured.

In one embodiment (III.1), the components of the port selection codebooks, as described in this disclosure, are reported via a PMI, where the PMI value corresponds to the codebook indices $i_1$ and $i_2$ where $$i_1 = \begin{cases} [i_{1,2} \; i_{1,6} \; i_{1,7,1} \; i_{1,8,1}] & v = 1 \\ [i_{1,2} \; i_{1,6} \; i_{1,7,1} \; i_{1,8,1} \; i_{1,7,2} \; i_{1,8,2}] & v = 2 \\ [i_{1,2} \; i_{1,6} \; i_{1,7,1} \; i_{1,8,1} \; i_{1,7,2} \; i_{1,8,2} \; i_{1,7,3} \; i_{1,8,3}] & v = 3 \\ [i_{1,2} \; i_{1,6} \; i_{1,7,1} \; i_{1,8,1} \; i_{1,7,2} \; i_{1,8,2} \; i_{1,7,3} \; i_{1,8,3} \; i_{1,7,4} \; i_{1,8,4}] & v = 4 \end{cases}$$

$$i_2 = \begin{cases} [i_{2,3,1} \; i_{2,4,1} \; i_{2,5,1}] & v = 1 \\ [i_{2,3,1} \; i_{2,4,1} \; i_{2,5,1} \; i_{2,3,2} \; i_{2,4,2} \; i_{2,5,2}] & v = 2 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3}] & v = 3 \\ [i_{2,3,1} \; i_{2,4,1} \; i_{2,5,1} \; i_{2,3,2} \; i_{2,4,2} \; i_{2,5,2} \; i_{2,3,3} \; i_{2,4,3} \; i_{2,5,3} \; i_{2,3,4} \; i_{2,4,4} \; i_{2,5,4}] & v = 4 \end{cases}$$

Where
- $i_{1,2}$: indicates indices of the port selection vectors comprising columns of $W_1$
- $i_{1,6}$: indicates indices of the frequency domain basis vectors comprising columns of $W_f$
- $i_{1,7,l}$: indicates a bitmap for layer l, indicating the location (indices) of the non-zero coefficients (NZC)
- $i_{1,8,l}$: indicates a strongest coefficient indicator (SCI) for layer l
- $i_{2,3,l}$: indicates reference amplitude for layer l
- $i_{2,4,l}$: indicates amplitudes of NZC for layer l
- $i_{2,5,l}$: indicates phases of NZC for layer l The corresponding codebooks for 1-4 layers are given in Table 6, where $v_{m^{(i)}}$ is a $P_{CSI-RS}/2$-element column vector containing a value of 1 in the element of index $m^{(i)}$ and zeros elsewhere (where the first element is the element of index 0), the quantities $y_t$ are given by $$y_t = [y_t^{(0)} \ldots y_t^{(M-1)}]$$

where $t=\{0, 1, \ldots, N_3-1\}$, is the index associated with the precoding matrix and where $$y_t^{(f)} = e^{j\frac{2\pi t n_3^{(f)}}{N_3}}$$

for $f=0, \ldots, M-1$, and the quantities $\varphi_{l,i,f}$ are given by $$\varphi_{l,i,f} = e^{j\frac{2\pi c_{l,i,f}}{16}}.$$

each FD unit $t \in \{0, 1, \ldots, N_3-1\}$ (together with the beamforming used to beamformed CSI-RS). In one example, $P_{CSIRS,SD} \in \{4,8,12,16,32\}$ or $\{2,4,8,12,16,32\}$. In one example, $P_{CSIRS,SD}$ and $P_{CSIRS,FD}$ are such that their product $Q = P_{CSIRS,SD} \times P_{CSIRS,FD} \in \{4,8,12,16,32\}$ or $\{2,4,8,12,16,32\}$.

The new port selection codebook facilitates independent (separate) port selection across SD and FD. This is illustrated in top part of FIG. 12.

In one example IV.1.1, this separate port selection corresponds to port selection only in SD via $W_1$ and no port selection in FD via $W_f$. The set of SD port selection vectors $\{a_i\}_{i=0}^{L-1}$ comprising columns of A. In one example, the SD port selection is common for the two antenna polarizations, i.e., one SD basis is used for both antenna polarizations. In another example, the SD port selection is independently for each of the two antenna polarizations. The value of L can be configured from $\{2, 4\}$ or $\{2, 3, 4\}$ or $\{2, 4, 6\}$ or $\{2, 4, 6, 8\}$.

In one example IV.1.2, this separate port selection corresponds to port selection in SD via $W_1$ and port selection in FD via $W_f$. The set of SD port selection vectors $\{a_i\}_{i=0}^{L-1}$ comprising columns of A. In one example, the SD port

TABLE 6

Codebook for 1-layer, 2-layer, 3-layer and 4-layer CSI reporting using antenna ports 3000 to 2999 + $P_{CSI-RS}$ Layers $v = 1$
$$W^{(1)}_{m,n_3,p_1^{(1)},p_1^{(2)},i_{2,5,1},t} = W^1_{m,n_3,p_1^{(1)},p_1^{(2)},i_{2,5,1},t}$$

$v = 2$
$$W^{(2)}_{m,n_3,p_1^{(1)},p_1^{(2)},i_{2,5,1},p_2^{(1)},p_2^{(2)},i_{2,5,2},t} = \frac{1}{\sqrt{2}}\left[W^1_{m,n_3,p_1^{(1)},p_1^{(2)},i_{2,5,1},t} \quad W^2_{m,n_3,p_2^{(1)},p_2^{(2)},i_{2,5,2},t}\right]$$

$$W^{(3)}_{m,n_3,p_1^{(1)},p_1^{(2)},i_{2,5,1},p_2^{(1)},p_2^{(2)},i_{2,5,2},p_3^{(1)},p_3^{(2)},i_{2,5,3},t} = \frac{1}{\sqrt{3}}\left[W^1_{m,n_3,p_1^{(1)},p_1^{(2)},i_{2,5,1},t} \quad W^2_{m,n_3,p_2^{(1)},p_2^{(2)},i_{2,5,2},t} \quad W^3_{m,n_3,p_3^{(1)},p_3^{(2)},i_{2,5,3},t}\right]$$

$v = 4$
$$W^{(4)}_{m,n_3,p_1^{(1)},p_1^{(2)},i_{2,5,1},p_2^{(1)},p_2^{(2)},i_{2,5,2},p_3^{(1)},p_3^{(2)},i_{2,5,3},p_4^{(1)},p_4^{(2)},i_{2,5,4},t} = \frac{1}{2}\left[W^1_{m,n_3,p_1^{(1)},p_1^{(2)},i_{2,5,1},t} \quad W^2_{m,n_3,p_2^{(1)},p_2^{(2)},i_{2,5,2},t} \quad W^3_{m,n_3,p_3^{(1)},p_3^{(2)},i_{2,5,3},t} \quad W^4_{m,n_3,p_4^{(1)},p_4^{(2)},i_{2,5,4},t}\right]$$

Where $W^l_{m,n_3,p_l^{(1)},p_l^{(2)},i_{2,5,l},t} = \frac{1}{\sqrt{\gamma_{t,l}}} \begin{bmatrix} \sum_{i=0}^{L-1} v_{m^{(i)}} p_{l,0}^{(1)} \sum_{f=0}^{M-1} y_t^{(f)} p_{l,i,f}^{(2)} \varphi_{l,i,f} \\ \sum_{i=0}^{L-1} v_{m^{(i)}} p_{l,1}^{(1)} \sum_{f=0}^{M-1} y_t^{(f)} p_{l,i+L,f}^{(2)} \varphi_{l,i+L,f} \end{bmatrix}$, $l = 1, 2, 3, 4$, $\gamma_{t,l} = \sum_{i=0}^{2L-1}\left(p_{l,\lfloor \frac{i}{L} \rfloor}^{(1)}\right)^2 \left|\sum_{f=0}^{M-1} y_t^{(f)} p_{l,i,f}^{(2)} \varphi_{l,i,f}\right|^2$ and the mappings from $i_1$ to m, $n_3$, and from $i_2$ to $i_{2, 5, 1}, i_{2, 5, 2}, i_{2, 5, 3}, i_{2, 5, 4}, p_1^{(1)}, p_2^{(1)}, p_3^{(1)}, p_4^{(1)}, p_1^{(2)}, p_2^{(2)}, p_3^{(2)}, p_4^{(2)}$, are as described in 5.2.2.2.6 of TS 38.214, including the ranges of the constituent indices of $i_1$ and $i_2$.

For coefficients with $k_{l,i,f}^{(3)}$, amplitude and phase are set to zero, i.e., $p_{l,i,f}^{(2)}=0$ and $\varphi_{l,i,f}=0$.

In one embodiment IV.1, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}=Q$. In another example, $P_{CSIRS} \geq Q$. Here, $Q=P_{CSIRS,SD} \times P_{CSIRS,FD}$. The CSI-RS ports can be beamformed in SD or/and FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for selection is common for the two antenna polarizations, i.e., one SD basis is used for both antenna polarizations. In another example, the SD port selection is independently for each of the two antenna polarizations. The value of L can be configured from $\{2,4\}$ or $\{2,3,4\}$ or $\{2,4,6\}$ or $\{2,4,6,8\}$.

For FD port selection, the set of FD port selection vectors $\{b_{l,f}\}_{f=0}^{M_v-1}$ comprise columns of $B_l$. In one example, $$M_v = \left\lceil p_v \frac{N_3}{R} \right\rceil$$

as in Rel. 16 enhanced Type II port selection codebook. In one example, the value of $M_v$ can be 1, in addition to the value of $M_v$ supported in Rel. 16 enhanced Type II port selection codebook. In one example, the value range of R is configured from $\{1, 2\}$ or $\{1, 2, 4\}$, or $\{2, 4\}$, or $\{1, 4\}$ or $\{1, 2, 4, 8\}$.

In one example IV.1.3, this separate port selection in both SD and FD is via $W_1$ in the codebook, and the corresponding precoding matrix (or matrices) is (are) given by $$W^l = W_1 W_2 = XC_l = \sum_{i=0}^{L-1} \sum_{f=0}^{M_v-1} c_{l,i,f} x_{l,i,f},$$

$$\text{or } W^l = W_1 W_2 = \begin{bmatrix} X & 0 \\ 0 & X \end{bmatrix} C_l = \begin{bmatrix} \sum_{i=0}^{L-1} \sum_{f=0}^{M_v-1} c_{l,i,f} x_{l,i,f} \\ \sum_{i=0}^{L-1} \sum_{f=0}^{M_v-1} c_{l,i+L,f} x_{l,i,f} \end{bmatrix},$$

where $$X = [x_{l,0,0} \; x_{l,0,1} \; \cdots \; x_{l,0,M_v-1} \; \cdots \; x_{l,L-1,0} \; x_{l,L-1,1} \; \cdots \; x_{l,L-1,M_v-1}],$$

$x_{l,i,j} = a_i b_{l,f}^H$ or $\text{vec}(a_i b_{l,f}^H)$ where $a_i$ is the i-th column of the matrix A, and $b_{l,f}$ is the f-th column of the matrix $B_l$. The notation $\text{vec}(X)$ transforms matrix X into a column vector by concatenating columns of X.

$C_l$ comprises coefficients $\{c_{l,i,f}\}$ for the selected SD-FD port pairs $\{(a_i, b_{l,f})\}$.

The set of SD port selection vectors $\{a_i\}_{i=0}^{L-1}$ comprising columns of A and the set of FD port selection vectors $\{b_{l,f}\}_{f=0}^{M_v-1}$ comprising columns of $B_l$ are according to example IV.1.1 or IV.1.2.

In one embodiment IV.2, the value of $(L, M_v)$ is determined/configured to the UE according to at least one of the following examples.

In example IV.2.1, the value of $(L, M_v)$ is determined/configured to the UE based on Rel.16 mechanism, where $$M_v = \left\lceil p_v \frac{N_3}{R} \right\rceil$$

or $M_v = \lceil p_v N_{SB} \rceil$, and $N_{SB}$ is number of SBs configured for CSI reporting. In particular, the values L, β and $p_v$ are configured by the higher layer parameter paramCombination-r17 as in Clause 5.2.2.2.5/5.2.2.2.6 of [REF8], where the supported configurations include either all of or a subset of the configurations in Table 1 or Table 7.

TABLE 7

| paramCombination-r17 | L | $p_v$ $v \in \{1, 2\}$ | $p_v$ $v \in \{3, 4\}$ | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |

In one example IV.2.2, the value of $(L, M_v)$ is determined/configured to the UE as $g \times M_v$, where $M_v$ is according to the Rel. 16 configurations, g is a scaling factor, and $$M_v = \left\lceil p_v \frac{N_3}{R} \right\rceil$$

or $M_v = \lceil p_v N_{SB} \rceil$, and $N_{SB}$ is number of SBs configured for CSI reporting. In one example, the scaling factor g is fixed, e.g., g=½. In one example, the scaling factor g is configured, e.g., via higher layer (RRC) signaling either using a separate (dedicated) parameter or using a joint parameter for multiple parameters. In one example, the scaling factor g is reported by the UE, e.g., via UE capability signaling. If the UE reports multiple values for g, then gNB/NW (network) configures a value from the multiple values.

In one example the supported values for g can be from $\{1, ½\}$. The value g=1 can be mandatory, i.e., a UE supporting this new codebook must support g=1. The value g=½ can be optional, i.e., a UE supporting this new codebook can support g=½ (in addition to g=1). The UE reports whether it supports g=½ via a separate capability signaling.

In one example, when g=½, the supported configurations include either all of or a subset of the configurations in Table 8 or Table 9.

TABLE 8

| paramComb-ination-r17 | L | $p_v$ $v \in \{1,2\}$ | $p_v$ $v \in \{3,4\}$ | β |
|---|---|---|---|---|
| 1 | 2 | ⅛ | ¹⁄₁₆ | ¼ |
| 2 | 2 | ⅛ | ¹⁄₁₆ | ½ |
| 3 | 4 | ⅛ | ¹⁄₁₆ | ¼ |
| 4 | 4 | ⅛ | ¹⁄₁₆ | ½ |
| 5 | 4 | ⅛ | ⅛ | ¾ |
| 6 | 4 | ¼ | ⅛ | ½ |
| 7 | 6 | ⅛ | — | ½ |
| 8 | 6 | ⅛ | — | ¾ |

TABLE 9

| paramComb-ination-r17 | L | $p_v$ $v \in \{1,2\}$ | $p_v$ $v \in \{3,4\}$ | β |
|---|---|---|---|---|
| 1 | 2 | ⅛ | ¹⁄₁₆ | ¼ |
| 2 | 2 | ⅛ | ¹⁄₁₆ | ½ |
| 3 | 4 | ⅛ | ¹⁄₁₆ | ¼ |
| 4 | 4 | ⅛ | ¹⁄₁₆ | ½ |
| 5 | 4 | ⅛ | ⅛ | ¾ |
| 6 | 4 | ¼ | ⅛ | ½ |

In one example IV.2.3, the value of $(L, M_v)$ is determined/configured to the UE such that $$M_v = \left\lceil p_v \frac{N_3}{R} \right\rceil$$

or $M_v = \lceil p_v N_{SB} \rceil$, where $N_{SB}$ is number of SBs configured for CSI reporting and $p_v = x$ and $$x = \frac{R}{N_3} \text{ or } \frac{1}{N_{SB}}.$$

In one example, the supported configurations include either all of or a subset of the configurations in Table 10.

TABLE 10

| paramComb-ination-r17 | L | Pv $v \in \{1,2\}$ | Pv $v \in \{3,4\}$ | β |
|---|---|---|---|---|
| 1 | 2 | x | x | ¼ |
| 2 | 2 | x | x | ½ |
| 3 | 2 | x | x | ¾ |
| 4 | 2 | x | x | 1 |
| 5 | 4 | x | x | ¼ |
| 6 | 4 | x | x | ½ |
| 7 | 4 | x | x | ¾ |
| 8 | 4 | x | x | 1 |
| 9 | 6 | x | — | ¼ |
| 10 | 6 | x | — | ½ |
| 11 | 6 | x | — | ¾ |
| 12 | 6 | x | — | 1 |

In one example IV.2.4, the value of (L, $M_v$) is determined/configured to the UL such that $M_v=1$. In one example, the supported configurations include either all of or a subset of the configurations in Table 11.

TABLE 11

| paramComb-ination-r17 | L | Pv $v \in \{1,2\}$ | Pv $v \in \{3,4\}$ | β |
|---|---|---|---|---|
| 1 | 2 | 1 | 1 | ¼ |
| 2 | 2 | 1 | 1 | ½ |
| 3 | 2 | 1 | 1 | ¾ |
| 4 | 2 | 1 | 1 | 1 |
| 5 | 4 | 1 | 1 | ¼ |
| 6 | 4 | 1 | 1 | ½ |
| 7 | 4 | 1 | 1 | ¾ |
| 8 | 4 | 1 | 1 | 1 |
| 9 | 6 | 1 | — | ¼ |
| 10 | 6 | 1 | — | ½ |
| 11 | 6 | 1 | — | ¾ |
| 12 | 6 | 1 | — | 1 |

In one example IV.2.5, the value of (L, $M_v$) is determined/configured to the UE such that $$M_v = \left\lceil p_v \frac{N_3}{R} \right\rceil$$

or $M_v = \lceil p_v N_{SB} \rceil$, where $N_{SB}$ is number of SBs configured for CSI reporting and $$x = \frac{R}{N_3} \text{ or } \frac{1}{N_{SB}}.$$

In one example, the supported configurations include either all of or a subset of the configurations in Table 12.

TABLE 12

| paramComb-ination-r17 | L | Pv $v \in \{1,2\}$ | Pv $v \in \{3,4\}$ | β |
|---|---|---|---|---|
| 1-4 | 2 | ⅛ | 1/16 | 1/4,1/2,3/4,1 |
| 5-8 | 2 | ⅛ | ⅛ | 1/4,1/2,3/4,1 |
| 9-12 | 2 | ¼ | ⅛ | 1/4,1/2,3/4,1 |
| 13-16 | 2 | x | x | 1/4,1/2,3/4,1 |
| 17-20 | 2 | ⅛ | x | 1/4,1/2,3/4,1 |

TABLE 12-continued

| paramComb-ination-r17 | L | Pv $v \in \{1,2\}$ | Pv $v \in \{3,4\}$ | β |
|---|---|---|---|---|
| 21-24 | 4 | ⅛ | 1/16 | 1/4,1/2,3/4,1 |
| 25-28 | 4 | ⅛ | ⅛ | 1/4,1/2,3/4,1 |
| 29-32 | 4 | ¼ | ⅛ | 1/4,1/2,3/4,1 |
| 33-36 | 4 | x | x | 1/4,1/2,3/4,1 |
| 37-40 | 4 | ⅛ | x | 1/4,1/2,3/4,1 |
| 41-44 | 6 | ¼ | — | 1/4,1/2,3/4,1 |
| 45-48 | 6 | ⅛ | — | 1/4,1/2,3/4,1 |
| 49-52 | 6 | x | — | 1/4,1/2,3/4,1 |
| 53-56 | 1 | ⅛ | 1/16 | 1/4,1/2,3/4,1 |
| 57-60 | 1 | ⅛ | ⅛ | 1/4,1/2,3/4,1 |
| 61-64 | 1 | ¼ | ⅛ | 1/4,1/2,3/4,1 |
| 65-68 | 1 | x | x | 1/4,1/2,3/4,1 |
| 69-72 | 1 | ⅛ | x | 1/4,1/2,3/4,1 |

In one example IV.2.6, $P_{CSIRS,SD}=2N_1$ and $P_{CSIRS,FD}=N_2$ where the values of $N_1$ and $N_2$ are configured with one or two higher layer (e.g., RRC) parameter(s). In one example, the supported configurations of ($N_1$, $N_2$) for a given number of CSI-RS ports include either all of or some of the configurations given in Table 13. The number of CSI-RS ports, $P_{CSIRS}=P_{CSIRS,SD} \times P_{CSIRS,FD}=2N_1N_2$.

TABLE 13

| Supported configurations of ($N_1$, $N_2$) | |
|---|---|
| Number of CSI-RS antenna ports, $P_{CSI-RS}$ | ($N_1$, $N_2$) |
| 2 | (1,1) |
| 4 | (2,1) |
| 8 | (2,2) |
|  | (4,1) |
| 12 | (3,2) |
|  | (6,1) |
| 16 | (4,2) |
|  | (8,1) |
| 24 | (4,3) |
|  | (6,2) |
|  | (12,1) |
| 32 | (4,4) |
|  | (8,2) |
|  | (16,1) |
| 48 | (6,4) |
|  | (8,3) |
|  | (12,2) |
| 64 | (8,4) |
|  | (16,2) |

The value of (L, $M_v$) is determined/configured to the UE according to at least one of the following examples.

In one example, $L=N_1$ and $M_v=N_2$.

In one example, $L \leq N_1$ and $M_v=N_2$. When $L<N_1$, the UE selects L SD ports/beams and reports the selected beams/ports as part of the CSI report. In one example, the supported configurations of ($N_1$, $N_2$) and L for a given number of CSI-RS ports include either all of or some of the configurations given in Table 14, where one value for L is configured from the set of values shown in the table.

TABLE 14

Supported configurations of $(N_1,N_2)$ and L

| Number of CSI-RS antenna ports, $P_{CSI-RS}$ | $(N_1, N_2)$ | L |
|---|---|---|
| 2 | (1,1) | 1 |
| 4 | (2,1) | 1,2 |
| 8 | (2,2) | 1,2 |
|   | (4,1) | 1,2,4 |
| 12 | (3,2) | 1,2 |
|   | (6,1) | 1,2,4 |
| 16 | (4,2) | 1,2,4 |
|   | (8,1) | 1,2,4,6 |
| 24 | (4,3) | 1,2,4 |
|   | (6,2) | 1,2,4,6 |
|   | (12,1) | 1,2,4,6 |
| 32 | (4,4) | 1,2,4 |
|   | (8,2) | 1,2,4,6 |
|   | (16,1) | 1,2,4,6 |
| 48 | (6,4) | 1,2,4,6 |
|   | (8,3) | 1,2,4,6 |
|   | (12,2) | 1,2,4,6 |
| 64 | (8,4) | 1,2,4,6 |
|   | (16,2) | 1,2,4,6 |

In one example, $L=N_1$ and $M_v \leq N_2$. When $M_v < N_2$, the UE selects $M_v$ FD ports/beams and reports the selected beams/ports as part of the CSI report.

In one example, $L \leq N_1$ and $M_v \leq N_2$. When $L < N_1$, the UE selects L SD ports/beams and reports the selected beams/ports as part of the CSI report. When $M_v < N_2$, the UE selects $M_v$ FD ports/beams and reports the selected beams/ports as part of the CSI report. In one example, the supported configurations of $(N_1, N_2)$ and L and $M_v$ for a given number of CSI-RS ports include either all of or some of the configurations given in Table 15, where one value for L and one value for $M_v$ are configured from the set of values shown in the table.

TABLE 15

Supported configurations of (N1,N2)

| Number of CSI-RS antenna ports, PCSI-RS | (N1, N2) | L | Mv |
|---|---|---|---|
| 2 | (1,1) | 1 | 1 |
| 4 | (2,1) | 1,2 | 1 |
| 8 | (2,2) | 1,2 | 1,2 |
|   | (4,1) | 1,2,4 | 1 |
| 12 | (3,2) | 1,2 | 1,2 |
|   | (6,1) | 1,2,4 | 1 |
| 16 | (4,2) | 1,2,4 | 1,2 |
|   | (8,1) | 1,2,4,6 | 1 |
| 24 | (4,3) | 1,2,4 | 1,2,3 |
|   | (6,2) | 1,2,4,6 | 1,2 |
|   | (12,1) | 1,2,4,6 | 1 |
| 32 | (4,4) | 1,2,4 | 1,2,3,4 |
|   | (8,2) | 1,2,4,6 | 1,2 |
|   | (16,1) | 1,2,4,6 | 1 |
| 48 | (6,4) | 1,2,4,6 | 1,2,3,4 |
|   | (8,3) | 1,2,4,6 | 1,2,3 |
|   | (12,2) | 1,2,4,6 | 1,2 |
| 64 | (8,4) | 1,2,4,6 | 1,2,3,4 |
|   | (16,2) | 1,2,4,6 | 1,2 |

In one example, $$L = \frac{K_1}{2} = Y_v$$

(for polarization-common port selection) or $2L=K_1=Y_v$ (for polarization-specific port selection), where the value $Y_v$ is determined/configured according one of example II.2.1 or II.2.2 or II.2.3.

In one example IV.2.7, $P_{CSIRS}=P_{CSIRS,SD} \times P_{CSIRS,FD}$ such that $P_{CSIRS} \in \{2,4,8,12,16,24,32\}$. In one example, the values of $P_{CSIRS,SD}$ and $P_{CSIRS,FD}$ are configured with one or two higher layer (e.g., RRC) parameter(s). In one example, the value of $P_{CSIRS,SD}$ is configured with a higher layer (e.g., RRC) parameter, and the values of $P_{CSIRS,FD}$ is determined implicitly based on the configured value of $P_{CSIRS,SD}$. A few examples of the possible values for the supported values of $P_{CSIRS,SD}$ and $P_{CSIRS,FD}$ include the values in Table 16 or Table 17 or Table 18.

TABLE 16

| $P_{CSIRS,SD}$ | A set of possible values for L | A set of possible values for $P_{CSIRS,FD}$ |
|---|---|---|
| 2 | 1 | 1,2,4 |
| 4 | 1,2 | 1,2 |
| 8 | 1,2,4 | 1 |

TABLE 17

| $P_{CSIRS,SD}$ | A set of possible values for L | A set of possible values for $P_{CSIRS,FD}$ |
|---|---|---|
| 2 | 1 | 1,2,4,6,8 |
| 4 | 1,2 | 1,2,3,4 |
| 8 | 1,2,4 | 1,2 |
| 12 | 1,2,4,6 | 1 |
| 16 | 1,2,4,6 | 1 |

TABLE 18

| $P_{CSIRS,SD}$ | A set of possible values for L | A set of possible values for $P_{CSIRS,FD}$ |
|---|---|---|
| 2 | 1 | 1,2,4,6,8,12,16 |
| 4 | 1,2 | 1,2,3,4,6,8 |
| 8 | 1,2,4 | 1,2,3,4 |
| 12 | 1,2,4,6 | 1,2 |
| 16 | 1,2,4,6 | 1,2 |
| 24 | 1,2,4,6 | 1 |
| 32 | 1,2,4,6 | 1 |

In these examples, the set of possible values for L belong to $\{1,2,4,6\}$ and the set of possible values for $M_v$ belong to $\{1, \ldots, P_{CSIRS,FD}\}$. When $2L < P_{CSIRS,SD}$, the UE selects L (or 2L) SD ports/beams and reports the selected beams/ports as part of the CSI report. When $M_v < P_{CSIRS,FD}$, the UE selects $M_v$ FD ports/beams and reports the selected beams/ports as part of the CSI report.

The parameters L and $M_v$ can be configured separately, e.g., via two higher layer RRC parameters. Or, they can be configured jointly via a single higher layer RRC parameter.

In one example IV.2.8, $P_{CSIRS}=P_{CSIRS,SD} \times P_{CSIRS,FD}$ such that $P_{CSIRS} \in \{2,4,8,12,16,24,32,48,64\}$. In one example, the values of $P_{CSIRS,SD}$ and $P_{CSIRS,FD}$ are configured with one or two higher layer (e.g., RRC) parameter(s). In one example, the value of $P_{CSIRS,SD}$ is configured with a higher layer (e.g., RRC) parameter, and the values of $P_{CSIRS,FD}$ is determined implicitly based on the configured value of $P_{CSIRS,SD}$. A few examples of the possible values for the supported values of $P_{CSIRS,SD}$ and $P_{CSIRS,FD}$ include the values in Table 19.

TABLE 19

| $P_{CSIRS,SD}$ | A set of possible values for L | A set of possible values for $P_{CSIRS,FD}$ |
|---|---|---|
| 2 | 1 | 1,2,4,6,8,12,16,24,32 |
| 4 | 1,2 | 1,2,3,4,6,8,12,16 |
| 8 | 1,2,4 | 1,2,3,4,6,8 |
| 12 | 1,2,4,6 | 1,2,4 |
| 16 | 1,2,4,6 | 1,2,3,4 |
| 24 | 1,2,4,6 | 1,2 |
| 32 | 1,2,4,6 | 1,2 |
| 48 | 1,2,4,6 | 1 |
| 64 | 1,2,4,6 | 1 |

In one embodiment IV.3, the value of (L, $M_v$) is determined/configured to the UE according to embodiment IV.1 and IV.2 is subject to a restriction.

In one example IV.3.1, the restriction is on a rank value.
  In one example, a subset of the supported values of (L, $M_v$) can be configured for rank 1 only.
  In one example, a subset of the supported values of (L, $M_v$) can be configured for rank 1 or 2 only.
  In one example, a subset of the supported values of (L, $M_v$) can be configured for rank 3 or 4 only.

In one example IV.3.2, the restriction is based on a value of $N_{SB}$.
  In one example, a subset of the supported values of (L, $M_v$) can be configured for $N_{SB} < t$ where t is a threshold which is fixed or configured.
  In one example, a subset of the supported values of (L, $M_v$) can be configured for $N_{SB} > t$ where t is a threshold which is fixed or configured.

In one example IV.3.3, the restriction is based on a value of $N_3$.
  In one example, a subset of the supported values of (L, $M_v$) can be configured for $N_3 \leq t$ where t is a threshold which is fixed (e.g., 19) or configured.
  In one example, a subset of the supported values of (L, $M_v$) can be configured for $N_3 > t$ where t is a threshold which is fixed (e.g., 19) or configured.

In one example IV.3.4, the restriction is based on a value of R.
  In one example, a subset of the supported values of (L, $M_v$) can be configured for R E S where S is fixed or configured. In one example, S={1}.

In example IV.3.5, the restriction is based on a value of $N_{CSIRS}$.
  In one example, a subset of the supported values of (L, $M_v$) can be configured for $N_{CSIRS} \leq t$ where t is a threshold which is fixed (e.g., 8) or configured.
  In one example, a subset of the supported values of (L, $M_v$) can be configured for $N_{CSIRS} > t$ where t is a threshold which is fixed (e.g., 8) or configured.

In one example IV.3.6, the restriction is based on a value of f.
  In one example, a subset of the supported values of (L, $M_v$) can be configured for $\beta \in S$ where S is fixed or configured. In one example, S={1}.
  In one example, a small value of $M_v$, e.g., $M_v=1$ is configured when S={1}.
  In one example, a small value of $2LM_v$, e.g., $2LM_v=8$ is configured when S={1}.

In one example IV.3.7, the restriction is based on a combination of at least two of rank value, $N_{SB}$, $N_3$, R, $N_{CSIRS}$, and $\beta$.

In one embodiment V.1, a UE is configured with higher layer parameter codebookType set to 'typeII-PortSelection-r17' for CSI reporting based on a new (Rel. 17) Type II port selection codebook in which the port selection (which is in SD) in Rel. 15/16 Type II port selection codebook is extended to FD in addition to SD. The UE is also configured with $P_{CSIRS}$ CSI-RS ports (either in one CSI-RS resource or distributed across more than one CSI-RS resources) linked with the CSI reporting based on this new Type II port selection codebook. In one example, $P_{CSIRS}=Q$. In another example, $P_{CSIRS} \geq Q$. Here, $Q=P_{CSIRS,SD} \times P_{CSIRS,FD}$. The CSI-RS ports can be beamformed in SD or/and FD. The UE measures $P_{CSIRS}$ (or at least Q) CSI-RS ports, estimates (beam-formed) DL channel, and determines a precoding matrix indicator (PMI) using the new port selection codebook, wherein the PMI indicates a set of components S that can be used at the gNB to construct precoding matrices for each FD unit $t \in \{0, 1, \ldots, N_3-1\}$ (together with the beamforming used to beamformed CSI-RS). In one example, $P_{CSIRS,SD} \in \{4,8,12,16,32\}$ or $\{2,4,8,12,16,32\}$. In one example, $P_{CSIRS,SD}$ and $P_{CSIRS,FD}$ are such that their product $Q=P_{CSIRS,SD} \times P_{CSIRS,FD} \in \{4,8,12,16,32\}$ or $\{2,4,8,12,16,32\}$.

The new port selection codebook facilitates joint port selection across SD and FD. This is illustrated in bottom part of FIG. 12. The codebook structure is similar to Rel. 15 NR Type II codebook comprising two main components.

$W_1$: to select $Y_v$ out of $P_{CSI-RS}$ SD-FD port pairs jointly
  In one example, $Y_v \leq P_{CSI-RS}$ (if the port selection is independent across two polarizations or two groups of antennas with different polarizations)
  In one example, $$Y_v \leq \frac{P_{CSI-RS}}{2}$$

(if the port selection is common across two polarizations or two groups of antennas with different polarizations)

$W_2$: to select coefficients for the selected $Y_v$ SD-FD port pairs.

In one example, the joint port selection (and its reporting) is common across multiple layers (when v>1). In one example, the joint port selection (and its reporting) is independent across multiple layers (when v>1). The reporting of the selected coefficients is independent across multiple layers (when v>1).

In one example V.1.1, the corresponding precoding matrix (or matrices) is (are) given by (where there is no Wf component in the codebook, or where the Wf component is turned OFF, e.g., via higher layer, and when turned OFF, Wf is an all-one vector, hence doesn't appear in the precoder equation).

$$W^l = W_1 W_2 = XC_l = \sum_{i=0}^{Y_v-1} c_{l,i} x_{l,i},$$

$$\text{or } W^l = W_1 W_2 = \begin{bmatrix} X & 0 \\ 0 & X \end{bmatrix} C_l = \begin{bmatrix} \sum_{i=0}^{Y_v-1} c_{l,i} x_{l,i} \\ \sum_{i=0}^{Y_v-1} c_{l,i+Y_v} x_{l,i} \end{bmatrix},$$

where $$X = [x_{l,0} \quad x_{l,1} \quad \ldots \quad x_{l,Y_v-1}],$$

$x_{l,i} = a_{l,i} b_{l,i}^H$ or $\text{vec}(a_{l,i} b_{l,i}^H)$ where $(a_{l,i}, b_{l,i})$ is the i-th SD-FD port pair. The notation vec(X) transforms matrix X into a column vector by concatenating columns of X.

$C_l$ comprises coefficients $\{c_{l,i}\}$ for the selected SD-FD port pairs $\{(a_{l,i}, b_{l,f})\}$.

In one example, $Y_v=y$ for any value of v. In one example, $Y_v=y1$ for $v \in \{1,2\}$ and $Y_v=y2$ for $v \in \{3,4\}$. In one example, $Y_v$ is different (independent) for different value of v. In one example, $Y_v$ is configured, e.g., via higher layer RRC signaling. In one example, $Y_v$ is reported by the UE.

In one example, $Y_v$ takes a value from $\{2, 3, 4, \ldots, P_{CSI-RS}\}$ or $$\left\{2, 3, 4, \ldots, \frac{P_{CSI-RS}}{2}\right\}.$$

In one example, $Y_v$ can take a value greater than $$P_{CSI-RS} \text{ or } \frac{P_{CSI-RS}}{2}.$$

In one example, $Y_v=L \times M_v$. In one example, $Y_v=L_v \times M_v$. In one example, L or $L_v$ can be configured from $\{2, 4\}$ or $\{2, 3, 4\}$ or $\{2, 4, 6\}$ or $\{2, 4, 6, 8\}$. In one example, $$M_v = \left\lceil p_v \frac{N_3}{R} \right\rceil$$

as in Rel. 16 enhanced Type II port selection codebook. In one example, the value of $M_v$ can be 1, in addition to the value of $M_v$ supported in Rel. 16 enhanced Type II port selection codebook. In one example, the value range of R is configured from $\{1, 2\}$ or $\{1, 2, 4\}$, or $\{2, 4\}$, or $\{1, 4\}$ or $\{1, 2, 4, 8\}$.

In one example V.1.2, the corresponding precoding matrix (or matrices) is (are) given by (where there is a Wf component in the codebook, or where the Wf component is turned ON, e.g., via higher layer, and when turned ON, Wf appears in the precoder equation).

$$W^l = W_1 W_2 W_f^H = X C_l W_f^H = \sum_{i=0}^{Y_v-1} \sum_{f=0}^{M_v-1} c_{l,i,f} x_{l,i,f},$$

$$\text{or } W^l = W_1 W_2 W_f^H = \begin{bmatrix} X & 0 \\ 0 & X \end{bmatrix} C_l W_f^H = \begin{bmatrix} \sum_{i=0}^{Y_v-1} \sum_{f=0}^{M_v-1} c_{l,i,f} x_{l,i,f} \\ \sum_{i=0}^{Y_v-1} \sum_{f=0}^{M_v-1} c_{l,i+Y_v,f} x_{l,i,f} \end{bmatrix},$$

where $$X = [x_{l,0,0} \ x_{l,0,1} \ \ldots \ x_{l,0,M_v-1} \ \ldots \ x_{l,Y_v-1,0} \ x_{l,Y_v-1,1} \ \ldots \ x_{l,Y_v-1,M_v-1}],$$

$x_{l,i,f} = a_i b_{l,f}^H$ or $\text{vec}(a_i b_{l,f}^H)$ where $a_i$ is the i-th column of the port-selection matrix X, and $b_{l,f}$ is the f-th column of the matrix $W_f$. The notation vec(X) transforms matrix X into a column vector by concatenating columns of X.

$C_l$ comprises coefficients $\{c_{l,i,f}\}$ for the selected SD-FD port pairs $\{(a_i, b_{l,f})\}$.

In one example, $Y_v = L = K_1/2$ (for polarization-common port selection) or $Y_v = 2L = K_1$ (for polarization-specific port selection).

In this example, $M_v$ is number of FD basis vectors comprising columns of $W_f$, whether $M_v$ can be fixed, e.g., to $M_v=2$, or configured.

In one embodiment V.2, the value of $Y_v$ is determined/configured to the UE according to at least one of the following examples.

In one example V.2.1, the supported configurations of $Y_v$ and $\beta$ for a given number of CSI-RS ports (in one CSI-RS resource or aggregated across more than CSI-RS resources) include either all of or some of the configurations given in Table 20, where one value for $Y_v$ and one value for $\beta$ are configured from the set of values shown in the table.

TABLE 20

Supported configurations of $P_{CSI-RS}$ and $Y_v$

| Number of CSI-RS antenna ports, $P_{CSI-RS}$ | $Y_v$ | $\beta$ |
| --- | --- | --- |
| 2 | 2 | 1/4,1/2,3/4,1 |
| 4 | 2,4 | 1/4,1/2,3/4,1 |
| 8 | 2,4,8 | 1/4,1/2,3/4,1 |
| 12 | 2,4,8,12 | 1/4,1/2,3/4,1 |
| 16 | 2,4,8,12,16 | 1/4,1/2,3/4,1 |
| 24 | 2,4,8,12,16,24 | 1/4,1/2,3/4,1 |
| 32 | 2,4,8,12,16,24,32 | 1/4,1/2,3/4,1 |
| 48 | 2,4,8,12,16,24,32 | 1/4,1/2,3/4,1 |
| 64 | 2,4,8,12,16,24,32 | 1/4,1/2,3/4,1 |

TABLE 21

Supported configurations of $P_{CSI-RS}$ and $Y_\upsilon$

| Number of CSI-RS antenna ports, $P_{CSI-RS}$ | Alt1: $Y_\upsilon \leq P_{CSI-RS}$ | Alt2: $Y_\upsilon \leq \dfrac{P_{CSI-RS}}{2}$ |
| --- | --- | --- |
| 4 | 4 | 2 |
| 8 | 4, 8 | 2, 4 |
| 12 | 4, 8, 12 | 2, 4, 6 |
| 16 | 4, 8, 12, 16 | 2, 4, 6, 8 |
| 24 | 4, 8, 12, 16, 24 | 2, 4, 6, 8, 12 |
| 32 | 4, 8, 12, 16, 24, 32 | 2, 4, 6, 8, 12, 16 |
| 48 | 4, 8, 12, 16, 24, 32 | 2, 4, 6, 8, 12, 16 |
| 64 | 4, 8, 12, 16, 24, 32 | 2, 4, 6, 8, 12, 16 |

TABLE 22

Supported configurations of $P_{CSI-RS}$ and $Y_\upsilon$

| Number of CSI-RS antenna ports, $P_{CSI-RS}$ | Alt1: $Y_\upsilon \leq P_{CSI-RS}$ | Alt2: $Y_\upsilon \leq \dfrac{P_{CSI-RS}}{2}$ |
| --- | --- | --- |
| 2 | 2 | 1 |
| 4 | 2, 4 | 1, 2 |
| 8 | 2, 4, 8 | 1, 2, 4 |
| 12 | 2, 4, 8, 12 | 1, 2, 4, 6 |
| 16 | 2, 4, 8, 12, 16 | 1, 2, 4, 6, 8 |
| 24 | 2, 4, 8, 12, 16, 24 | 1, 2, 4, 6, 8, 12 |
| 32 | 2, 4, 8, 12, 16, 24, 32 | 1, 2, 4, 6, 8, 12, 16 |
| 48 | 2, 4, 8, 12, 16, 24, 32 | 1, 2, 4, 6, 8, 12, 16 |
| 64 | 2, 4, 8, 12, 16, 24, 32 | 1, 2, 4, 6, 8, 12, 16 |

In one example V.2.2, the supported values of $Y_v$ for a given number of CSI-RS ports (in one CSI-RS resource or aggregated across more than CSI-RS resources) include either all of or some of the configurations given in Table 17 or Table 18, where one value for $Y_v$ is configured from the set of values shown in the table. There are two alternatives in the table. Alt1 for the case when the port selection is independent across two polarizations or two groups of antennas with different polarizations, and Alt2 for the case when the port selection is common across two polarizations or two groups of antennas with different polarizations. The details of the polarization-common and polarization-specific are as described in this disclosure.

In one example, the notation $Y_v$ is labelled using $K_1$ or L, i.e., $Y_v=K_1=2L$ for the case of the polarization-specific port selection (Alt1), and $Y_v=K_1/2=L$ for the case of the polarization-common port selection (Alt2)

In one example, the entire Table 21 or Table 22 is supported in the specification. In one example, a subset of values in Table 21 or Table 22 are supported in the specification, For example, at least one or more than one of the following corresponds to the subset.

The supported number of CSI-RS ports comprises {2,4,8,12,16,24,32} or {4,8,12,16,24,32}.

The supported $Y_v$ values comprises {4,8,12,16} in case of Alt and {2,4,6,8} in case of Alt2.

In one example, the support of some value(s) can be UE optional, i.e., only when the UE reports being capable of supporting those value(s), they can be configured; otherwise, they can't be configured. For example, the values $Y_v \geq t$ can be UE optional, where t can be fixed, e.g., t=12 or 16 (Alt1), and t=6 or 8 (Alt2).

In one example, the support of $Y_v=2$ (Alt1) or $Y_v=1$ (Alt2) is restricted to $P_{CSI-RS} \leq x$, where x can be fixed (e.g., x=4 or 8), or configured. That is, $Y_v=2$ (Alt1) or $Y_v=1$ (Alt2) is not supported (hence cannot be configured) when $P_{CSI-RS} > x$.

In one example V.2.3, the supported values of $Y_v$ for a given number of CSI-RS ports (in one CSI-RS resource or aggregated across more than CSI-RS resources) is from the candidate values as in example II21, and II.2.2; however there is a minimum value (lower bound) on the value of $Y_v$ that can be configured (hence supported). For example, the lower bound can depend on the value of $P_{CSI-RS}$.

In one example, $Y_v \geq y \times P_{CSI-RS}$ or $\lceil y \times P_{CSI-RS} \rceil$ or $\lfloor y \times P_{CSI-RS} \rfloor$ where $y \leq 1$. In one example, y is fixed, e.g., $$y = 1 \text{ or } \frac{3}{4} \text{ or } \frac{1}{2} \text{ or } \frac{1}{4} \text{ or } \frac{1}{8},$$

or configured. When configured, y is configured from $$\left\{1, \frac{3}{4}\right\} = \{1, 0.75\} \text{ or } \left\{1, \frac{1}{2}\right\} =$$

$$\{1, 0.5\} \text{ or } \left\{\frac{3}{4}, \frac{1}{2}\right\} = \{0.75, 0.5\} \text{ or } \left\{1, \frac{3}{4}, \frac{1}{2}\right\} = \{1, 0.75, 0.5\}.$$

This configuration can be via a separate RRC parameter or via a joint configuration parameter (e.g., a joint parameter that configures y and other codebook parameters such as β or/and $M_v$). For a given configured value of $P_{CSI-RS}$ and a value of y satisfying $Y_v \geq y \times P_{CSI-RS}$ or $\lceil y \times P_{CSI-RS} \rceil$ or $\lfloor y \times P_{CSI-RS} \rfloor$, the configured value of $Y_v$ is given by $Y_v = y \times P_{CSI-RS}$ or $\lceil y \times P_{CSI-RS} \rceil$ or $\lfloor y \times P_{CSI-RSI} \rfloor$.

Alternatively, the value of $Y_v = y \times P_{CSI-RS}$ or $\lceil y \times P_{CSI-RS} \rceil$ or $\lfloor y \times P_{CSI-RS} \rfloor$, where y is fixed, e.g., $$y = 1 \text{ or } \frac{3}{4} \text{ or } \frac{1}{2} \text{ or } \frac{1}{4} \text{ or } \frac{1}{8},$$

or configured. When configured, y is configured from $$\left\{1, \frac{3}{4}\right\} = \{1, 0.75\} \text{ or } \left\{1, \frac{1}{2}\right\} =$$

$$\{1, 0.5\} \text{ or } \left\{\frac{3}{4}, \frac{1}{2}\right\} = \{0.75, 0.5\} \text{ or } \left\{1, \frac{3}{4}, \frac{1}{2}\right\} = \{1, 0.75, 0.5\}.$$

In one example, $Y_v \geq \max(m, y \times P_{CSI-RS})$ where $y \leq 1$, and m is a minimum value. In one example, y is fixed, e.g., $$y = \frac{1}{2} \text{ or } \frac{1}{4} \text{ or } \frac{1}{8},$$

or configured. In one example, m=1 or 2. An example is shown in Table 23.

TABLE 23

Supported configurations of $P_{CSI-RS}$ and $Y_v$ for m = 2 and y = 1/2

| Number of CSI-RS antenna ports, $P_{CSI-RS}$ | Alt1: $Y_v \leq P_{CSI-RS}$ | Alt2: $Y_v \leq \frac{P_{CSI-RS}}{2}$ |
|---|---|---|
| 4 | 4 | 2 |
| 8 | 4, 8 | 2, 4 |
| 12 | 4, 8, 12 | 2, 4, 6 |
| 16 | 8, 12, 16 | 4, 6, 8 |
| 24 | 12, 16, 24 | 6, 8, 12 |
| 32 | 16, 24, 32 | 8, 12, 16 |
| 48 | 16, 24, 32 | 8, 12, 16 |
| 64 | 16, 24, 32 | 8, 12, 16 |

In one embodiment V.3, the UE is configured with a value of $Y_v$ for a given number of CSI-RS ports (in one CSI-RS resource or aggregated across more than CSI-RS resources) implicitly based on $Y_v = y \times P_{CSI-RS}$, where y is configured. The details of y are according to example V.2.3. This configuration in particular is via a joint parameter (e.g., paramCombination-r17) which configures y and Z additional codebook parameters jointly.

In one example V.3.1, Z=1, the joint parameter indicates y and β jointly. The supported parameter combinations can be included in Table 24. In one example, the parameter combinations remain the same for all rank values, e.g., $v \in \{1,2\}$ or $\{1,2,3,4\}$. In one example, one parameter can change depending on rank value. For example, for rank 3-4, the parameter is different from rank 1-2.

TABLE 24

| paramCombination-r17 | $Y_v$ | β |
|---|---|---|
| 1 | ½ | ½ |
| 2 | ½ | ¾ |
| 3 | ½ | 1 |
| 4 | ¾ | ½ |
| 5 | ¾ | ¾ |
| 6 | ¾ | 1 |
| 7 | 1 | ½ |
| 8 | 1 | ¾ |
| 9 | 1 | 1 |

In one example V.3.2, Z=2, the joint parameter indicates y, $M_v$, and β jointly. The supported parameter combinations can be included in one or multiple of the tables Table 25, through Table 28; multiple examples are shown in some tables Table 27. In one example, the parameter combinations remain the same for all rank values, e.g., $v \in \{1,2\}$ or $\{1,2,3,4\}$. In one example, $M_v$ can change depending on rank value. For example, for rank 1-2, $M_v$ is the configured value from {1,2}, and for rank 3-4, $M_v$ can be fixed to $M_v=1$.

TABLE 25

| paramCombination-r17 | y | $M_v$ | β |
|---|---|---|---|
| 1 | 3/4 | 1 | 3/4 |
| 2 | 3/4 | 1 | 1 |
| 3 | 1 | 1 | 3/4 |
| 4 | 1 | 1 | 1 |
| 5 | 3/4 | 2 | 3/4 |
| 6 | 3/4 | 2 | 1 |
| 7 | 1 | 2 | 3/4 |
| 8 | 1 | 2 | 1 |

TABLE 26

| paramCombination-r17 | Ex A | | | Ex B | | | Ex C | | |
|---|---|---|---|---|---|---|---|---|---|
| | y | $M_v$ | β | y | $M_v$ | β | y | $M_v$ | β |
| 1 | 3/4 | 1 | 1 | 3/4 | 1 | 1 | 3/4 | 1 | 3/4 |
| 2 | 1 | 1 | 1 | 1 | 1 | 1 | 1 | 1 | 1 |
| 3 | 1/2 | 2 | 3/4 | 1/2 | 2 | 3/4 | 1/2 | 2 | 3/4 |
| 4 | 1/2 | 2 | 1 | 1/2 | 2 | 1 | 1/2 | 2 | 1 |
| 5 | 3/4 | 2 | 3/4 | 3/4 | 2 | 3/4 | 3/4 | 2 | 3/4 |
| 6 | 3/4 | 2 | 1 | 3/4 | 2 | 1 | 3/4 | 2 | 1 |
| 7 | 1 | 2 | 3/4 | 1 | 2 | 3/4 | 1 | 2 | 3/4 |
| 8 | 1 | 2 | 1 | 1 | 2 | 1 | 1 | 2 | 1 |

TABLE 27

| paramCombination-r17 | y | $M_v$ | β |
|---|---|---|---|
| 1 | 3/4 | 1 | 1 |
| 2 | 1 | 1 | 1 |
| 3 | 3/4 | 2 | 1/2 |
| 4 | 1 | 2 | 1/2 |
| 5 | 3/4 | 2 | 3/4 |
| 6 | 1 | 2 | 3/4 |
| 7 | 3/4 | 2 | 1 |
| 8 | 1 | 2 | 1 |

TABLE 28

| paramCombination-r17 | Ex A | | | Ex B | | | Ex C | | | Ex D | | |
|---|---|---|---|---|---|---|---|---|---|---|---|---|
| | y | $M_v$ | β | y | $M_v$ | β | y | $M_v$ | β | y | $M_v$ | β |
| 1 | 3/4 | 1 | 1 | 3/4 | 1 | 1 | 3/4 | 1 | 1 | 3/4 | 1 | 1 |
| 2 | 3/4 | 1 | 3/4 | 3/4 | 1 | 3/4 | 3/4 | 1 | 3/4 | 1 | 1 | 3/4 |
| 3 | 1 | 1 | 1 | 1 | 1 | 1 | 1 | 1 | 1 | 1 | 1 | 1 |
| 4 | 1/2 | 2 | 1/2 | 1/2 | 2 | 1/2 | 3/4 | 2 | 1/2 | 1/2 | 2 | 3/4 |
| 5 | 3/4 | 2 | 3/4 | 3/4 | 2 | 3/4 | 3/4 | 2 | 3/4 | 3/4 | 2 | 3/4 |
| 6 | 3/4 | 2 | 1 | 3/4 | 2 | 1 | 3/4 | 2 | 1 | 3/4 | 2 | 1 |
| 7 | 1 | 2 | 3/4 | 1 | 2 | 3/4 | 1 | 2 | 3/4 | 1 | 2 | 3/4 |
| 8 | 1 | 2 | 1 | 1 | 2 | 1 | 1 | 2 | 1 | 1 | 2 | 1 |

In one embodiment (VI.1), a UE is configured with a parameter combination (α, $M_v$, β) from a set (S), where the set includes combinations such that $$\alpha \in \left\{\frac{1}{2}, 1\right\},$$

$M_v \in \{1,2\}$, and $$\beta \in \left\{\frac{1}{2}, \frac{3}{4}, 1\right\}.$$

The set of all possible parameter combinations is shown in Table 29. In one example, $M_v = M$.

In one example, $$K_1 = \left\lceil \frac{\alpha P_{CSI-RS}}{2} \right\rceil \times 2$$

where $P_{CSI-RS}$ is the number of configured CSI-RS ports (for the CSI reporting). In one example, $K_1 = \alpha P_{CSI-RS}$ or $\lceil \alpha P_{CSI-RS} \rfloor$.

TABLE 29

| paramComb | α | $M_v$ | β |
|---|---|---|---|
| C1 | 1/2 | 1 | 1/2 |
| C2 | 1/2 | 1 | 3/4 |
| C3 | 1/2 | 1 | 1 |
| C4 | 1 | 1 | 1/2 |
| C5 | 1 | 1 | 3/4 |
| C6 | 1 | 1 | 1 |
| C7 | 1/2 | 2 | 1/2 |
| C8 | 1/2 | 2 | 3/4 |
| C9 | 1/2 | 2 | 1 |
| C10 | 1 | 2 | 1/2 |
| C11 | 1 | 2 | 3/4 |
| C12 | 1 | 2 | 1 |

In one example (VI.1.1), the set (S) includes all 12 (C1-C12) parameter combinations (Table 29).

In one example (VI.1.2), the set (S) includes a subset (S1) of the 12 (C1-C12) parameter combinations, where the subset (S1) includes up to (at most or less or equal to) 8 parameter combinations. At least one of the following examples is used to determine the 8 parameter combinations:

In one example (VI.1.2.1), S1={C1, . . . , C8}.

In one example (VI.1.2.2), S1={C1, . . . , C7, C10}.

In one example (VI.1.2.3), S1 includes S11 and S12, where S11=X and S12=Y, and X is one of X1-X15 and Y is one of Y1-Y14, which are defined as follows.

$X1 = \{C1, C2, C3, C4\}.$ $X2 = \{C1, C2, C3, C5\}.$ $X3 = \{C1, C2, C3, C6\}.$ $X4 = \{C1, C2, C4, C5\}.$ $X5 = \{C1, C2, C4, C6\}.$ $X6 = \{C1, C2, C5, C6\}.$

-continued $X7 = \{C1, C3, C4, C5\}$.

$X8 = \{C1, C3, C4, C6\}$.

$X9 = \{C1, C3, C5, C6\}$.

$X10 = \{C1, C4, C5, C6\}$.

$X11 = \{C2, C3, C4, C5\}$.

$X12 = \{C2, C3, C4, C6\}$.

$X13 = \{C2, C3, C5, C6\}$.

$X14 = \{C2, C4, C5, C6\}$.

$X15 = \{C3, C4, C5, C6\}$.

$Y1 = \{C7, C8, C10, C11\}$.

$Y2 = \{C8, C9, C11, C12\}$.

$Y3 = \{C8, C9, C10, C11\}$.

$Y4 = \{C7, C8, C9, C10\}$.

$Y5 = \{C10, C11\}$.

$Y6 = \{C7, C8\}$.

$Y7 = \{C7, C10\}$.

$Y8 = \{C7, C11\}$.

$Y9 = \{C8, C10\}$.

$Y10 = \{C8, C11\}$.

$Y11 = \{C7, C8, C10\}$.

$Y12 = \{C7, C8, C11\}$.

$Y13 = \{C7, C10, C11\}$.

$Y14 = \{C8, C10, C11\}$.

In one example (VI.1.2.4), S1 at least includes S11={C1, C2, C5, C6}, and also include additional values (S12) according to at least one of the examples of S12 in example VI.1.2.3.

In one example (VI.1.2.5), S1 at least includes S11={C2, C4, C5, C6}, and also include additional values (S12) according to at least one of the examples of S12 in example VI.1.2.3.

In one example (VI.1.2.6), S1 at least includes S11={C1, C3, C5, C6}, and also include additional values (S12) according to at least one of the examples of S12 in example VI.1.2.3.

In one example (VI.1.2.7), S1 at least includes S11={C1, C4, C5, C6}, and also include additional values (S12) according to at least one of the examples of S12 in example VI.1.2.3.

In one example (VI.1.2.8), S1 at least includes S11={C3, C4, C5, C6}, and also include additional values (S12) according to at least one of the examples of S12 in example VI.1.2.3.

In one example (VI.1.2.9), S1={a1, a2, . . . , a8}, where a1 is one of C1-C12, a2 is one of C1-C12 but not the same as a1, so on until a8 is one of C1-C12 but not the same as any of {a1, a2, . . . , a7}.

In one example (VI.1.3), the set (S) is the same as example III.1.2 except that the configured β value is for rank 1 or 2 CSI reporting, and the β value for rank 3 or 4 CSI reporting is s×β, where β is the configured value, and s is a scaling that is either fixed (e.g., $$s = \frac{1}{2} \text{ or } 0.5),$$

configured (e.g., via higher layer) or reported by the UE (e.g., as part of the CSI report).

In one example (VI.1.4), the set (S) is the same as example III.1.2 except that the α value for $P_{CSI-RS} > p$ CSI-RS is t×α, where α is the value is for $P_{CSI-RS} \leq p$ CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.1.5), which is a combination of III.1.3 and III.1.4, the set (S) is the same as example VI.1.2 except that the configured β value is for rank 1 or 2 CSI reporting, and the β value for rank 3 or 4 CSI reporting is s×β, where β is the configured value, and s is a scaling that is either fixed (e.g., $$s = \frac{1}{2} \text{ or } 0.5),$$

configured (e.g., via higher layer) or reported by the UE (e.g., as part of the CSI report), and the α value for $P_{CSI-RS} > p$ CSI-RS ports is t×α, where α is the value is for $P_{CSI-RS} \leq p$ CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.1.6), the set (S) is the same as example III.1.2 except that for the combinations with $M_v=1$, the configured β value is the same for all ranks (rank 1-4), and for the combinations with $M_v=2$, the configured β value is for rank 1 or 2 CSI reporting, and the β value for rank 3 or 4 CSI reporting is s×β, where β is the configured value, and s is a scaling that is either fixed (e.g., $$s = \frac{1}{2} \text{ or } 0.5),$$

configured (e.g., via higher layer) or reported by the UE (e.g., as part of the CSI report).

In one example (VI.1.7), the set (S) is the same as example III.1.2 except that for the combinations with $M_v=1$, the configured α value is the same for all ranks (rank 1-4), and for the combinations with $M_v=2$, the α value for $P_{CSI-RS} > p$ CSI-RS ports is t×α, where α is the value is for $P_{CSI-RS} \leq p$ CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.1.8), the set (S) is the same as example III.1.5 except that
the configured β value is for rank 1 or 2 CSI reporting, and the β value for rank 3 or 4 CSI reporting is s×β, where β is the configured value, and s is a scaling that is either fixed (e.g., $$s = \frac{1}{2} \text{ or } 0.5),$$

configured (e.g., via higher layer) or reported by the UE (e.g., as part of the CSI report), and
the parameter α is determined as follows:
for the combinations with $M_v=1$, the configured α value is the same for all ranks (rank 1-4), and
for the combinations with $M_v=2$, the α value for $P_{CSI-RS}>p$ CSI-RS ports is t×α, where α is the value is for $P_{CSI-RS} \leq p$ CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.1.9), the set (S) is the same as example III.1.5 except that
the α value for $P_{CSI-RS}>p$ CSI-RS ports is t×α, where α is the value is for $P_{CSI-RS} \leq p$ CSI-RS ports, p is fixed (e.g., 12), and t is a scaling that is either fixed (e.g., t=1 or ½), configured (e.g., via higher layer) or reported by the UE (e.g., as part of the CSI report), and
the parameter β is determined as follows:
for the combinations with $M_v=1$, the configured β value is the same for all ranks (rank 1-4), and
for the combinations with $M_v=2$, the configured β value is for rank 1 or 2 CSI reporting, and the β value for rank 3 or 4 CSI reporting is s×β, where β is the configured value, and s is a scaling that is either fixed (e.g., $$s = \frac{1}{2} \text{ or } 0.5),$$

configured (e.g., via higher layer) or reported by the UE (e.g., as part of the CSI report).

In one example (VI.1.10), the set (S) is the same as example III.1.5 except that
the parameter α is determined as follows:
for the combinations with $M_v=1$, the configured α value is the same for all ranks (rank 1-4), and
for the combinations with $M_v=2$, the α value for $P_{CSI-RS}>p$ CSI-RS ports is t×α, where α is the value is for $P_{CSI-RS} \leq p$ CSI-RS ports, p is fixed (e.g., 12), and t is a scaling that is either fixed (e.g., t=1 or ½), configured (e.g., via higher layer) or reported by the UE (e.g., as part of the CSI report), and
the parameter β is determined as follows:
for the combinations with $M_v=1$, the configured β value is the same for all ranks (rank 1-4), and
for the combinations with $M_v=2$, the configured β value is for rank 1 or 2 CSI reporting, and the β value for rank 3 or 4 CSI reporting is s×α, where β is the configured value, and s is a scaling that is either fixed (e.g., $$s = \frac{1}{2} \text{ or } 0.5),$$

configured (e.g., via higher layer) or reported by the UE (e.g., as part of the CSI report).

In one embodiment (VI.2), a UE is configured with a parameter combination (α, $M_v$, β) from a set (S), where the set includes combinations such that $$\alpha \in \left\{\frac{3}{4}, 1\right\},$$

$M_v \in \{1,2\}$, and $\beta \in$ $$\left\{\frac{1}{2}, \frac{3}{4}, 1\right\}.$$

The set of all possible parameter combinations is shown in Table 30. In one example, $M_v = M$.

In one example, when $$\alpha = \frac{3}{4}$$

is configured, there is a restriction on the number of CSI-RS ports ($P_{CSI-RS}$) which $$\alpha = \frac{3}{4}$$

applies for.

In one example $$\alpha = \frac{3}{4}$$

can't be configured when $P_{CSI-RS}=4$. Or, the UE is not expected to be configured with a parameter combination with $$\alpha = \frac{3}{4}$$

when $P_{CSI-RS}=4$.

In one example, $$\alpha = \frac{3}{4}$$

can't be configured when $P_{CSI-RS}=12$. Or, the UE is not expected to be configured with a parameter combination with $$\alpha = \frac{3}{4}$$

when $P_{CSI-RS}=12$.

In one example, $$\alpha = \frac{3}{4}$$

can't be configured when $P_{CSI-RS}=4$ or 12. Or, the UE is not expected to be configured with a parameter combination with $$\alpha = \frac{3}{4}$$

when $P_{CSI-RS}=4$ or 12.
In one example, $$\alpha = \frac{3}{4}$$

can be configured only when $P_{CSI-RS} \in \{8,16,24,32\}$. Or, the UE is expected to be configured with a parameter combination with $$\alpha = \frac{3}{4}$$

only when $P_{CSI-RS} \in \{8,16,24,32\}$.
In one example, $$K_1 = \left\lceil \frac{\alpha P_{CSI-RS}}{2} \right\rceil \times 2.$$

In one example, $K_1 = \alpha P_{CSI-RS}$ or $\lceil \alpha P_{CSI-RS} \rceil$.
In one example, $$K_1 = \left\lceil \frac{\alpha P_{CSI-RS}}{2} \right\rceil \times 2$$

if $$\alpha = \frac{3}{4},$$

and $K_1 = \alpha P_{CSI-RS}$ or $\lceil \alpha P_{CSI-RS} \rceil$, otherwise.
In one example, $$K_1 = \left\lceil \frac{\alpha P_{CSI-RS}}{2} \right\rceil \times 2$$

if $P_{CSI-RS}=4$ or 12, and $K_1 = \alpha P_{CSI-RS}$ or $\lfloor \alpha P_{CSI-RS} \rfloor$, otherwise.
In one example, $$K_1 = \left\lceil \frac{\alpha P_{CSI-RS}}{2} \right\rceil \times 2$$

if $$\alpha = \frac{3}{4}$$

and $P_{CSI-RS}=4$ or 12, and $K_1 = \alpha P_{CSI-RS}$ or $\lceil \alpha P_{CSI-RS} \rfloor$, otherwise.

TABLE 30

| paramComb | α   | $M_v$ | β   |
|-----------|-----|-------|-----|
| C1        | 3/4 | 1     | 1/2 |
| C2        | 3/4 | 1     | 3/4 |
| C3        | 3/4 | 1     | 1   |
| C4        | 1   | 1     | 1/2 |
| C5        | 1   | 1     | 3/4 |
| C6        | 1   | 1     | 1   |
| C7        | 3/4 | 2     | 1/2 |
| C8        | 3/4 | 2     | 3/4 |
| C9        | 3/4 | 2     | 1   |
| C10       | 1   | 2     | 1/2 |
| C11       | 1   | 2     | 3/4 |
| C12       | 1   | 2     | 1   |

In one example (VI.2.1), the set (S) includes all 12 (C1-C12) parameter combinations (Table 30).

In one example (VI.2.2), the set (S) includes a subset (S1) of the 12 (C1-C12) parameter combinations, where the subset (S1) includes up to (at most or less or equal to) 8 parameter combinations. At least one of the following examples is used to determine the 8 parameter combinations:

In one example (VI.2.2.1), S1={C1, . . . , C8}.
In one example (VI.2.2.2), S1={C1, . . . , C7, C10}.
In one example (VI.2.2.3), S1 includes S11 and S12, where S11=X and S12=Y, and X is one of X1-X15 and Y is one of Y1-Y14, which are defined as follows.

$X1 = \{C1, C2, C3, C4\}$.

$X2 = \{C1, C2, C3, C5\}$.

$X3 = \{C1, C2, C3, C6\}$.

$X4 = \{C1, C2, C4, C5\}$.

$X5 = \{C1, C2, C4, C6\}$.

$X6 = \{C1, C2, C5, C6\}$.

$X7 = \{C1, C3, C4, C5\}$.

$X8 = \{C1, C3, C4, C6\}$.

$X9 = \{C1, C3, C5, C6\}$.

$X10 = \{C1, C4, C5, C6\}$.

$X11 = \{C2, C3, C4, C5\}$.

$X12 = \{C2, C3, C4, C6\}$.

$X13 = \{C2, C3, C5, C6\}$.

$X14 = \{C2, C4, C5, C6\}$.

$X15 = \{C3, C4, C5, C6\}$.

$Y1 = \{C7, C8, C10, C11\}$.

$Y2 = \{C8, C9, C11, C12\}$.

$Y3 = \{C8, C9, C10, C11\}$.

$Y4 = \{C7, C8, C9, C10\}$.

-continued

Y5 = {C10, C11}.

Y6 = {C7, C8}.

Y7 = {C7, C10}.

Y8 = {C7, C11}.

Y9 = {C8, C10}.

Y10 = {C8, C11}.

Y11 = {C7, C8, C10}.

Y12 = {C7, C8, C11}.

Y13 = {C7, C10, C11}.

Y14 = {C8, C10, C11}.

In one example (VI.2.2.4), S1 at least includes S11={C1, C2, C5, C6}, and also include additional values (S12) according to at least one of the examples of S12 in example III.2.2.3.

In one example (VI.2.2.5), S1 at least includes S11={C2, C4, C5, C6}, and also include additional values (S12) according to at least one of the examples of S12 in example III.2.2.3.

In one example (VI.2.2.6), S1 at least includes S11={C1, C3, C5, C6}, and also include additional values (S12) according to at least one of the examples of S12 in example III.2.2.3.

In one example (VI.2.2.7), S1 at least includes S11={C1, C4, C5, C6}, and also include additional values (S12) according to at least one of the examples of S12 in example III.2.2.3.

In one example (VI.2.2.8), S1 at least includes S11={C3, C4, C5, C6}, and also include additional values (S12) according to at least one of the examples of S12 in example III.2.2.3.

In one example (VI.2.2.9), S1={a1, a2, . . . , a8}, where a1 is one of C1-C12, a2 is one of C1-C12 but not the same as a1, so on until a8 is one of C1-C12 but not the same as any of {a1, a2, . . . , a7}.

In one example (VI.2.3), the set (S) is the same as example III.2.2 except that the configured $\beta$ value is for rank 1 or 2 CSI reporting, and the $\beta$ value for rank 3 or 4 CSI reporting is s×$\beta$, where $\beta$ is the configured value, and s is a scaling that is either fixed (e.g., $$s = \frac{1}{2}$$

or 0.5), configured (e.g., via higher layer) or reported by the UE (e.g., as part of the CSI report).

In one example (VI.2.4), the set (S) is the same as example VI.2.2 except that the $\alpha$ value for $P_{CSI-RS}$>p CSI-RS is t×$\alpha$, where $\alpha$ is the value is for $P_{CSI-RS}\leq$p CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.2.5), which is a combination of VI.2.3 and VI.2.4, the set (S) is the same as example VI.2.2 except that the configured $\beta$ value is for rank 1 or 2 CSI reporting, and the $\beta$ value for rank 3 or 4 CSI reporting is s×$\beta$, where $\beta$ is the configured value, and s is a scaling that is either fixed (e.g., $$s = \frac{1}{2}$$

or 0.5), configured (e.g., via higher layer) or reported by the UE (e.g., as part of the CSI report), and the $\alpha$ value for $P_{CSI-RS}$>p CSI-RS ports is t×$\alpha$, where $\alpha$ is the value is for $P_{CSI-RS}\leq$p CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.2.6), the set (S) is the same as example III.2.2 except that for the combinations with $M_v$=1, the configured $\beta$ value is the same for all ranks (rank 1-4), and for the combinations with $M_v$=2, the configured $\beta$ value is for rank 1 or 2 CSI reporting, and the $\beta$ value for rank 3 or 4 CSI reporting is s×$\beta$, where $\beta$ is the configured value, and s is a scaling that is either fixed (e.g., $$s = \frac{1}{2}$$

or 0.5), configured (e.g., via higher layer) or reported by the UE (e.g., as part of the CSI report).

In one example (VI.2.7), the set (S) is the same as example III.2.2 except that for the combinations with $M_v$=1, the configured $\alpha$ value is the same for all ranks (rank 1-4), and for the combinations with $M_v$=2, the $\alpha$ value for $P_{CSI-RS}$>p CSI-RS ports is t×$\alpha$, where $\alpha$ is the value is for $P_{CSI-RS}\leq$p CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.2.8), the set (S) is the same as example III.2.5 except that the configured $\beta$ value is for rank 1 or 2 CSI reporting, and the $\beta$ value for rank 3 or 4 CSI reporting is s×$\beta$, where $\beta$ is the configured value, and s is a scaling that is either fixed (e.g., $$s = \frac{1}{2}$$

or 0.5), configured (e.g., via higher layer) or reported by the UE (e.g., as part of the CSI report), and the parameter $\alpha$ is determined as follows:

for the combinations with $M_v$=1, the configured $\alpha$ value is the same for all ranks (rank 1-4), and for the combinations with $M_v$=2, the $\alpha$ value for $P_{CSI-RS}$>p CSI-RS ports is t×$\alpha$, where $\alpha$ is the value is for $P_{CSI-RS}\leq$p CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.2.9), the set (S) is the same as example VI.2.5 except that
- the α value for $P_{CSI-RS}$>p CSI-RS ports is t×a, where a is the value is for $P_{CSI-RS}$≤p CSI-RS ports, p is fixed (e.g., 12), and t is a scaling that is either fixed (e.g., t=1 or ½), configured (e.g., via higher layer) or reported by the UE (e.g., as part of the CSI report), and
- the parameter β is determined as follows:
  - for the combinations with $M_v$=1, the configured β value is the same for all ranks (rank 1-4), and
  - for the combinations with $M_v$=2, the configured β value is for rank 1 or 2 CSI reporting, and the β value for rank 3 or 4 CSI reporting is s×β, where β is the configured value, and s is a scaling that is either fixed (e.g., $$s = \frac{1}{2}$$

or 0.5), configured (e.g., via higher layer) or reported by the UE (e.g., as part of the CSI report).

In one example (VI.2.10), the set (S) is the same as example III.2.5 except that
- the parameter α is determined as follows:
  - for the combinations with $M_v$=1, the configured α value is the same for all ranks (rank 1-4), and
  - for the combinations with $M_v$=2, the α value for $P_{CSI-RS}$>p CSI-RS ports is t×α, where α is the value is for $P_{CSI-RS}$≤p CSI-RS ports, p is fixed (e.g., 12), and t is a scaling that is either fixed (e.g., t=1 or ½), configured (e.g., via higher layer) or reported by the UE (e.g., as part of the CSI report), and
- the parameter β is determined as follows:
  - for the combinations with $M_v$=1, the configured β value is the same for all ranks (rank 1-4), and
  - for the combinations with $M_v$=2, the configured β value is for rank 1 or 2 CSI reporting, and the β value for rank 3 or 4 CSI reporting is s×β, where β is the configured value, and s is a scaling that is either fixed (e.g., $$s = \frac{1}{2}$$

or 0.5), configured (e.g., via higher layer) or reported by the UE (e.g., as part of the CSI report).

In one embodiment (VI.3), a UE is configured with a parameter combination (α, $M_v$, β) from a set (S), where the set includes combinations such that $$\alpha \in \left\{\frac{1}{2}, \frac{3}{4}\right\},$$

$M_v \in \{1,2\}$, and $$\beta \in \left\{\frac{1}{2}, \frac{3}{4}, 1\right\}.$$

The set of all possible parameter combinations is shown in Table 27. In one example, $M_v$=M.

In one example, when $$\alpha = \frac{3}{4}$$

is configured, there is a restriction on the number of CSI-RS ports ($P_{CSI-RS}$) which $$\alpha = \frac{3}{4}$$

applies for.

In one example, $$\alpha = \frac{3}{4}$$

can't be configured when $P_{CSI-RS}$=4. Or, the UE is not expected to be configured with a parameter combination with $$\alpha = \frac{3}{4}$$

when $P_{CSI-RS}$=4.

In one example, $$\alpha = \frac{3}{4}$$

can't be configured when $P_{CSI-RS}$=12. Or, the UE is not expected to be configured with a parameter combination with $$\alpha = \frac{3}{4}$$

when $P_{CSI-RS}$=12.

In one example, $$\alpha = \frac{3}{4}$$

can't be configured when $P_{CSI-RS}$=4 or 12. Or, the UE is not expected to be configured with a parameter combination with $$\alpha = \frac{3}{4}$$

when $P_{CSI-RS}$=4 or

In one example, $$\alpha = \frac{3}{4}$$

can be configured only when $P_{CSI-RS} \in \{8,16,24,32\}$. Or, the UE is expected to be configured with a parameter combination with $$\alpha = \frac{3}{4}$$

only when $P_{CSI-RS} \in \{8,16,24,32\}$.

In one example, $$K_1 = \left\lceil \frac{\alpha P_{CSI-RS}}{2} \right\rceil \times 2.$$

In one example, $K_1 = \alpha P_{CSI-RS}$ or $\lceil \alpha P_{CSI-RS} \rceil$.

In one example, $$K_1 = \left\lceil \frac{\alpha P_{CSI-RS}}{2} \right\rceil \times 2$$

if $$\alpha = \frac{3}{4},$$

and $K_1 = \alpha P_{CSI-RS}$ or $\lceil \alpha P_{CSI-RS} \rceil$, otherwise.

In one example, $$K_1 = \left\lceil \frac{\alpha P_{CSI-RS}}{2} \right\rceil \times 2$$

if $P_{CSI-RS}=4$ or 12, and $K_1 = \alpha P_{CSI-RS}$ or $\lceil \alpha P_{CSI-RS} \rceil$, otherwise.

In one example, $$K_1 = \left\lceil \frac{\alpha P_{CSI-RS}}{2} \right\rceil \times 2$$

if $$\alpha = \frac{3}{4}$$

and $P_{CSI-RS}=4$ or 12, and $K_1 = \alpha P_{CSI-RS}$ or $\lceil \alpha P_{CSI-RS} \rceil$, otherwise.

TABLE 31

| paramComb | α | $M_v$ | β |
|---|---|---|---|
| C1 | ½ | 1 | ½ |
| C2 | ½ | 1 | ¾ |
| C3 | ½ | 1 | 1 |
| C4 | ¾ | 1 | ½ |
| C5 | ¾ | 1 | ¾ |
| C6 | ¾ | 1 | 1 |
| C7 | ½ | 2 | ½ |
| C8 | ½ | 2 | ¾ |
| C9 | ½ | 2 | 1 |

TABLE 31-continued

| paramComb | α | $M_v$ | β |
|---|---|---|---|
| C10 | ¾ | 2 | ½ |
| C11 | ¾ | 2 | ¾ |
| C12 | ¾ | 2 | 1 |

In one example (VI.3.1), the set (S) includes all 12 (C1-C12) parameter combinations (Table 31).

In one example (VI.3.2), the set (S) includes a subset (S1) of the 12 (C1-C12) parameter combinations, where the subset (S1) includes up to (at most or less or equal to) 8 parameter combinations. At least one of the following examples is used to determine the 8 parameter combinations:

In one example (VI.3.2.1), S1={C1, . . . , C8}.

In one example (VI.3.2.2), S1={C1, . . . , C7, C10}.

In one example (VI.3.2.3), S1 includes S11 and S12, where S11=X and S12=Y, and X is one of X1-X15 and Y is one of Y1-Y14, which are defined as follows.

$X1 = \{C1, C2, C3, C4\}$.

$X2 = \{C1, C2, C3, C5\}$.

$X3 = \{C1, C2, C3, C6\}$.

$X4 = \{C1, C2, C4, C5\}$.

$X5 = \{C1, C2, C4, C6\}$.

$X6 = \{C1, C2, C5, C6\}$.

$X7 = \{C1, C3, C4, C5\}$.

$X8 = \{C1, C3, C4, C6\}$.

$X9 = \{C1, C3, C5, C6\}$.

$X10 = \{C1, C4, C5, C6\}$.

$X11 = \{C2, C3, C4, C5\}$.

$X12 = \{C2, C3, C4, C6\}$.

$X13 = \{C2, C3, C5, C6\}$.

$X14 = \{C2, C4, C5, C6\}$.

$X15 = \{C3, C4, C5, C6\}$.

$Y1 = \{C7, C8, C10, C11\}$.

$Y2 = \{C8, C9, C11, C12\}$.

$Y3 = \{C8, C9, C10, C11\}$.

$Y4 = \{C7, C8, C9, C10\}$.

$Y5 = \{C10, C11\}$.

$Y6 = \{C7, C8\}$.

$Y7 = \{C7, C10\}$.

$Y8 = \{C7, C11\}$.

$Y9 = \{C8, C10\}$.

$Y10 = \{C8, C11\}$.

$Y11 = \{C7, C8, C10\}$.

$Y12 = \{C7, C8, C11\}$.

$Y13 = \{C7, C10, C11\}$.

$Y14 = \{C8, C10, C11\}$.

In one example (VI.3.2.4), S1 at least includes S11={C1, C2, C5, C6}, and also include additional values (S12) according to at least one of the examples of S12 in example III.3.2.3.

In one example (VI.3.2.5), S1 at least includes S11={C2, C4, C5, C6}, and also include additional values (S12) according to at least one of the examples of S12 in example III.3.2.3.

In one example (VI.3.2.6), S1 at least includes S11={C1, C3, C5, C6}, and also include additional values (S12) according to at least one of the examples of S12 in example III.3.2.3.

In one example (VI.3.2.7), S1 at least includes S11={C1, C4, C5, C6}, and also include additional values (S12) according to at least one of the examples of S12 in example III.3.2.3.

In one example (VI.3.2.8), S1 at least includes S11={C3, C4, C5, C6}, and also include additional values (S12) according to at least one of the examples of S12 in example III.3.2.3.

In one example (VI.3.2.9), S1={a1, a2, . . . , a8}, where a1 is one of C1-C12, a2 is one of C1-C12 but not the same as a1, so on until a8 is one of C1-C12 but not the same as any of {a1, a2, . . . , a7}.

In one example (VI.3.3), the set (S) is the same as example III.3.2 except that the configured β value is for rank 1 or 2 CSI reporting, and the β value for rank 3 or 4 CSI reporting is s×β, where β is the configured value, and s is a scaling that is either fixed (e.g., $$s = \frac{1}{2}$$

or 0.5), configured (e.g., via higher layer) or reported by the UE (e.g., as part of the CSI report).

In one example (VI.3.4), the set (S) is the same as example III.3.2 except that the α value for $P_{CSI-RS}$>p CSI-RS is t×α, where α is the value is for $P_{CSI-RS}$≤p CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.3.5), which is a combination of III.3.3 and III.3.4, the set (S) is the same as example III.3.2 except that
    the configured β value is for rank 1 or 2 CSI reporting, and the β value for rank 3 or 4 CSI reporting is s×β, where β is the configured value, and s is a scaling that is either fixed (e.g., $$s = \frac{1}{2}$$

or 0.5), configured (e.g., via higher layer) or reported by the UE (e.g., as part of the CSI report), and
    the α value for $P_{CSI-RS}$>p CSI-RS ports is t×α, where α is the value is for $P_{CSI-RS}$≤p CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.3.6), the set (S) is the same as example III.3.2 except that
    for the combinations with $M_v$=1, the configured β value is the same for all ranks (rank 1-4), and
    for the combinations with $M_v$=2, the configured β value is for rank 1 or 2 CSI reporting, and the β value for rank 3 or 4 CSI reporting is s×β, where β is the configured value, and s is a scaling that is either fixed (e.g.

$$s = \frac{1}{2}$$

or 0.5), configured (e.g., via higher layer) or reported by the UE (e.g., as part of the CSI report).

In one example (VI.3.7), the set (S) is the same as example III.3.2 except that
    for the combinations with $M_v$=1, the configured α value is the same for all ranks (rank 1-4), and
    for the combinations with $M_v$=2, the α value for $P_{CSI-RS}$>p CSI-RS ports is t×α, where α is the value is for $P_{CSI-RS}$≤p CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.3.8), the set (S) is the same as example III.3.5 except that
    the configured β value is for rank 1 or 2 CSI reporting, and the β value for rank 3 or 4 CSI reporting is s×β, where β is the configured value, and s is a scaling that is either fixed (e.g., $$s = \frac{1}{2}$$

or 0.5), configured (e.g., via higher layer) or reported by the UE (e.g., as part of the CSI report), and
    the parameter α is determined as follows:
        for the combinations with $M_v$=1, the configured α value is the same for all ranks (rank 1-4), and
        for the combinations with $M_v$=2, the α value for $P_{CSI-RS}$>p CSI-RS ports is t×α, where α is the value is for $P_{CSI-RS}$≤p CSI-RS ports, p is fixed (e.g., 12), and t is a scaling that is either fixed (e.g., t=1 or ½), configured (e.g., via higher layer) or reported by the UE (e.g., as part of the CSI report).

In one example (VI.3.9), the set (S) is the same as example III.3.5 except that
    the α value for $P_{CSI-RS}$>p CSI-RS ports is t×α, where α is the value is for $P_{CSI-RS}$≤p CSI-RS ports, p is fixed (e.g., 12), and t is a scaling that is either fixed (e.g., t=1 or ½), configured (e.g., via higher layer) or reported by the UE (e.g., as part of the CSI report), and
    the parameter β is determined as follows:
        for the combinations with $M_v$=1, the configured β value is the same for all ranks (rank 1-4), and
        for the combinations with $M_v$=2, the configured β value is for rank 1 or 2 CSI reporting, and the β value for rank 3 or 4 CSI reporting is s×β, where β is the configured value, and s is a scaling that is either fixed (e.g., $$s = \frac{1}{2}$$

or 0.5), configured (e.g., via higher layer) or reported by the UE (e.g., as part of the CSI report).

In one example (VI.3.10), the set (S) is the same as example III.3.5 except that the parameter α is determined as follows:
for the combinations with $M_v=1$, the configured α value is the same for all ranks (rank 1-4), and for the combinations with $M_v=2$, the α value for $P_{CSI-RS}>p$ CSI-RS ports is t×α, where α is the value is for $P_{CSI-RS}\leq p$ CSI-RS ports, p is fixed (e.g., 12), and t is a scaling that is either fixed (e.g., t=1 or ½), configured (e.g., via higher layer) or reported by the UE (e.g., as part of the CSI report), and the parameter β is determined as follows:
for the combinations with $M_v=1$, the configured β value is the same for all ranks (rank 1-4), and for the combinations with $M_v=2$, the configured β value is for rank 1 or 2 CSI reporting, and the β value for rank 3 or 4 CSI reporting is s×β, where β is the configured value, and s is a scaling that is either fixed (e.g., $$s = \frac{1}{2}$$

or 0.5), configured (e.g., via higher layer) or reported by the UE (e.g., as part of the CSI report).

In one embodiment (VI.4), a UE is configured with a parameter combination (α, $M_v$, β) from a set (S), where the set includes combinations such that $$\alpha \in \left\{\frac{1}{2}, \frac{3}{4}, 1\right\},$$

$M_v \in \{1,2\}$, and $$\beta \in \left\{\frac{1}{2}, \frac{3}{4}, 1\right\}.$$

The set of all possible parameter combinations is shown in Table 32. In one example, $M_v=M$.

In one example, when $$\alpha = \frac{3}{4}$$

is configured, there is a restriction on the number of CSI-RS ports ($P_{CSI-RS}$) which $$\alpha = \frac{3}{4}$$

applies for.
In one example, $$\alpha = \frac{3}{4}$$

can't be configured when $P_{CSI-RS}=4$. Or, the UE is not expected to be configured with a parameter combination with $$\alpha = \frac{3}{4}$$

when $P_{CSI-RS}=4$.
In one example, $$\alpha = \frac{3}{4}$$

can't be configured when $P_{CSI-RS}=12$. Or, the UE is not expected to be configured with a parameter combination with $$\alpha = \frac{3}{4}$$

when $P_{CSI-RS}=12$.
In one example, $$\alpha = \frac{3}{4}$$

can't be configured when $P_{CSI-RS}=4$ or 12. Or, the UE is not expected to be configured with a parameter combination with $$\alpha = \frac{3}{4}$$

when $P_{CSI-RS}=4$ or 12.
In one example, $$\alpha = \frac{3}{4}$$

can be configured only when $P_{CSI-RS} \in \{8,16,24,32\}$. Or, the UE is expected to be configured with a parameter combination with $$\alpha = \frac{3}{4}$$

only when $P_{CSI-RS} \in \{8,16,24,32\}$.
In one example, $$K_1 = \left\lceil \frac{\alpha P_{CSI-RS}}{2} \right\rceil \times 2.$$

In one example, $K_1 = \alpha P_{CSI-RS}$ or $\lceil \alpha_{CSI-RS} \rceil$.
In one example, $$K_1 = \left\lceil \frac{\alpha P_{CSI-RS}}{2} \right\rceil \times 2$$

if $$\alpha = \frac{3}{4},$$

and $K_1 = \alpha P_{CSI-RS}$ or $\lceil \alpha_{CSI-RS} \rceil$, otherwise.
In one example, $$K_1 = \left\lceil \frac{\alpha P_{CSI-RS}}{2} \right\rceil \times 2$$

if $P_{CSI-RS} = 4$ or 12, and $K_1 = \alpha P_{CSI-RS}$ or $\lceil \alpha P_{CSI-RS} \rceil$, otherwise.
In one example, $$K_1 = \left\lceil \frac{\alpha P_{CSI-RS}}{2} \right\rceil \times 2$$

if $$\alpha = \frac{3}{4}$$

and $P_{CSI-RS} = 4$ or 12, and $K_1 \alpha P_{CSI-RS}$ or $\lceil \alpha_{CSI-RS} \rceil$, otherwise.
In one example, the parameter combination(s) with $$\alpha = \frac{3}{4}$$

or/and $$\alpha = \frac{1}{2}$$

can only be configured when number of CSI-RS ports $P \geq p$, where p is fixed (e.g., 16) or when $P \in \{16, 24, 32\}$.

TABLE 32

| paramComb | α | $M_\upsilon$ | β |
|---|---|---|---|
| C1 | ½ | 1 | ½ |
| C2 | ½ | 1 | ¾ |
| C3 | ½ | 1 | 1 |
| C4 | ¾ | 1 | ½ |
| C5 | ¾ | 1 | ¾ |
| C6 | ¾ | 1 | 1 |
| D1 | 1 | 1 | ½ |
| D2 | 1 | 1 | ¾ |
| D3 | 1 | 1 | 1 |
| C7 | ½ | 2 | ½ |
| C8 | ½ | 2 | ¾ |
| C9 | ½ | 2 | 1 |
| C10 | ¾ | 2 | ½ |
| C11 | ¾ | 2 | ¾ |

TABLE 32-continued

| paramComb | α | $M_\upsilon$ | β |
|---|---|---|---|
| C12 | ¾ | 2 | 1 |
| D4 | 1 | 2 | ½ |
| D5 | 1 | 2 | ¾ |
| D6 | 1 | 2 | 1 |

In one example (VI.4.1), the set (S) includes all 18 (C1-C12 and D1-D6) parameter combinations (Table 32).

In one example (VI.4.2), the set (S) includes a subset (S1) of the 18 (C1-C12) parameter combinations, where the subset (S1) includes up to (at most or less or equal to) 8 parameter combinations. At least one of the following examples (example VI.1.2.1 through VI.1.2.9, example VI.2.2.1 through VI.2.2.9, example VI.3.2.1 through VI.3.2.9) can be used. Or, N>=1 combination(s) in these examples is (are) replaced with N combinations from D1-D6.

TABLE 33

| paramComb | α | $M_\upsilon$ | β |
|---|---|---|---|
| C2 | ½ | 1 | ¾ |
| C4 | ¾ | 1 | ½ |
| C6 | ¾ | 1 | 1 |
| D1 | 1 | 1 | ½ |
| D2 | 1 | 1 | ¾ |
| D3 | 1 | 1 | 1 |
| C7 | ½ | 2 | ½ |
| C8 | ½ | 2 | ¾ |
| D4 | 1 | 2 | ½ |
| D5 | 1 | 2 | ¾ |

In one example (VI.4.3), the set (S) includes a subset (S1) of the 18 (C1-C12) parameter combinations, where the subset (S1) includes 10 parameter combinations shown in Table 29 that are selected from the 18 (C1-C12 and D1-D6) parameter combinations (Table 28).

In one example (VI.4.4), the set (S) includes a subset (S1) of the 18 (C1-C12) parameter combinations, where the subset (S1) includes 9 parameter combinations shown in Table 29 that are selected from the 18 (C1-C12 and D1-D6) parameter combinations. The 9 parameter combinations are according to one of the following examples.

$S1 = \{C2, C4, C6, D1, D2, D3, C7, C8, D4\}$ $S1 = \{C2, C4, C6, D1, D2, D3, C7, C8, D5\}$ $S1 = \{C2, C4, C6, D1, D2, D3, C7, D4, D5\}$ $S1 = \{C2, C4, C6, D1, D2, D3, C8, D4, D5\}$ $S1 = \{C2, C4, C6, D1, D2, C7, C8, D4, D5\}$ $S1 = \{C2, C4, C6, D1, D3, C7, C8, D4, D5\}$ $S1 = \{C2, C4, C6, D2, D3, C7, C8, D4, D5\}$ $S1 = \{C2, C4, D1, D2, D3, C7, C8, D4, D5\}$ $S1 = \{C2, C6, D1, D2, D3, C7, C8, D4, D5\}$ $S1 = \{C4, C6, D1, D2, D3, C7, C8, D4, D5\}$

In one example (VI.4.5), the set (S) includes a subset (S1) of the 18 (C1-C12) parameter combinations, where the subset (S1) includes 8 parameter combinations shown in Table 29 that are selected from the 18 (C1-C12 and D1-D6)

parameter combinations (Table 32). The 8 parameter combinations are according to one of the following examples.

S1 = {C2, C4, C6, D1, D2, D3, C7, C8}

S1 = {C2, C4, C6, D1, D2, D3, C7, D4}

S1 = {C2, C4, C6, D1, D2, D3, C7, D5}

S1 = {C2, C4, C6, D1, D2, D3, C8, D4}

S1 = {C2, C4, C6, D1, D2, D3, C8, D5}

S1 = {C2, C4, C6, D1, D2, D3, D4, D5}

S1 = {C2, C4, C6, D1, D2, C7, C8, D4}

S1 = {C2, C4, C6, D1, D2, C7, C8, D5}

S1 = {C2, C4, C6, D1, D2, C7, D4, D5}

S1 = {C2, C4, C6, D1, D2, C8, D4, D5}

S1 = {C2, C4, C6, D1, D3, C7, C8, D4}

S1 = {C2, C4, C6, D1, D3, C7, C8, D5}

S1 = {C2, C4, C6, D1, D3, C7, D4, D5}

S1 = {C2, C4, C6, D1, D3, C8, D4, D5}

S1 = {C2, C4, C6, D1, C7, C8, D4, D5}

S1 = {C2, C4, C6, D2, D3, C7, C8, D4}

S1 = {C2, C4, C6, D2, D3, C7, C8, D5}

S1 = {C2, C4, C6, D2, D3, C7, D4, D5}

S1 = {C2, C4, C6, D2, D3, C8, D4, D5}

S1 = {C2, C4, C6, D2, C7, C8, D4, D5}

S1 = {C2, C4, C6, D3, C7, C8, D4, D5}

S1 = {C2, C4, D1, D2, D3, C7, C8, D4}

S1 = {C2, C4, D1, D2, D3, C7, C8, D5}

S1 = {C2, C4, D1, D2, D3, C7, D4, D5}

S1 = {C2, C4, D1, D2, D3, C8, D4, D5}

S1 = {C2, C4, D1, D2, C7, C8, D4, D5}

S1 = {C2, C4, D1, D3, C7, C8, D4, D5}

S1 = {C2, C4, D2, D3, C7, C8, D4, D5}

S1 = {C2, C6, D1, D2, D3, C7, C8, D4}

S1 = {C2, C6, D1, D2, D3, C7, C8, D5}

S1 = {C2, C6, D1, D2, D3, C7, D4, D5}

S1 = {C2, C6, D1, D2, D3, C8, D4, D5}

S1 = {C2, C6, D1, D2, C7, C8, D4, D5}

S1 = {C2, C6, D1, D3, C7, C8, D4, D5}

S1 = {C2, C6, D2, D3, C7, C8, D4, D5}

S1 = {C4, C6, D1, D2, D3, C7, C8, D4}

S1 = {C4, C6, D1, D2, D3, C7, C8, D5}

S1 = {C4, C6, D1, D2, D3, C7, D4, D5}

S1 = {C4, C6, D1, D2, D3, C8, D4, D5}

S1 = {C4, C6, D1, D2, C7, C8, D4, D5}

S1 = {C4, C6, D1, D3, C7, C8, D4, D5}

S1 = {C4, C6, D2, D3, C7, C8, D4, D5}

-continued

S1 = {C4, D1, D2, D3, C7, C8, D4, D5}

S1 = {C6, D1, D2, D3, C7, C8, D4, D5}

TABLE 34

| paramComb | α | $M_v$ | β |
|---|---|---|---|
| C2 | ½ | 1 | ¾ |
| C4 | ¾ | 1 | ½ |
| C6 | ¾ | 1 | 1 |
| D1 | 1 | 1 | ½ |
| D2 | 1 | 1 | ¾ |
| D3 | 1 | 1 | 1 |
| C7 | ½ | 2 | ½ |
| C10 | ¾ | 2 | ½ |
| D4 | 1 | 2 | ½ |
| D5 | 1 | 2 | ¾ |

In one example (VI.4.6), the set (S) includes a subset (S1) of the 18 (C1-C12) parameter combinations, where the subset (S1) includes 10 parameter combinations shown in Table 30 that are selected from the 18 (C1-C12 and D1-D6) parameter combinations (Table 32).

In one example (VI.4.7), the set (S) includes a subset (S1) of the 18 (C1-C12) parameter combinations, where the subset (S1) includes 9 parameter combinations shown in Table 34 that are selected from the 18 (C1-C12 and D1-D6) parameter combinations. The 9 parameter combinations are according to one of the following examples.

S1 = {C2, C4, C6, D1, D2, D3, C7, C10, D4}

S1 = {C2, C4, C6, D1, D2, D3, C7, C10, D5}

S1 = {C2, C4, C6, D1, D2, D3, C7, D4, D5}

S1 = {C2, C4, C6, D1, D2, D3, C10, D4, D5}

S1 = {C2, C4, C6, D1, D2, C7, C10, D4, D5}

S1 = {C2, C4, C6, D1, D3, C7, C10, D4, D5}

S1 = {C2, C4, C6, D2, D3, C7, C10, D4, D5}

S1 = {C2, C4, D1, D2, D3, C7, C10, D4, D5}

S1 = {C2, C6, D1, D2, D3, C7, C10, D4, D5}

S1 = {C4, C6, D1, D2, D3, C7, C10, D4, D5}

In one example (VI.4.8), the set (S) includes a subset (S1) of the 18 (C1-C12) parameter combinations, where the subset (S1) includes 8 parameter combinations shown in Table 30 that are selected from the 18 (C1-C12 and D1-D6) parameter combinations (Table 32). The 8 parameter combinations are according to one of the following examples.

S1 = {C2, C4, C6, D1, D2, D3, C7, C10}

S1 = {C2, C4, C6, D1, D2, D3, C7, D4}

S1 = {C2, C4, C6, D1, D2, D3, C7, D5}

S1 = {C2, C4, C6, D1, D2, D3, C10, D4}

S1 = {C2, C4, C6, D1, D2, D3, C10, D5}

S1 = {C2, C4, C6, D1, D2, D3, D4, D5}

-continued

S1 = {C2, C4, C6, D1, D2, C7, C10, D4}
S1 = {C2, C4, C6, D1, D2, C7, C10, D5}
S1 = {C2, C4, C6, D1, D2, C7, D4, D5}
S1 = {C2, C4, C6, D1, D2, C10, D4, D5}
S1 = {C2, C4, C6, D1, D3, C7, C10, D4}
S1 = {C2, C4, C6, D1, D3, C7, C10, D5}
S1 = {C2, C4, C6, D1, D3, C7, D4, D5}
S1 = {C2, C4, C6, D1, D3, C10, D4, D5}
S1 = {C2, C4, C6, D1, C7, C10, D4, D5}
S1 = {C2, C4, C6, D2, D3, C7, C10, D4}
S1 = {C2, C4, C6, D2, D3, C7, C10, D5}
S1 = {C2, C4, C6, D2, D3, C7, D4, D5}
S1 = {C2, C4, C6, D2, D3, C10, D4, D5}
S1 = {C2, C4, C6, D2, C7, C10, D4, D5}
S1 = {C2, C4, C6, D3, C7, C10, D4, D5}
S1 = {C2, C4, D1, D2, D3, C7, C10, D4}
S1 = {C2, C4, D1, D2, D3, C7, C10, D5}
S1 = {C2, C4, D1, D2, D3, C7, D4, D5}
S1 = {C2, C4, D1, D2, D3, C10, D4, D5}
S1 = {C2, C4, D1, D2, C7, C10, D4, D5}
S1 = {C2, C4, D1, D3, C7, C10, D4, D5}
S1 = {C2, C4, D2, D3, C7, C10, D4, D5}
S1 = {C2, C6, D1, D2, D3, C7, C10, D4}
S1 = {C2, C6, D1, D2, D3, C7, C10, D5}
S1 = {C2, C6, D1, D2, D3, C7, D4, D5}
S1 = {C2, C6, D1, D2, D3, C10, D4, D5}
S1 = {C2, C6, D1, D2, C7, C10, D4, D5}
S1 = {C2, C6, D1, D3, C7, C10, D4, D5}
S1 = {C2, C6, D2, D3, C7, C10, D4, D5}
S1 = {C4, C6, D1, D2, D3, C7, C10, D4}
S1 = {C4, C6, D1, D2, D3, C7, C10, D5}
S1 = {C4, C6, D1, D2, D3, C7, D4, D5}
S1 = {C4, C6, D1, D2, D3, C10, D4, D5}
S1 = {C4, C6, D1, D2, C7, C10, D4, D5}
S1 = {C4, C6, D1, D3, C7, C10, D4, D5}
S1 = {C4, C6, D2, D3, C7, C10, D4, D5}
S1 = {C4, D1, D2, D3, C7, C10, D4, D5}
S1 = {C6, D1, D2, D3, C7, C10, D4, D5}

When S1={C6, D1, D2, D3, C7, C10, D4, D5}, the UE can be configured with a parameter combination from Table 31. In one example, when $M_v$ is rank-common (i.e., the same for all rank values v), we can set $M_v$=M.

TABLE 35

| paramCombination-r17 | paramComb | α | $M_\upsilon$ | β |
|---|---|---|---|---|
| 4 | C4 | 3/4 | 1 | 1/2 |
| 3 | D1 | 1 | 1 | 1/2 |
| 2 | D2 | 1 | 1 | 3/4 |
| 1 | D3 | 1 | 1 | 1 |
| 8 | C7 | 1/2 | 2 | 1/2 |
| 7 | C10 | 3/4 | 2 | 1/2 |
| 6 | D4 | 1 | 2 | 1/2 |
| 5 | D5 | 1 | 2 | 3/4 |

When the columns $M_v$ (or M when $M_v$ is rank-common) and α are swapped, the parameter combinations in Table 35 are equivalent to those in Table 36. Hence, the values α, M and β are configured/determined by the higher layer parameter paramCombination-r17, where the mapping is given in Table 36.

TABLE 36

Codebook parameter configurations for α, M and β

| paramCombination-r17 | M | α | β |
|---|---|---|---|
| 1 | 1 | 1 | 1 |
| 2 | 1 | 1 | 3/4 |
| 3 | 1 | 1 | 1/2 |
| 4 | 1 | 3/4 | 1/2 |
| 5 | 2 | 1 | 3/4 |
| 6 | 2 | 1 | 1/2 |
| 7 | 2 | 3/4 | 1/2 |
| 8 | 2 | 1/2 | 1/2 |

In one embodiment (VI.5), a UE is configured with a parameter combination (α, $M_v$, β) from a set (S), where the set includes combinations such that $$\alpha \in \left\{\frac{1}{2}, \frac{3}{4}, 1\right\},$$

$M_v \in \{1,2\}$, and $$\beta \in \left\{\frac{1}{2}, \frac{3}{4}, 1\right\}.$$

The set of all possible parameter combinations is shown in Table 33. In one example, $M_v$=M.

TABLE 37

| α | $M_\upsilon$ | β for rank 1-2 | β for rank 3-4 |
|---|---|---|---|
| 0.5 | 1 | 0.25 | 0.125 or 0.5 of R12 |
| 0.5 | 1 | 0.5 | 0.375 or 0.5 of R12 |
| 0.5 | 1 | 0.75 | 0.625 or 0.5 of R12 |
| 1 | 1 | 0.5 | 0.375 or 0.5 of R12 |
| 1 | 1 | 0.75 | 0.625 or 0.5 of R12 |
| 1 | 1 | 1 | 0.875 or 0.5 of R12 |
| 1 | 2 | 0.5 | 0.375 or 0.5 of R12 |

TABLE 37-continued

| α | $M_v$ | β for rank 1-2 | β for rank 3-4 |
|---|---|---|---|
| 1 | 2 | 0.75 | 0.625 or 0.5 of R12 |
| 3/4 | 1 | 1/2 | 0.5 of β for rank 1-2 |
| 3/4 | 1 | 1 | 0.5 of β for rank 1-2 |
| 3/4 | 2 | 1 | 0.5 of β for rank 1-2 |
| 1 | 2 | 1 | 0.5 of β for rank 1-2 |
| 3/4 | 1 | 3/4 | same as rank 1-2 |
| 3/4 | 1 | 1 | same as rank 1-2 |
| 1 | 1 | 3/4 | same as rank 1-2 |
| 1 | 1 | 1 | same as rank 1-2 |
| 3/4 | 2 | 3/4 | same as rank 1-2 |
| 3/4 | 2 | 1 | same as rank 1-2 |
| 1 | 2 | 3/4 | same as rank 1-2 |
| 1 | 2 | 1 | same as rank 1-2 |
| 1/2 | 2 | 1/2 | same as rank 1-2 |
| 1 | 2 | 0.5 | same as rank 1-2 |
| 0.5 | 1 | 0.75 | same as rank 1-2 |
| 1/2 | 1 | 1 | same as rank 1-2 |
| 1/2 | 1 | 1/2 | same as rank 1-2 |
| 3/4 | 1 | 1/2 | same as rank 1-2 |
| 1 | 1 | 1/2 | same as rank 1-2 |
| 1/2 | 2 | 1/4 | same as rank 1-2 |
| 3/4 | 2 | 1/4 | same as rank 1-2 |
| 3/4 | 2 | 1/2 | same as rank 1-2 |
| 1 | 2 | 1/4 | same as rank 1-2 |
| 1 | 2 | 1/2 | same as rank 1-2 |
| 1 for $P_{CSIRS} \leq 12$; 1 for $P_{CSIRS} > 12$ | 1 | 1/2 | same as rank 1-2 |
| 1 for $P_{CSIRS} \leq 12$; 1/2 for $P_{CSIRS} > 12$ | 1 | 3/4 | same as rank 1-2 |
| 1 for $P_{CSIRS} \leq 12$; 1 for $P_{CSIRS} > 12$ | 1 | 1 | same as rank 1-2 |
| 1 for $P_{CSIRS} \leq 12$; 1 for $P_{CSIRS} > 12$ | 2 | 1/2 | same as rank 1-2 |
| 1 for $P_{CSIRS} \leq 12$; 1/2 for $P_{CSIRS} > 12$ | 2 | 1/2 | same as rank 1-2 |
| 1 for $P_{CSIRS} \leq 12$; 1/2 for $P_{CSIRS} > 12$ | 2 | 3/4 | same as rank 1-2 |

In one example (VI.5.1), the set (S) includes all parameter combinations (Table 37).

In one example (VI.5.2), the set (S) includes a subset (S1) of the parameter combinations, where the subset (S1) includes up to (at most or less or equal to) 8 parameter combinations. At least one of the following examples (example VI.1.2.1 through VI.1.2.9, example VI.2.2.1 through VI.2.2.9, example VI.3.2.1 through VI.3.2.9) can be used. Or, N>=1 combination(s) in these examples is (are) replaced with N combinations from D1-D6.

Any of the above variation embodiments can be utilized independently or in combination with at least one other variation embodiment.

Figure 13:
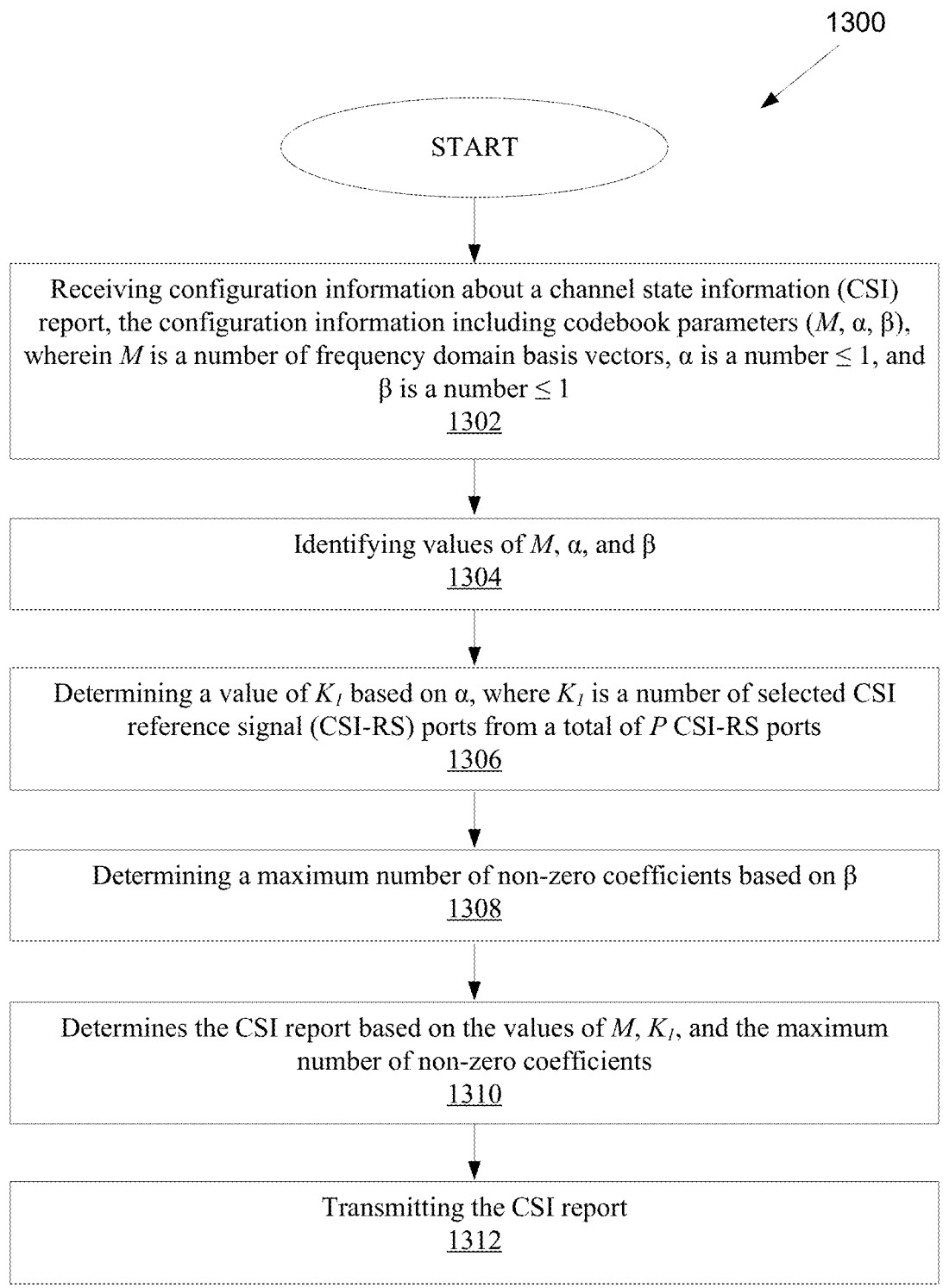
FIG. 13 illustrates a flow chart of a method for operating a UE according to embodiments of the present disclosure.

FIG. 13 illustrates a flow chart of a method 1300 for operating a user equipment (UE), as may be performed by a UE such as UE 116, according to embodiments of the present disclosure. The embodiment of the method 1300 illustrated in FIG. 13 is for illustration only. FIG. 13 does not limit the scope of this disclosure to any particular implementation.

As illustrated in FIG. 13, the method 1300 begins at step 1302. In step 1302, the UE (e.g., 111-116 as illustrated in FIG. 1) receives configuration information about a channel state information (CSI) report, the configuration information including codebook parameters (M, α, β), wherein: M is a number of frequency domain basis vectors, α is a number≤1, and β is a number≤1.

In step 1304, the UE identifies values of M, α, and β.

In step 1306, the UE determines a value of $K_1$ based on α, where $K_1$ is a number of selected CSI reference signal (CSI-RS) ports from a total of P CSI-RS ports.

In step 1308, the UE determines a maximum number of non-zero coefficients based on β.

In step 1310, the UE determines the CSI report based on the values of M, $K_1$, and the maximum number of non-zero coefficients.

In step 1312, the UE transmits the CSI report.

In one embodiment, the codebook parameters (M, α, β) are configured jointly via a single radio resource control (RRC) parameter paramCombination-r17.

In one embodiment, a mapping between the codebook parameters (M, α, β) and the parameter paramCombination-r17 is based on a table given by

| paramCombination-r17 | M | α | β |
|---|---|---|---|
| X1 | 1 | 3/4 | 1/2 |
| X2 | 1 | 1 | 1/2 |
| X3 | 1 | 1 | 3/4 |
| X4 | 1 | 1 | 1 |
| X5 | 2 | 1/2 | 1/2 |
| X6 | 2 | 3/4 | 1/2 |
| X7 | 2 | 1 | 1/2 |
| X8 | 2 | 1 | 3/4 | wherein the UE is configured with a value of the parameter paramCombination-r17 that is configured from a set of values {X1, X2, . . . , X8}.

In one embodiment, the UE is not expected to be configured with paramCombination-r17=X1 or X6 indicating $$\alpha = \frac{3}{4},$$

when P∈ {4,12}.

In one embodiment, the UE is not expected to be configured with paramCombination-r17=X5 indicating $$\alpha = \frac{1}{2},$$

when P=4, and allowed rank values for the CSI report include 3 or 4.

In one embodiment, the UE is not expected to be configured with allowed rank values for the CSI report including 3 or 4, when P=4, and paramCombination-r17=X5 indicating $$\alpha = \frac{1}{2}.$$

In one embodiment, when $$\alpha = \frac{1}{2}$$

or ¾, the CSI report includes an indicator $i_{1,2}$ indicating CSI-RS port selection vectors; and when α=1, the CSI report does not include the indicator $i_{1,2}$.

Figure 14:
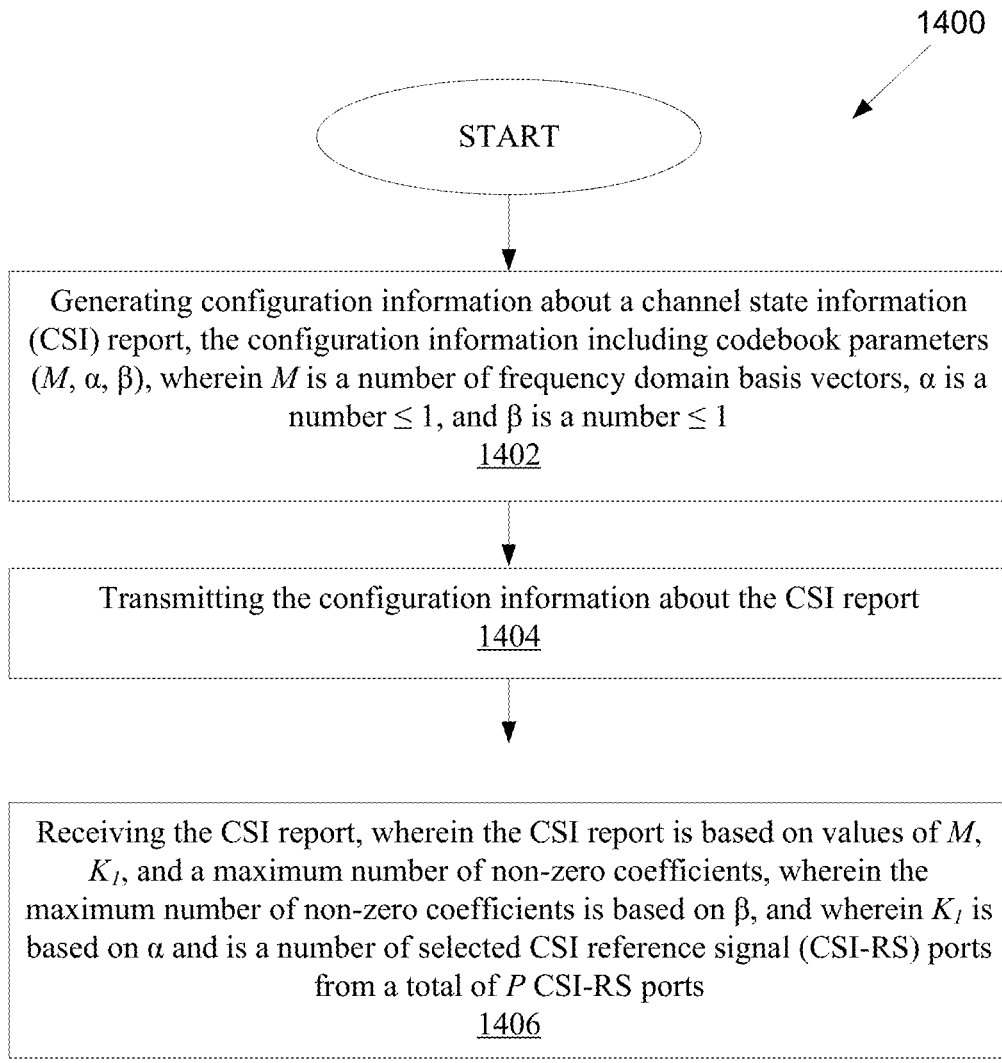
FIG. 14 illustrates a flow chart of a method for operating a BS according to embodiments of the present disclosure.

FIG. 14 illustrates a flow chart of another method 1400, as may be performed by a base station (BS) such as BS 102, according to embodiments of the present disclosure. The embodiment of the method 1400 illustrated in FIG. 14 is for illustration only. FIG. 14 does not limit the scope of this disclosure to any particular implementation.

As illustrated in FIG. 14, the method 1400 begins at step 1402. In step 1402, the BS (e.g., 101-103 as illustrated in FIG. 1), generates configuration information about a channel state information (CSI) report, the configuration information including codebook parameters (M, α, β), wherein: M is a number of frequency domain basis vectors, α is a number≤1, and β is a number≤1.

In step 1404, the BS transmits the configuration information about the CSI report. and In step 1406, the BS receives the CSI report; wherein the CSI report is based on values of M, $K_1$, and a maximum number of non-zero coefficients, wherein the maximum number of non-zero coefficients is based on β, and wherein $K_1$ is based on α and is a number of selected CSI reference signal (CSI-RS) ports from a total of P CSI-RS ports.

In one embodiment, the codebook parameters (M, α, β) are configured jointly via a single radio resource control (RRC) parameter paramCombination-r17.

In one embodiment, a mapping between the codebook parameters (M, α, β) and the parameter paramCombination-r17 is based on a table given by

| paramCombination-r17 | M | α | β |
|---|---|---|---|
| X1 | 1 | ¾ | ½ |
| X2 | 1 | 1 | ½ |
| X3 | 1 | 1 | ¾ |
| X4 | 1 | 1 | 1 |
| X5 | 2 | ½ | ½ |
| X6 | 2 | ¾ | ½ |
| X7 | 2 | 1 | ½ |
| X8 | 2 | 1 | ¾ | wherein a value of the parameter paramCombination-r17 is configured from a set of values {X1, X2, . . . , X8}.

In one embodiment, the parameter paramCombination-r17 cannot take a value X1 or X6 indicating $$\alpha = \frac{3}{4},$$

when P∈{4,12}.

In one embodiment, the parameter paramCombination-r17 cannot take a value X5 indicating $$\alpha = \frac{1}{2},$$

when P=4, and allowed rank values for the CSI report include 3 or 4.

In one embodiment, when $$\alpha = \frac{1}{2}$$

or ¾, the CSI report includes an indicator $i_{1,2}$ indicating CSI-RS port selection vectors; and when α=1, the CSI report does not include the indicator $i_{1,2}$.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a terminal in a wireless communication system, the method comprising:
   receiving, by the terminal, parameter combination information for a Type II port selection codebook;
   identifying a parameter α based on a parameter combination (M, α, β) indicated by the parameter combination information, wherein the parameter combination indicated by the parameter combination information is one of following parameter combinations:

| M | α | β |
|---|---|---|
| 1 | ¾ | ½ |
| 1 | 1 | ½ |
| 1 | 1 | ¾ |
| 1 | 1 | 1 |
| 2 | ½ | ½ |
| 2 | ¾ | ½ |
| 2 | 1 | ½ |
| 2 | 1 | ¾. | selecting $K_1$ ports from a number of channel state information reference signal (CSI-RS) ports ($P_{CSI-RS}$), wherein the $K_1=\alpha P_{CSI-RS}$; and
   determining a precoding matrix based on the $K_1$ ports.

2. The method of claim 1, wherein a parameter combination with α=¾ is not expected by the terminal for the $P_{CSI-RS}$ is 4 or 12.

3. The method of claim 1, wherein a parameter combination with α=½ is not expected by the terminal for the $P_{CSI-RS}$ is 4 and rank indication (RI) restriction information is configured with at least 3 or 4.

4. The method of claim 1, wherein the $K_1$ ports are selected from the $P_{CSI-RS}$ based on based on L vectors, $v_{m^{(i)}}$, i=0, 1, . . . , L–1, which are identified by:

$$m = [m^{(0)} \ldots m^{(L-1)}], \text{ and}$$

$$m^{(i)} \in \left\{0, 1, \ldots, \frac{P_{CSI-RS}}{2} - 1\right\},$$

which are indicated by an index $i_{1,2}$.

5. The method of claim 1, wherein if α=1, $m^{(i)}$=i, $$i = 0, 1, \ldots, \frac{P_{CSI-RS}}{2} - 1,$$

and $i_{1,2}$ is not reported.

6. A terminal comprising:
a transceiver configured to receive parameter combination information for a Type II port selection codebook; and
a processor operably coupled to the transceiver, the processor configured to:
identify a parameter α based on a parameter combination (M, α, β) indicated by the parameter combination information, wherein the parameter combination indicated by the parameter combination information is one of following parameter combinations:

| M | α | β |
|---|---|---|
| 1 | ¾ | ½ |
| 1 | 1 | ½ |
| 1 | 1 | ¾ |
| 1 | 1 | 1 |
| 2 | ½ | ½ |
| 2 | ¾ | ½ |
| 2 | 1 | ½ |
| 2 | 1 | ¾. | select $K_1$ ports from a number of channel state information reference signal (CSI-RS) ports ($P_{CSI-RS}$), wherein the $K_1=\alpha P_{CSI-RS}$; and
determine a precoding a precoding matrix based on the $K_1$ ports.

7. The terminal of claim 6, wherein a parameter combination with α=¾ is not expected by the terminal for the $P_{CSI-RS}$ is 4 or 12.

8. The terminal of claim 6, wherein a parameter combination with α=½ is not expected by the terminal for the $P_{CSI-RS}$ is 4 and rank indication (RI) restriction information is configured with at least 3 or 4.

9. The terminal of claim 6, wherein the $K_1$ ports are selected from the $P_{CSI-RS}$ based on based on L vectors, $v_{m^{(i)}}$, i=0, 1, . . . , L–1, which are identified by:

$$m = [m^{(0)} \ldots m^{(L-1)}], \text{ and}$$

$$m^{(i)} \in \left\{0, 1, \ldots, \frac{P_{CSI-RS}}{2} - 1\right\},$$

which are indicated by an index $i_{1,2}$.

10. The terminal of claim 6, wherein if α=1, $m^{(i)}$=i, $$i = 0, 1, \ldots, \frac{P_{CSI-RS}}{2} - 1,$$

and $i_{1,2}$ is not reported.

11. A base station comprising:
a processor; and
a transceiver operably coupled to the processor, the transceiver configured to transmit, to a terminal, parameter combination information for a Type II port selection codebook, the parameter combination information indicating a parameter combination (M, α, β),
wherein the parameter combination indicated by the parameter combination information is one of following parameter combinations:

| M | α | β |
|---|---|---|
| 1 | ¾ | ½ |
| 1 | 1 | ½ |
| 1 | 1 | ¾ |
| 1 | 1 | 1 |
| 2 | ½ | ½ |
| 2 | ¾ | ½ |
| 2 | 1 | ½ |
| 2 | 1 | ¾. | wherein a precoding matrix is based on $K_1$ ports selected from a number of channel state information reference signal (CSI-RS) ports ($P_{CSI-RS}$), and
wherein the $K_1=\alpha P_{CSI-RS}$.

12. The base station of claim 11, wherein a parameter combination with α=¾ is not expected by the terminal for the $P_{CSI-RS}$ is 4 or 12.

13. The base station of claim 11, wherein a parameter combination with α=½ is not expected by the terminal for the $P_{CSI-RS}$ is 4 and rank indication (RI) restriction information is configured with at least 3 or 4.

14. The base station of claim 11, wherein the $K_1$ ports are selected from the $P_{CSI-RS}$ based on based on L vectors, $v_{m^{(i)}}$, i=0, 1, . . . , L–1, which are identified by:

$$m = [m^{(0)} \ldots m^{(L-1)}], \text{ and}$$

$$m^{(i)} \in \left\{0, 1, \ldots, \frac{P_{CSI-RS}}{2} - 1\right\},$$

which are indicated by an index $i_{1,2}$.

15. The base station of claim 11, wherein if α=1, $m^{(i)}$=i, $$i = 0, 1, \ldots, \frac{P_{CSI-RS}}{2} - 1,$$

and $i_{1,2}$ is not reported.

\* \* \* \* \*